US011370889B2

(12) United States Patent
Guan et al.

(10) Patent No.: US 11,370,889 B2
(45) Date of Patent: Jun. 28, 2022

(54) BOROXINE BASED DYNAMIC THERMOSETTING POLYMERS

(71) Applicant: The Regents of the University of California, Oakland, CA (US)

(72) Inventors: Zhibin Guan, Irvine, CA (US); William Ogden, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 214 days.

(21) Appl. No.: 16/416,148

(22) Filed: May 17, 2019

(65) Prior Publication Data

US 2019/0352469 A1    Nov. 21, 2019

Related U.S. Application Data

(60) Provisional application No. 62/673,846, filed on May 18, 2018.

(51) Int. Cl.
| | | |
|---|---|---|
| C08G 79/08 | (2006.01) |
| C09J 185/04 | (2006.01) |
| C09D 185/04 | (2006.01) |
| C08K 5/3432 | (2006.01) |

(52) U.S. Cl.
CPC .......... C08G 79/08 (2013.01); C08K 5/3432 (2013.01); C09D 185/04 (2013.01); C09J 185/04 (2013.01)

(58) Field of Classification Search
CPC ..................... C08G 79/08; C07F 5/02–05
See application file for complete search history.

(56) References Cited

U.S. PATENT DOCUMENTS

| | | | | | |
|---|---|---|---|---|---|
| 3,427,283 | A | * | 2/1969 | Huster | C08G 16/0218 528/154 |
| 5,963,689 | A | * | 10/1999 | Hesselbom | G02B 6/3817 257/E23.169 |
| 6,566,014 | B1 | * | 5/2003 | Fujinami | H01M 10/0565 429/307 |
| 2003/0073006 | A1 | * | 4/2003 | Fujinami | H01M 10/0567 429/336 |
| 2007/0129305 | A1 | | 6/2007 | Divita et al. | |
| 2009/0105115 | A1 | | 4/2009 | Reineke | |
| 2010/0059174 | A1 | * | 3/2010 | Tietze | C07F 5/05 156/278 |
| 2011/0230678 | A1 | * | 9/2011 | Jung | C07F 5/025 564/11 |
| 2012/0183578 | A1 | | 7/2012 | Sinko et al. | |
| 2012/0184702 | A1 | * | 7/2012 | Lange | C08G 79/00 528/8 |
| 2014/0242123 | A1 | | 8/2014 | Guan et al. | |
| 2014/0288150 | A1 | | 9/2014 | Guan et al. | |
| 2014/0288190 | A1 | | 9/2014 | Ashley et al. | |
| 2015/0297742 | A1 | | 10/2015 | Strieker et al. | |
| 2018/0371183 | A1 | | 12/2018 | Guan | |
| 2019/0194231 | A1 | * | 6/2019 | Risi | B27K 3/50 |

FOREIGN PATENT DOCUMENTS

| | | | | | |
|---|---|---|---|---|---|
| GB | 2331097 | A | * | 5/1999 | ......... C08G 73/0273 |
| JP | 2002216844 | A | * | 8/2002 | |
| WO | 2006/060182 | | | 6/2006 | |
| WO | WO-2009127896 | A1 | * | 10/2009 | .............. C07F 5/025 |

OTHER PUBLICATIONS

IUPAC. Glossary of Class Names of Organic Compounds and Reactive Intermediates Based on Structure. Pure & Appl. Chem., 1995, 67, 1307-1375. (Year: 1995).*
Mehta et al. The use of boroxine rings for the development of high performance polymer electrolytes. Electrochimica Acta, 2000, 45, 1175-1180. (Year: 2000).*
Beckett et al. Gels and Polymeric Materials From Isocyanates and Metaborate Esters. Main Group Metal Chemistry, 2002, 25, 485-488. (Year: 2002).*
Qin et al. Silylated Initiators for the Efficient Preparation of Borane-End-Functionalized Polymers via ATRP. Macromolecules, 2007, 40, 1413-1420. (Year: 2007).*
Durka et al. Electrophilic ipso-iodination of silylated arylboronic acids. J. Organometallic Chem. 2010, 695, 2635-2643. (Year: 2010).*
Korich et al. Synthesis, Characterization, and Star Polymer Assembly of Boronic Acid End-Functionalized Polycaprolactone. J. Poly. Sci. Part A: Poly. Chem. 2010, 48, 5767-5774. (Year: 2010).*
Schlogl et al. Synthesis of two-dimensional phenylene-boroxine networks through in vacuo condensation and on-surface radical addition. Chem. Commun. 2011, 47, 12355-12357. (Year: 2011).*
Bunck et al. Internal Functionalization of Three-Dimensional Covalent Organic Frameworks. Angew. Chem. Int. Ed. 2012, 51, 1885-1889. (Year: 2012).*
Faury et al. Sequential Linking To Control Growth of a Surface Covalent Organic Framework. J. Phys. Chem. C. 2012, 116, 4819-4823. (Year: 2012).*
Lai et al. A Stiff and Healable Polymer Based on Dynamic-Covalent Boroxine Bonds. Adv. Mater. 2016, 28, 8277-8282. (Year: 2016).*
Delpierre et al. Dynamic Iminoboronate-Based Boroxine Chemistry for the Design of Ambient Humidity-Sensitive Self-Healing Polymers. Chem. Eur. J. 2017, 23, 6730-6735. (Year: 2017).*
Machine Translation of JP2002-216844A. Aug. 2, 2002 (Year: 2002).*
Difference Between Functional Group and Substituent. https://www.differencebetween.com/difference-between-functional-group-and-substituent/. As viewed on Nov. 1, 2021. (Year: 2021).*
Akinc et al., "A combinatorial library of lipid-like materials for delivery of RNAi therapeutics," Nat Biotechnol 26:561-569 (2008).
Amamoto e et al., "Self-Healing of Covalently Cross-Linked Polymers by Reshuffling Thiuram Disulfide Moieties in Air under Visible Light," Adv. Mater. 24:3975-398—(2012).
Ashcroft et al., "Glucose metabolism in mouse pancreatic islets." Biochem J 118:143e54 (1970).

(Continued)

Primary Examiner — Stephen E Rieth
(74) Attorney, Agent, or Firm — Gavrilovich, Dodd & Lindsey LLP

(57) ABSTRACT

The disclosure provides for dynamic thermosetting polymers comprising boroxine crosslinks that exhibit unusual mechanical behavior by being strong, highly malleable, recyclable and fully reprocessable. The disclosure further provides methods of making the thermosetting polymers and applications thereof.

18 Claims, 19 Drawing Sheets

(56) References Cited

OTHER PUBLICATIONS

Banerjee et al. "The influence of hydrogel modulus on the proliferation and differentiation of encapsulated neural stem cells." Biomaterials 30:4695-4699 (2009).
Banwell et al., "Rational design and application of responsive alpha-helical peptide hydrogels." Nat. Mater. 8:596-600 (2009).
Barnard et al., Degradable Self-Assembling Dendrons for Gene Delivery: Experimental and Theoretical Insights into the Barriers to Cellular Uptake J Am Chem Soc 133:20288-20300 (2011).
Behr, J. P., "Synthetic Gene Transfer Vectors II: Back to the Future," Acc Chem Res 45:980-984 (Feb. 2012).
Bennet et al., "Incompatibility between human blood and isolated islets of Langerhans: a finding with implications for clinical intraportal islet transplantation?," Diabetes 48:1907e14 (1999).
Berkefeld et al., "Silicon a-Effect: A Systematic Experimental and Computational Study of the Hydrolysis of Ca and Cg-Functionalized Alkoxytriorganylsilanes of the Formula Type ROSiMes2(CH2)nX (R=me, ET; n=1, 3; X=Functional group)." Organometallics 33:2721-2737 (2014).
Blomeier et al. Polymer scaffolds as synthetic microenvironments for extrahepatic islet transplantation. Transplantation 82:452e9 (2006).
Borg et al., The use of biomaterials in islet transplantation. Curr Diab Rep 11:434e44 (2011).
Brown et al. Importance of hepatic portal circulation for insulin action in streptozotocin-diabetic rats transplanted with fetal pancreases. J Clin Invest 64:1688e94 (1979).
Brunelle et al., "A structureeactivity investigation of hemifluorinated bi-functional bolaamphiphiles designed for gene delivery," C. R. Chimie 12:88-208 (2009).
Bryant et al., Hydrogel properties influence ECM production by chondrocytes photoencapsulated in poly(ethylene glycol) hydrogels. J. Biomed. Mater. Res. 59:63-72 (2002).
Bryant et al., Incorporation of tissue-specific molecules alters chondrocyte metabolism and gene expression in photocrosslinked hydrogels. Acta Biomater. 1:243-252 (2005).
Burdick et al. Photoencapsulation of osteoblasts in injectable RGD-modified PEG hydrogels for bone tissue engineering Biomaterials 23:4315-4323 (2002).
Burdick et al. Controlled degradation and mechanical behavior of photopolymerized hyaluronic acid networks. Biomacromolecules 6:386-391 (2005).
Burnett et al., "RNA-based Therapeutics—Current Progress and Future Prospects," J. Chem Biol 19:60-71 (Jan. 2012).
Carlsson et al., Markedly decreased oxygen tension in transplanted rat pancreatic islets irrespective of the implantation site. Diabetes 50:489e95 (2001).
Castanotto et al., "The promises and pitfalls of RNA interference-based therapeutics", Nature 457:426-433 (2009).
Chabert et al., "Multiple welding of long fiber epoxy vitrimer composites." Soft Matter 12:4838-4845 (2016).
Chang et al., "Surface-Engineered Dendrimers with a Diaminododecane Core Achieve Efficient Gene Transfection and Low Cytotoxicity," Bioconjugate Chemistry 25(2):342-50. Jan. 21, 2014).
Chawla et al., Biodegradable and biocompatible synthetic saccharide-Peptide hydrogels for three-dimensional stem cell culture. Biomacromolecules 12:560e7 (2011).
Chawla et al., Modulation of chondrocyte behavior through tailoring functional synthetic saccharide-peptide hydrogels. Biomaterials 33:6052e60 (Sep. 1, 2012).
Chen et al., "Bioreducible Hyperbranched Poly(amido amine)s for Gene Delivery," Biomacromolecules 10:2921-2927 (2009).
Chen et al., "An RNA interference screen uncovers a new molecule in stemcell self-renewal and long-term regeneration", Nature 485(7396):104-108 (2012).
Cordero Garcia, Marcela M. Non-final Office Action for U.S. Appl. No. 14/186,973 (dated Mar. 24, 2015).
Cordero Garcia, Marcela M. Final Office Action for U.S. Appl. No. 14/186,973 (dated Aug. 21, 2015).
Cordero Garcia, Marcela M. Notice of Allowance for U.S. Appl. No. 14/186,973 (dated Nov. 12, 2015).
Creusat et al., "Self-Assembling Polyethylenimine Derivatives Mediate Efficient siRNA Delivery in Mammalian Cells," Chembiochem 9:2787-2789 (2008).
Crombez et al., "A New Potent Secondary Amphipathic Cell-penetrating Peptide for siRNA Delivery Into Mammalian Cells," Molecular Therapy 17(1):95-103 (2009).
Crombez et al., "Targeting cyclin B1 through peptide-based delivery of siRNA prevents tumour growth," Nucleic Acids Res 37(14):4559-4569 (2009).
Cui et al., "Conjugation Chemistry through Acetals toward a Dextran-Based Delivery System for Controlled Release of siRNA," J Am Chem Soc 134:15840 (Sep. 2012).
Dafik et al., "Fluorinated Lipid Constructs Permit Facile Passage of Molecular Cargo into Living Cells," JACS 131:12091-12093 (2009).
Davis et al., "Evidence of RNAi in humans from systemically administered siRNA via targeted nanoparticles," Nature 464:1067-1071 (2010).
Deforest et al., "Sequential click reactions for synthesizing and patterning three-dimensional cell microenvironments" Nat. Mater. 8:659-664 (2009).
Degoricija et al., "Hydrogels for osteochondral repair based on photocrosslinkable carbamate dendrimers. Biomacromolecules." 9:2863-2872 (2008).
Denyelle et al., "Synthesis and preliminary biological studies of hemifluorinated bifunctional bolaamphiphiles designed for gene delivery," New Journal of Chemistry 30:629-646 (2006).
Dietzl et al., "A genome-wide transgenic RNAi library for conditional gene inactivation in *Drosophila*", Nature 448:151-156 (2007).
Discher et al., Tissue cells feel and respond to the stiffness of their substrate. Science 310:1139-1143 (2005).
Dong et al., "Lipopeptide nanoparticles for potent and selective siRNA delivery in rodents and nonhuman primates", PNAS 111(11):3955-3960 (Mar. 18, 2014).
Drury et al., Hydrogels for tissue engineering: scaffold design variables and applications. J. Biomaterials 24:4337-4351 (2003).
Dunn et al., "Reductively-responsive siRNA-conjugated hydrogel nanoparticles for gene silencing," J Am Chem Soc 134:7423-7430 (May 2012).
Eguchi et al., "siRNA delivery using peptide transduction domains." Cell 30(7):341-345 (2009).
Elbert et al., Conjugate addition reactions combined with free-radical cross-linking for the design of materials for tissue engineering. Biomacromolecules 2:430-441(2001).
Engler et al., Matrix elasticity directs stem cell lineage specification. Cell 126:677-689 (2006).
Fabio et al., "Novel Galactosylated Polyamine Bolaamphiphiles for Gene Delivery," Bioconjugate Chemistry 14:358-367 (2003).
Fischer et al., "Dendritic Polyglycerols with Oligoamine Shells Show Low Toxicity and High siRNA Transfection Efficiency in Vitro," Bioconjug Chem 21:1744-1752 (2010).
Flanagan et al., Neurite branching on deformable substrates. NeuroReport 13: 2411-2415 (2002).
Fortman et al., "Mechanically Activated, Catalyst-Free Polyhydroxyurethane Vitrimers." J. Am. Chem. Soc. 137:14019-14022 (2015).
Amamoto et al., "Repeatable photoinduced self-healing of covalently cross-linked polymers through reshuffling of trithiocarbonate units," Angew. Chem. Int. Ed. Engl. 50(7):1660-3 (2011).
Antoft-Finch et al., "N,N-diethyl O-carbamate: directed metalation group and orthogonal Suzuki-Miyaura cross-coupling partner," J. Am. Chem. Soc. 131(49):17750-2 (2009).
Beckmann et al., "Ring strain in boroxine rings: computational and experimental considerations," J. Organomet. Chem. 633(1-2):149-156 (2001).
Bowman et al., "Covalent Adaptable Networks: Reversible Bond Structures Incorporated in Polymer Networks," Angew. Chem. Int. Ed. Engl. 51(18):4272-4 (2012).
Brutman et al., "Polylactide Vitrimers," ACS Macro Lett. 3(7):607-610 (2014).
Capelot et al., "Catalytic Control of the Vitrimer Glass Transition," ACS Macro Lett. 1(7):789-792 (2012).

(56) References Cited

OTHER PUBLICATIONS

Cromwell et al., "Malleable and Self-Healing Covalent Polymer Networks through Tunable Dynamic Boronic Ester Bonds," J. Am. Chem. Soc. 137:6492-5 (2015).
Denissen et al., "Vinylogous Urethane Vitrimers," Adv. Funct. Mater. 25:2451-2457 (2015).
Denissen et al., "Vitrimers: permanent organic networks with glass-like fluidity," Chem. Sci. 7:30-38 (2016).
El-Kaderi et al., "Designed Synthesis of 3D Covalent Organic Frameworks," Science 316(5822):268-72 (2007).
Garcia et al., "Recyclable, Strong Thermosets and Organogels via Paraformaldehyde Condensation with Diamines," Science 344(6185):732-5 (2014).
Greenspan, L., "Humidity fixed points of binary saturated aqueous solutions," Journal of Research of the National Bureau of Standards Section A: Physics and Chemistry 81(1):89-96 (1977).
Hendriks et al., "Poly(thioether) Vitrimers via Transalkylation of Trialkylsulfonium Salts," ACS Macro Lett. 6:930-934 (2017).
Iovine et al., "Condensation of Arylboroxine Structures on Lewis Basic Copolymers as a Noncovalent Means of Polymer Functionalization," Macromolecules 39(19):6324-6326 (2006).
Iovine et al., "Hetero-arylboroxines: The First Rational Synthesis, X-ray Crystallographic and Computational Analysis," Dalton Trans. 3791-4 (2008).
Jin et al., "Recent advances in dynamic covalent chemistry," Chem. Soc. Rev. 42:6634-54 (2013).
Korich et al., "Synthesis, characterization, and star polymer assembly of boronic acid end-functionalized polycaprolactone,". J. Polym. Sci., Part A: Polym. Chem. 48(24):5767-5774 (2010).
Lai et al., "A Stiff and Healable Polymer Based on Dynamic-Covalent Boroxine Bonds," Adv. Mater. 28(37):8277-8282 (2016).
Li et al., "An Improved Protocol for the Preparation of 3-Pyridyl- and Some Arylboronic Acids," J. Org. Chem. 67(15):5394-5397 (2002).
Lu et al., "Making Insoluble Polymer Networks Malleable via Olefin Metathesis," J. Am. Chem. Soc. 134(20):8424-7 (2012).
Lu et al., "Olefin Metathesis for Effective Polymer Healing via Dynamic Exchange of Strong Carbon-Carbon Double Bonds," J. Am. Chem. Soc. 134:14226-31 (2012).
Marinaro et al., "Properties of a Model Aryl Boronic Acid and Its Boroxine," J. Pharm. Sci. 101(9):3190-8 (2012).
Mccusker et al., "Organoboron Compounds. II. Preparation and Properties of Some Trialkylboroxines," J. Am. Chem. Soc. 79(19):5185-5188 (1957).
Montarnal et al., "Silica-Like Malleable Materials from Permanent Organic Networks," Science 334(6058):965-8 (2011).
Morgan et al., "Synthesis, flame-retardancy testing, and preliminary mechanism studies of nonhalogenated aromatic boronic acids: A new class of condensed-phase polymer flame-retardant additives for acrylonitrile-butadiene-styrene and polycarbonate," J. Appl. Polym. Sci. 76(8):1257-1268 (2000).
Ogden et al., "Recyclable, Strong, and Highly Malleable Thermosets Based on Boroxine Networks," J. Am. Chem. Soc. 140(20):6217-6220 (2018).
Pigge et al., "An Enaminone-Directed Benzannulation/Macrocyclization Approach to Cyclophane Ring Systems," J. Org. Chem. 67:4547-52 (2002).
Qin et al., "Silylated Initiators for the Efficient Preparation of Borane-End-Functionalized Polymers via ATRP," Macromolecules 40(5):1413-1420 (2007).
Rottger et al., "High-performance vitrimers from commodity thermoplastics through dioxaborolane metathesis," Science 356:62-65 (2017).
Rowan et al., "Dynamic Covalent Chemistry," F. Angew. Chem. Int. Ed. Engl. 41(6):898-952 (2002).
Scott et al., "Photoinduced Plasticity in Cross-Linked Polymers," Science 308(5728):1615-7 (2005).
Snyder et al., "Reprocessable Acid-Degradable Polycarbonate Vitrimers," Macromolecules 51:389-397 (2018).
Stuhr-Hansen et al., "Synthetic protocols and building blocks for molecular electronics," Tetrahedron 61(52):12288-12295 (2005).
Taynton et al., "Heat- or water-driven malleability in a highly recyclable covalent network polymer," Adv. Mater. 26(23):3938-42 (2014).
Xiang et al., "From Molecular-Level Organization to Nanoscale Positioning: Synergetic Ligand Effect on the Synthesis of Hybrid Nanostructures," Adv. Funct. Mater. 27(45):12 (2017).
Zhang et al., "Dynamic Thiol-Michael Chemistry for Thermoresponsive Rehealable and Malleable Networks," Macromolecules 49(18):6871-6878 (2016).
Zou et al., "Dynamic Covalent Polymer Networks: from Old Chemistry to Modern Day Innovations," Adv. Mater. 2(14) (2017).
Fougerolles et al., "Interfering with disease: a progress report on siRNA-based therapeutics", Nat. Rev. Drug Discovery 6:443-410 (2007).
Frisch et al., Anoikis mechanisms. Curr Opin Cell Biol 13:555e62 (2001).
Gaucheron et al., "In Vitro Gene Transfer with a Novel Galactosylated Spermine Bolaamphiphile," Bioconjugate Chem. 12:569-575 (2001).
Gelain et al., Designer self-assembling peptide nanofiber scaffolds for adult mouse neural stem cell 3-dimensional cultures. S. PLoS One 1:e119 (2006).
Giljohann et al., "Gene Regulation with Polyvalent siRNA-Nanoparticle Conjugates," JACS 131(6):2072-2073 (2009).
Gilleron et al., "Image-based analysis of lipid nanoparticle-mediated siRNA delivery, intracellular trafficking and endosomal escape" Nature Biotechnology 31:638-646 (2013).
Gossl et al., "Molecular Structure of Single DNA Complexes with Positively Charged Dendronized Polymers." J. Am. Chem. Soc. 124:6860-6865 (2002).
Grieshaber et al., Synthesis and Characterization of Elastin-Mimetic Hybrid Polymers with Multiblock, Alternating Molecular Architecture and Elastomeric Properties. Macromolecules 42:2532-2541(2009).
Guignard et al., "Cost Analysis of Human Islet Transplantation for the Treatment of Type 1 Diabetes in the Swiss-French Consortium GRAGIL." Diabetes Care ,27(4):895-900 (2004).
Guilak et al., Control of stem cell fate by physical interactions with the extracellular matrix. Cell Stem Cell 5, 17-26 (2009).
Hafez et al., "On the mechanism whereby cationic lipids promote intracellular delivery of polynucleic acids" Nature 8:1188-1196 (2001).
Haines-Butterick et al., "Controlling hydrogelation kinetics by peptide design for three-dimensional encapsulation and injectable delivery of cells." Proc. Natl. Acad. Sci. U.S.A. 104:7791-7796 (2007).
Hamley, Ian. "PEG-Peptide Conjugates." Biomacromolecules 15:1543-1559 (2014).
Hartgerink et al., "Self-Assembly and Mineralization of Peptide-Amphiphile Nanofibers", Science 294:1684-1688 (2010).
Hiemstra et al., Rapidly in situ forming biodegradable robust hydrogels by combining stereocomplexation and photopolymerization. J. Am. Chem. Soc. 129:9918-9926 (2007).
Hu et al., Rational design of transglutaminase substrate peptides for rapid enzymatic formation of hydrogels. J. Am. Chem. Soc. 125, 14298-14299(2003).
Hu et al., Hydrogels cross-linked by native chemical ligation. Biomacromolecules 2194-2200 (2009).
Hunter, "Molecular hurdles in polyfectin design and mechanistic background to polycation induced cytotoxicity", Adv. Drug Delivery Rev 58:1523-1531 (2006).
Ingber et al., Cell structure and hierarchical systems biology. J. Cell Sci. 116:1157-1173 (2003).
Inukai et al., Preparation and characterization of hyaluronate-hydroxyethyl acrylate blend hydrogel for controlled release device. Chem. Pharm. Bull. 48:850-854 (2000).
Ito et al., "Mesechymal Stem Cell and Islet Co-Transplantation Promotes Graft Revascularization and Function", Transplantation, 89(12):1438-1445 (Jun. 28, 2010).
Jain et al., "Lactose-ornithine bolaamphiphiles for efficient gene delivery in vitro", International Journal of Pharmaceutics 423:392-400 3 (2012).

(56) References Cited

OTHER PUBLICATIONS

Jun et al., Biomimetic self-assembled nanofibers Soft Matter 2:177-181 (2006).
Kersey et al., A hybrid polymer gel with controlled rates of cross-link rupture and self-repair J. R. Soc. Interface 4:373-380 (2007).
Khalil et al., "Uptake Pathways and Subsequent Intracellular Trafficking in Nonviral Gene Delivery," Pharmacological Reviews 58(1):32-45 (2006).
Khan et al., "Diaminododecane-based cationic bolaamphiphile as a non-viral gene delivery", Biomaterials 33 , 4673-4680 (2012).
Kim et al., "Polyoxalate Nanoparticles as a Biodegradable and Biocompatible Drug Delivery Vehicle," Biomacromolecules 11: 555-560 (2010).
Kim et al., "Dendronized gold nanoparticles for siRNA delivery" Small 8(21):3253-3256 (2012).
Kim et al., "In Silico, In Vitro, and In Vivo Studies Indicate the Potential Use of Bolaamphiphiles for Therapeutic siRNAs Delivery", Molecular Therapy—Nucleic Acids 2:e80 (2013).
Klein et al., "Nucleic acid transfer with hemi!uorinated polycationic lipids" Biomaterials 31:4781-4788 (2010).
Kleinman et al., "Isolation and characterization of type IV procollagen, laminin, and heparan sulfate proteoglycan from the EHS sarcoma." Biochemistry 21:6188-6193 (1982).
Kloxin et al., "Covalent Adaptable Networks (CANs): A Unique Paradigm in Crosslinked Polymers." Macromolecules 43(6):2643-2653 (2010).
Kloxin et al., "Mechanophotopatterning on a Photoresponsive Elastomer." Adv. Mater 23:1977-1981 (2011).
Knudsen et al., "In vivo toxicity of cationic micelles and liposomes" Nanomedicine 11(2):467-477 (Aug. 26, 2014).
Kopecek, Hydrogel Biomaterials: A Smart Future? J. Biomaterials 28:5185-5192 (2007).
Kulkarni et al., "Pendant Polymer:Amino-β-Cyclodextrin:siRNA Guest:Host Nanoparticles as Efficient Vectors for Gene Silencing," J Am Chem Soc 134:7596-7599 (Apr. 30, 2012).
Kumar et al., "Transvascular delivery of small interfering RNA to the central nervous system", Nature 448:39-43 (2007).
Lee et al., "Controlling Mechanical and Swelling Properties of Alginate Hydrogels Independently by Cross-Linker Type and Cross-Linking Density." Macromolecules 33, 4291-4294 (2000).
Lee et al., "Hydrogels for tissue engineering." J. Chem ReV 101:1869-1879 (2001).
Lee et al., "Three-dimensional micropatterning of bioactive hydrogels via two-photon laser scanning photolithography for guided 3D cell migration." Biomaterials 29:2962-2968 (2008).
Lee et al., "Growth factor delivery-based tissue engineering: general approaches and a review of recent developments." J R Soc Interface 8:153e70 (2011).
Liao et al., "De novo design of saccharide-peptide hydrogels as synthetic scaffolds for tailored cell responses." J Am Chem Soc 131:17638e46 (2009).
Liao et al., "Maintaining functional islets through encapsulation in an injectable saccharide-peptide hydrogel." Biomaterials 34(16):3984-91 (Mar. 7, 2013).
Liao et al., "The effect of cell-matrix interaction on encapsulated human islets. presented at the Congress of the International Pancreas and Islet Transplantation," (Jun. 2013).
Liao et al., "The Effect of Cell-Matrix Interaction on Encapsulated Human Islets," Transplantation 96(65):S97 (Sep. 27, 2013).
Lieb, Jannette. Non-final Office Action for U.S. Appl. No. 14/814,475 (dated Jul. 22, 2016).
Lieb, Jannette. Final Office Action for U.S. Appl. No. 14/814,475 (dated Apr. 11, 2017).
Lieb, Jannette. Advisory Action for U.S. Appl. No. 14/814,475 (dated Jul. 12, 2017).
Lieb, Jannette. Notice of Allowance for U.S. Appl. No. 14/814,475 (dated Sep. 19, 2017).
Schmolke et al., "Dynamically Cross-Linked Polydimethylsiloxane Networks with Ambient-Temperature Self-Healing." Macromolecules 48:8781-8788 (2015).
Schnizer, Richard A. Non-Final Office Action for U.S. Appl. No. 14/221,249 (dated Nov. 25, 2015).
Schnizer, Richard A. Final Office Action for U.S. Appl. No. 14/221,249 (dated May 2, 2016).
Schnizer, Richard A. Advisory Action for U.S. Appl. No. 14/221,249 (dated Jul. 22, 2016).
Schnizer, Richard A. Non-Final Office Action for U.S. Appl. No. 14/221,249 (dated Sep. 20, 2016).
Schnizer, Richard A. Notice of Allowance for U.S. Appl. No. 14/221,249 (dated May 4, 2017).
Schnizer, Richard A. Non-Final Office Action for U.S. Appl. No. 15/688,718 (dated Dec. 26, 2017).
Schnizer, Richard A. Final Office Action for U.S. Appl. No. 15/688,718 (dated Jun. 26, 2018).
Seliktar D. "Designing cell-compatible hydrogels for biomedical applications." Science 336:1124e8 (Jun. 15, 2012).
Sengupta et al., "Alternate glucocorticoid receptor ligand binding structures influence outcomes in an in vivo tissue regeneration model." Comp Biochem Physiol C Toxicol Pharmacol. 156(2): 121-129 (2012).
Silva et al., "Selective differentiation of neural progenitor cells by high-epitope density nanofibers." Science 303:1352-1355 (2004).
Smith et al., "Diblock Glycopolymers Promote Colloidal Stability of Polyplexes and Effective pDNA and siRNA Delivery under Physiological Salt and Serum Conditions," Biomacromolecules 12:3015-3022 (2011).
Solari et al., "Marginal mass islet transplantation with autologous mesenchymal stem cells promotes long-term islet allograft survival and sustained normoglycemia." Journal of Autoimmunity 32:116-124 (2009).
Solon et al. Fibroblast adaptation and stiffness matching to soft elastic substrates. Biophys. J. 93:4453-4461 (2007).
Son et al., "Bioreducible Polymers for Gene Silencing and Delivery", Accounts of Chemical Research 45(7):1100-1112 (2012).
Sonawane et al., "Chloride Accumulation and Swelling in Endosomes Enhances DNA Transfer by Polyamine-DNA Polyplexes," J Biol Chem 278:44826-44831 (2003).
Soofi et al., "The elastic modulus of Matrigel as determined by atomic force microscopy." J. Struct. Biol. 167:216-219 (2009).
Stendahl et al., Extracellular matrix in pancreatic islets: relevance to scaffold design and transplantation. Cell Transplant 18:1e12 (2009).
Su et al., Anti-inflammatory peptide-functionalized hydrogels for insulin-secreting cell encapsulation. Biomaterials 31:308e14 (2010).
Tabernero et al., "First-in-Humans Trial of an RNA Interference Therapeutic Targeting VEGF and KSP in Cancer Patients with Liver Involvement," Cancer Discovery 3:406-417 (2013).
Tan et al., Thermosensitive injectable hyaluronic acid hydrogel for adipose tissue engineering. Biomaterials 30(36):6844-6853 (2009).
Tang et al., "In Vitro Gene Delivery by Degraded Polyamidoamine Dendrimers," Bioconjugate Chem 7:703-714 (1996).
Tibbet et al., Hydrogels as Extracellular Matrix Mimics for 3D Cell Culture. Biotechnol Bioeng. 103(4):655-663 (2009).
Toyofuku et al., Natural killer T-cells participate in rejection of islet allografts in the liver of mice. Diabetes 55:34e9 (2006).
Urakami et al., "Living Ring-Opening Polymerization of a Carbohydrate-Derived Lactone for the Synthesis of Protein-Resistant Biomaterials." Biomacromolecules, Jan. 26, 2008, 9, 592-597.
Vercruysse et al. Synthesis and in vitro degradation of new polyvalent hydrazide cross-linked hydrogels of hyaluronic acid. Bioconjugate Chem. 8:686-694 (1997).
Wagner, E., "Polymers for siRNA Delivery: Inspired by Viruses to be Targeted, Dynamic, and Precise," Acc Chem Res 45:1005-1013 (2011).
Wakefield et al., "Membrane Activity and Transfection Ability of Amphipathic Polycations as a Function of Alkyl Group Size," Bioconjug Chem 16:1204-1208 (2005).
Wang et al. Substrate flexibility regulates growth and apoptosis of normal but not transformed cells. Am. J. Physiol. Cell Physiol. 279:C1345-1350 (2000).

(56) References Cited

OTHER PUBLICATIONS

Weber et al., Cell-matrix interactions improve Beta-cell survival and insulin secretion in three-dimensional culture. Tissue Eng Part A 14:1959e68 (2008).
Weber et al., "Hydrogel encapsulation environments functionalized with extracellular matrix interactions increase islet insulin secretion." Matrix Biol 27(8):667-673 (2008).
Whitehead et al., "Knocking down barriers:advances in siRNA delivery", Nature Reviews 8:129-138 (2009).
Williams et al., "The Temperature Dependence of Relaxation Mechanisms in Amorphous Polymers and Other Glass-forming Liquids." J. Am. Chem. Soc. 77(14):3701-3707 (1955).
Won et al., "Oligopeptide complex for targeted non-viral gene delivery to adipocytes", Nature Materials 13:1157-1164 (Oct. 5, 2014).
Wong et al., "Co-Injection of a Targeted, Reversibly Masked Endosomolytic Polymer Dramatically Improves the Efficacy of Cholesterol-Conjugated Small Interfering RNAs In Vivo", Nucleic Acid Therapeutics 22(6):380-390 (2012).
Wu et al., "Polycationic dendrimers interact with RNA molecules: polyaminedendrimers inhibit the catalytic activity of Candida ribozymes." ChemComm 3:313-315 (2005).
Wu et al., "Dendrimers as Carriers for siRNA Delivery and Gene Silencing: A Review", The Scientific World Journal (2013).
Yamaguchi et al., "Growth Factor Mediated Assembly of Cell Receptor-Responsive Hydrogels." J. Am. Chem. Soc. 129:3040-3041 (2007).
Yang et al., "Carbon nanotube-vitrimer composite for facile and efficient photo-welding of epoxy." Chem. Scie 5:3486-3492 (2014).
Yu et al., "An Amphiphilic Dendrimer for Effective Delivery of Small Interfering RNA and Gene Silencing In Vitro and In Vivo", Angewandte Chemie 51:8478-8484 (2012).
Yu et al., "Reprocessing and Recycling of Thermosetting Polymers based on Bond Exchange Reactions." RSC Adv. 4:10108-10117 (2014).
Zeng et al. "Multifunctional Dendronized Peptide Polymer Platform for Safe and Effective siRNA Delivery", JACS 135:4962-4965 (Mar. 15, 2013).
Zhang et al., "Effect of Sterics and Degree of Cross-Linking on the Mechanical Properties of Dynamic Poly(alkylurea-urethane) Networks". Macromolecules 50:5051-5060 (2017).
Zheng et al., "A Surprise from 1954: Siloxane Equilibration Is a Simple, Robust, and Obvious Polymer Self-Healing Mechanism". J. Am. Chem. Soc. 134:2024-2027 (2012).
Lin et al., "PEG Hydrogels for the Controlled Release of Biomolecules in Regenerative Medicine." Pharmacol. Res. 26:631-643 (2009).
Lin et al., "Glucagon-like peptide-1 functionalized PEG hydrogels promote survival and function of encapsulated pancreatic beta-cells." Biomacromolecules 10:2460e7 (2009).
Liu et al., "Interfacial Assembly of a Series of Cinnamoyl-Containing Bolaamphiphiles: Spacer-Controlled Packing, Photochemistry, and Odd-Even Effect", Langmuir 28:3474-3482 (2012).
Liu et al., "SiRNA Delivery Systems Based on Neutral Cross-Linked Dendrimers," Bioconjug Chem 23:174-183 (Jan. 2012).
Liu et al., "Efficient Delivery of Sticky siRNA and Potent Gene Silencing in aProstate Cancer Model Using a Generation 5 Triethanolamine-Core PAMAM Dendrimer," Mol Pharmaceutics 9:470-481 (Mar. 2012).
Love et al., "Lipid-like materials for low-dose, in vivo gene silencing", PNAS 107(5):1864-1869 (2010).
Lutolf et al., "Synthesis and physicochemical characterization of end-linked poly(ethylene glycol)-co-peptide hydrogels formed by Michael-type addition." Biomacromolecules 4:713-722 (2003).
Malone et al., "Cationic liposome-mediated RNA transfection", PNAS 86:6077-6081 (1989).
Martens et al., Tailoring the degradation of hydrogels formed from multivinyl poly(ethylene glycol) and poly(vinyl alcohol) macromers for cartilage tissue engineering. Biomacromolecules 4:283-292 (2003).

Martin et al., Human embryonic stem cells express an immunogenic nonhuman sialic acid. Nat Med 11:228e32 (2005).
Mccall et al., Update on islet transplantation. Cold Spring Harb Perspect Med 2:a007823 (2012).
Merkel et al., "Molecular modeling and in vivo imaging can identify successful flexible triazine dendrimer-based siRNA delivery systems," J Control Release 153(1):23-33 (2011).
Metters et al., Network formation and degradation behavior of hydrogels formed by Michael-type addition reactions Biomacromolecules 6:290-301 (2005).
Metzke et al. A novel carbohydrate-derived side-chain polyether with excellent protein resistance. J. Am. Chem. Soc. 125:7760-7761 (2003).
Metzke et al., Structure-property studies on carbohydrate-derived polymers for use as protein-resistant biomaterials. Biomacromolecules 9:208-215 (2008).
Mitragotri et al., "Overcoming the challenges in administering biopharmaceuticals:formulation and delivery strategies", Nat. Rev. Drug Discovery 13:655-672 (2014).
Moassesfar et al., "Slide on Transplantation Medical Cost, Islets vs. Pancreas," presented before the International Pancreas & Islet Transplant Association (IPITA) Congress on Sep. 25, 2013.
Negishi et al., "Luminescence technology in preservation and transplantation for rat islet." Islets 2011;3:111e7 (2011).
Nguyen et al., "Polymeric Materials for Gene Delivery and DNA Vaccination," Adv Mater 21:847-867 (2009).
Nguyen et al., "Nucleic acid delivery: the missing pieces of the puzzle?," Acc Chem Res 45:1153-1162 (Jul. 2012).
Nicolay et al., "Responsive Gels Based on a Dynamic Covalent Trithiocarbonate Cross-Linker." Macromolecules 43:4355-4361 (2010).
Nie et al., "Production of heparin-containing hydrogels for modulating cell responses." Acta Biomater. 5:865-875 (2009).
Nikolova et al., "The vascular basement membrane: a niche for insulin gene expression and beta cell proliferation." Dev Cell 10:397e405 (2006).
Nishimura et al., "Silyl Ether as a Robust and Thermally Stable Dynamic Covalent Motif for Malleable Polymer Design." J. Am. Chem. Soc. 139:14881-14884 (2017).
Nuttelman et al., "Macromolecular monomers for the synthesis of hydrogel niches and their application in cell encapsulation and tissue engineering." Prog. Polym. Sci. 33: 167-179 (2008).
Obdia et al., "Reprocessing and Recycling of Highly Cross-Linked Ion-Conducting Networks through Transalkylation Exchanges of C—N Bonds." J. Am. Chem. Soc. 137:6078-6083 (2015).
Omori et al., "Microassay for glucose-induced preproinsulin mRNA expression to assess islet functional potency for islet transplantation." Transplantation 89:146e54 (2010).
Osthoff et al., "Chemical Stress-Relaxation of Polydimethylsiloxane Elastomers." J. Am. Chem. Soc. 76(18):4659-4663 (1954).
Pasini et al., "Efficient Biocatalytic Cleavage and Recovery of Organic Substrates Supported on Soluble Polymers." Adv. Synth. Catal. 349:971-978 (2007).
Paszek et al., "Tensional homeostasis and the malignant phenotype." Cancer Cell 8:241-254 (2005).
Pavan et al., "Computational Insights into the Interactions between DNA and siRNA with "Rigid" and "Flexible" Triazine Dendrimers," Biomacromolecules 11: 721-730 (2010).
Pavan et al., "Dendrimers and dendrons for siRNA binding: computational insights," J Drug Deliv Sci Tec 22:83-89 (2012).
Pei et al., "Regional Shape Control of Strategically Assembled Multishape Memory Vitrimers." Adv. Mater. 28:156-160 (2016).
Pei et al., "Mouldable liquid-crystalline elastomer actuators with exchangeable covalent bonds." Nature Materials (13):36-41 (2014).
Peppas et al., Hydrogels in biology and medicine: from molecular principles to bionanotechnology AdV. Mater. 18:1345-1360 (2006).
Pitarresi et al., "Photocrosslinking of dextran and polyaspartamide derivatives: A combination suitable for colon-specific drug delivery." Journal of Controlled Release 119:328-338 (2007).
Rackham et al., "Co-transplantation of mesenchymal stem cells maintains islet organisation and morphology in mice." Diabetologia 54:1127-1135 (2011).

(56) References Cited

OTHER PUBLICATIONS

Rajeswari et al., "Does Tryptophan Intercalate in DNA? A Comparative Study of Peptide Binding to Alternating and Nonalternating A*T Sequences," Biochemistry 26:6825-6831 (1987).
Reed et al., "In situ mechanical interferometry of matrigel films." Langmuir 25:36-39 (2009).
Rehfeldt et al., "Cell responses to the mechanochemical microenvironment—implications for regenerative medicine and drug delivery." Adv. Drug Delivery Rev. 59:1329-1339 (2007).
Rejman et al., "Size-dependent internalization of particles via the pathways of clathrin and caveolae-mediated endocytosis", Biochem. J. 377:159-169 (2004).
Rettig et al., "Progress Toward In Vivo Use of siRNAs-II," Mol Ther 20:483-512 (Mar. 2012).
Rizzi et al., "Recombinant protein-co-PEG networks as cell-adhesive and proteolytically degradable hydrogel matrixes. Part I: Development and physicochemical characteristics." Biomacromolecules 6:1226-1238 (2005).
Rozema et al., "Dynamic PolyConjugates for targeted in vivo delivery of siRNA to hepatocytes", PNAS 104(32):12982-12987 (2007).
Sahin et al., "Combinatorial RNAi for quantitative protein network analysis", PNAS 104(16):6579-6584 (2007).
Salto et al., "Enhanced Hydrophobicity of Fluorinated Lipid Bilayer: A Molecular Dynamics Study", J. Phys. Chem B 112:11305-11309 (2008).
Salvay et al., Extracellular matrix protein-coated scaffolds promote the reversal of diabetes after extrahepatic islet transplantation. Transplantation 85:1456e64 (2008).
Schafer et al., "Redox environment of the cell as viewed through the redox state of the glutathione disulfide/glutathione couple," Free Rad. Biol. Med. 30:1191-1212 (2001).
Schaffer et al., "Molecular Engineering of Viral Gene Delivery Vehicles," Annu Rev Biomed Eng 10:169-194 (2008).
Schense et al., Cross-linking exogenous bifunctional peptides into fibrin gels with factor XIIIa. Bioconjugate Chem. 10:75-81 (1999).

* cited by examiner

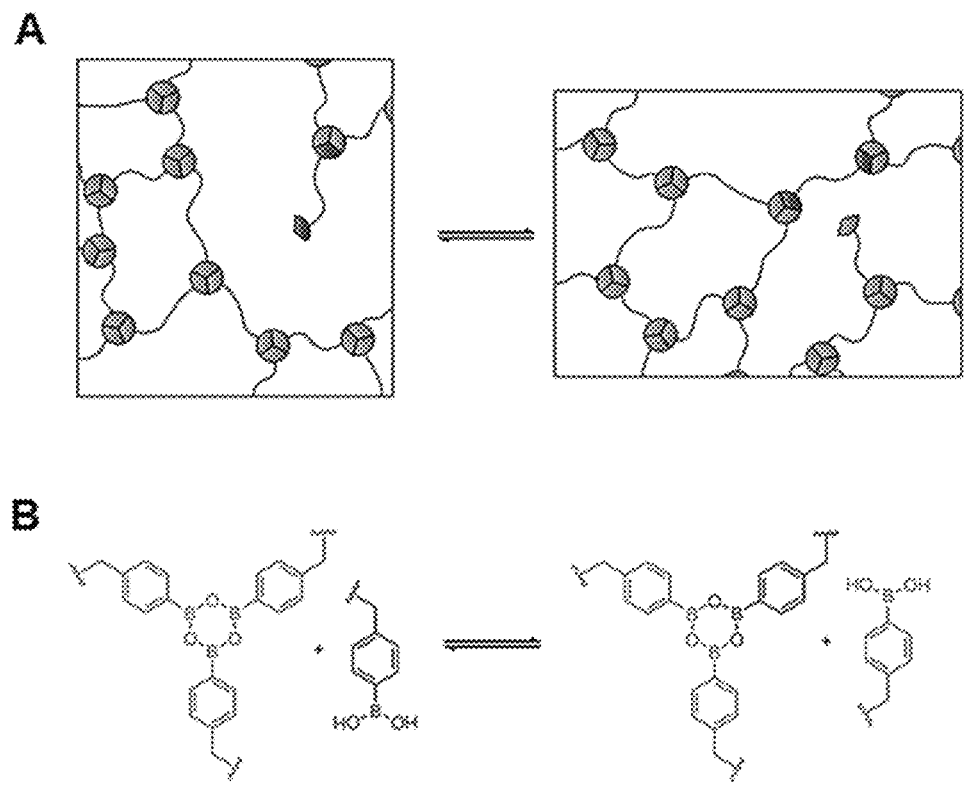
FIG. 1A-B
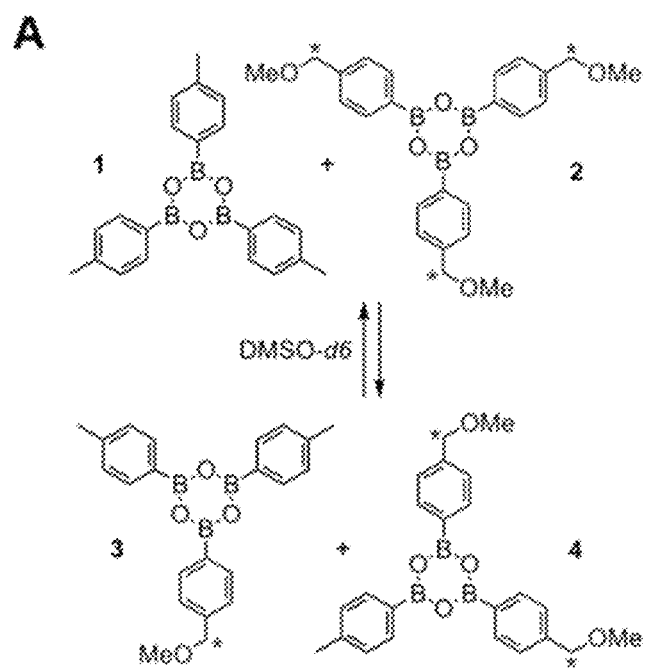
FIG. 2A

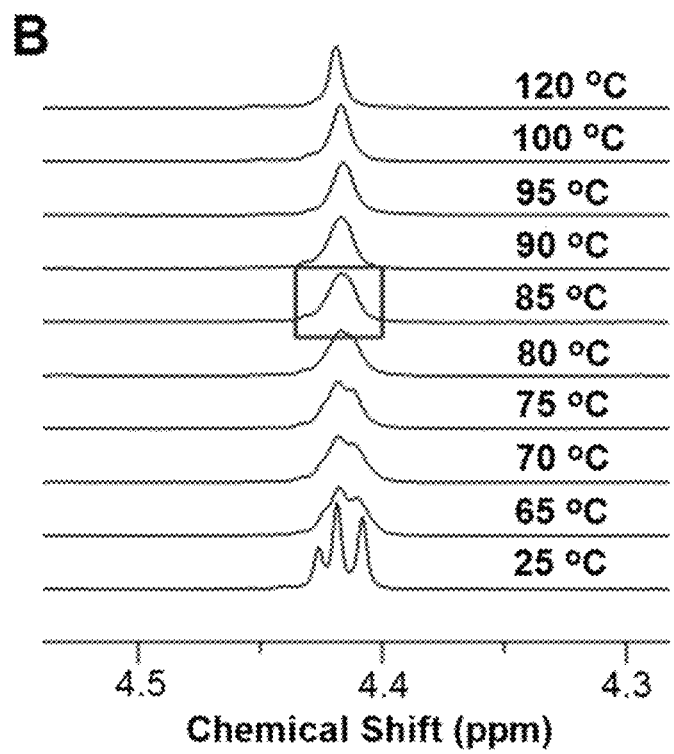
FIG. 2B
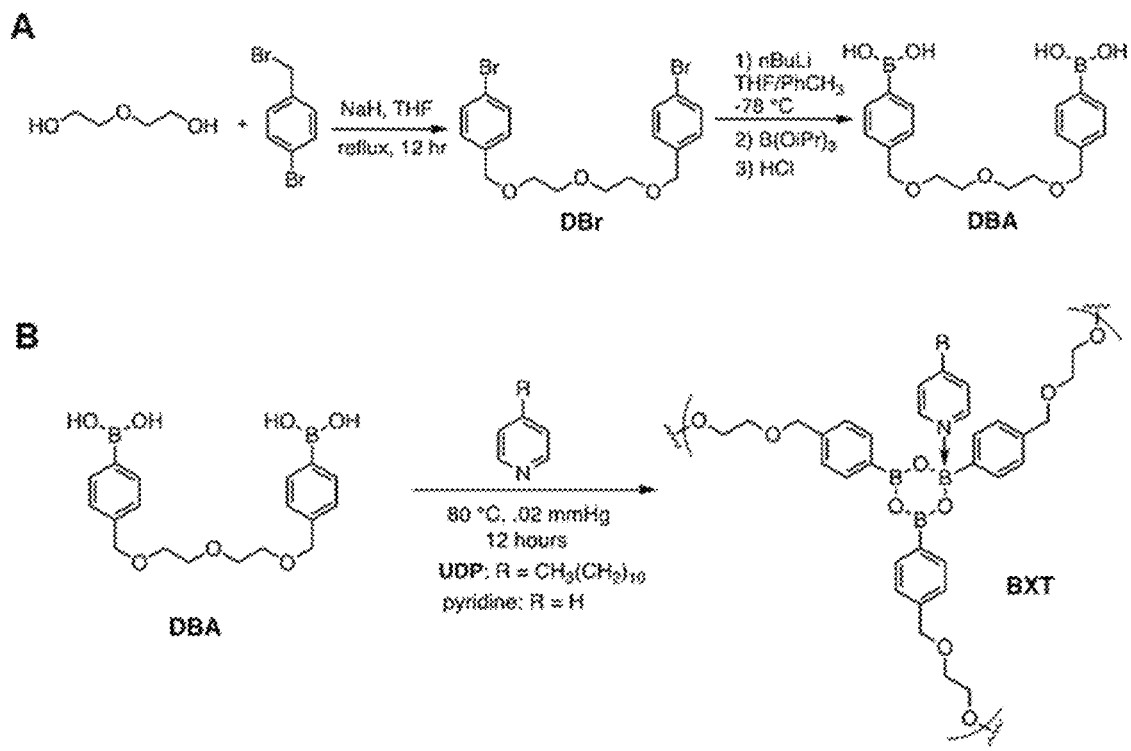
FIG. 3A-B

*FIG. 8A-C*

BOROXINE BASED DYNAMIC THERMOSETTING POLYMERS

CROSS REFERENCE TO RELATED APPLICATIONS

This application claims priority under 35 U.S.C. § 119 from Provisional Application Ser. No. 62/673,846 filed May 18, 2018, the disclosure of which is incorporated herein by reference.

STATEMENT OF GOVERNMENT SUPPORT

This invention was made with Government support under Grant No. DE-FG02-04ER46162, awarded by the Department of Energy. The Government has certain rights in the invention.

TECHNICAL FIELD

The disclosure provides for dynamic thermosetting polymers comprising boroxine crosslinks that exhibit unusual mechanical behavior by being strong, highly malleable, recyclable and fully reprocessable. The disclosure further provides methods of making the thermosetting polymers, and uses and applications thereof.

BACKGROUND

The development of strong, reprocessable, and recyclable thermoset materials is a major challenge in polymer science. The chemically crosslinked structure of thermosets that gives rise to their favorable material properties simultaneously leads to difficulty in reprocessing or recycling the material.

SUMMARY

Traditional thermoset materials have favorable material properties but are unable to reprocess and difficult to recycle. Small molecule boroxines have been shown to undergo reversible exchange reaction. Described herein is a novel type of thermoset material that is strong, highly malleable, and recyclable that is comprised of dynamic boroxine crosslinks. The synthesis and dynamic mechanical properties of boroxine networks are further described herein. Upon heating in water, the material can be recycled back to its monomers. With a multitude of tunable variables, it is anticipated that this dynamic boroxine system to be a platform for the development of a range of new dynamic materials.

In a particular embodiment, the disclosure provides for a dynamic thermosetting polymer comprising: a plurality of boroxine crosslinks having the structure of:

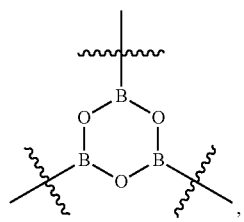 [SMILES: *B1OB(*)OB(*)O1]

formed from monomers comprising boronic acid groups or formed from polymers comprising boronic acid groups; optionally, the dynamic thermosetting polymer further comprises one or more comonomers; optionally, the dynamic thermosetting polymer further comprises one or more plasticizers; wherein the dynamic thermosetting polymer is malleable, can be recycled back to monomers, and/or is capable of being reprocessed. In another embodiment, the monomers comprising boronic acid groups comprise the structure of Formula III(a), Formula III(b), Formula III(c), Formula III(d) and/or Formula III(e):

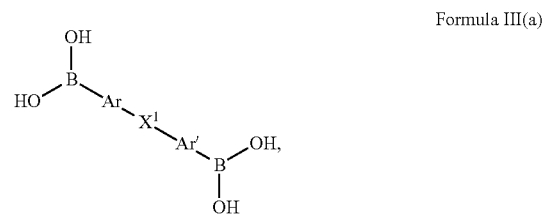
Formula III(a)

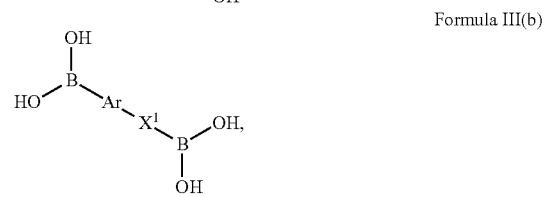
Formula III(b)

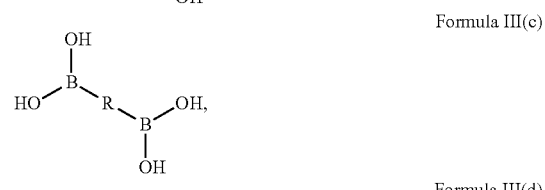
Formula III(c)

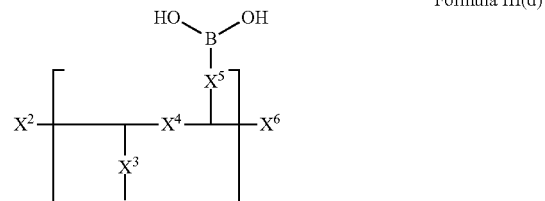
Formula III(d)

and/or

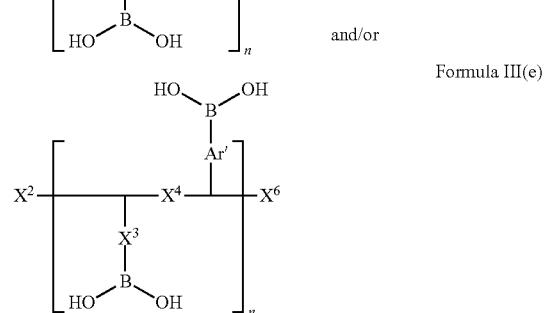
Formula III(e)

wherein, Ar is selected from optionally substituted aryl, optionally substituted aromatic heterocycle, or an optionally substituted aromatic mixed ring system; Ar' is selected from optionally substituted aryl, optionally substituted aromatic heterocycle, or an optionally substituted aromatic mixed ring system; R is selected from optionally substituted ($C_1$-$C_{24}$)-alkyl, optionally substituted ($C_1$-$C_{24}$)-heteroalkyl, optionally substituted ($C_1$-$C_{24}$)-alkenyl, optionally substituted ($C_{1-12}$)-heteroalkenyl, optionally substituted ($C_{2-12}$)-alkynyl, optionally substituted ($C_2$-$C_{12}$)-heteroalkynyl, optionally substituted ($C_3$-$C_{12}$)-cycloalkyl, optionally substituted ($C_4$-$C_{12}$)-cycloalkenyl, optionally substituted ($C_1$-$C_{24}$)-alkoxy, optionally substituted ($C_1$-$C_{24}$)-ester, or any combination of the foregoing groups; and $X^1$ is absent or selected from optionally substituted ($C_1$-$C_{24}$)-alkyl, optionally substituted ($C_1$-$C_{24}$)-heteroalkyl, optionally substituted ($C_1$-$C_{24}$)-alkenyl, optionally substituted ($C_{1-12}$)-heteroalkenyl, optionally substituted ($C_{2-12}$)-alkynyl, optionally substituted ($C_2$-$C_{12}$)-heteroalkynyl, optionally substituted ($C_3$-$C_{12}$)-cycloalkyl, optionally substituted ($C_4$-$C_{12}$)-cycloalkenyl, optionally substituted heterocycle, optionally substituted ($C_1$-$C_{24}$)-alkoxy, optionally substituted ($C_1$-$C_{24}$)-ester; $X^2$ to $X^6$ are each independently selected from optionally substituted aryl, optionally substituted aromatic heterocycle, or an optionally substituted aromatic mixed ring system, optionally substituted ($C_1$-$C_{24}$)-alkyl, optionally substituted ($C_1$-$C_{24}$)-heteroalkyl, optionally substituted ($C_1$-$C_{24}$)-alkenyl, optionally substituted ($C_{1-12}$)-heteroalkenyl, optionally substituted ($C_{2-12}$)-alkynyl, optionally substituted ($C_2$-$C_{12}$)-heteroalkynyl, optionally substituted ($C_3$-$C_{12}$)-cycloalkyl, optionally substituted ($C_4$-$C_{12}$)-cycloalkenyl, optionally substituted heterocycle, optionally substituted ($C_1$-$C_{24}$)-alkoxy, optionally substituted ($C_1$-$C_{24}$)-ester; an n is an integer selected from 1 to 1000. In yet another embodiment, the monomer comprising boronic acid groups comprise the structure of Formula IV(a), Formula IV(b), Formula IV(c), Formula IV(d), Formula IV(e), Formula IV(f), Formula IV(g), Formula IV(h) and/or Formula IV(i):

Formula IV(a)

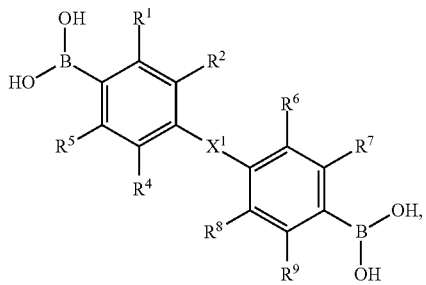

Formula IV(b)

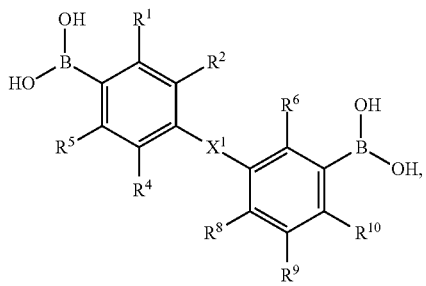

Formula IV(c)

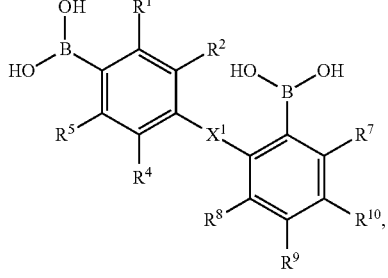

Formula IV(d)

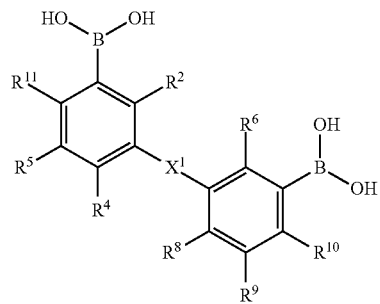

Formula IV(e)

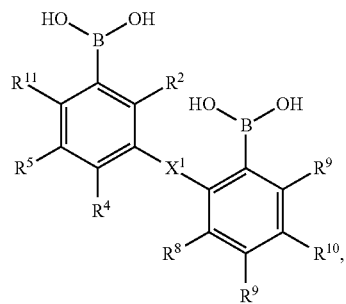

Formula IV(f)

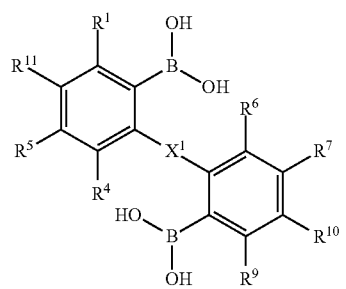

Formula IV(g)

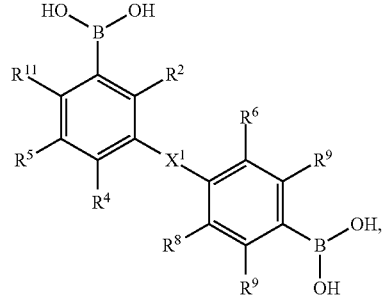

Formula IV(h)

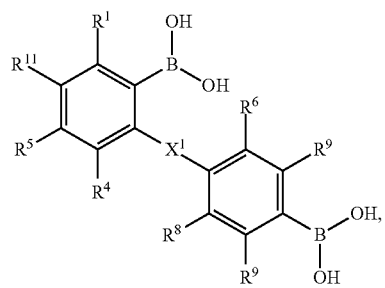

and/or

Formula IV(i)

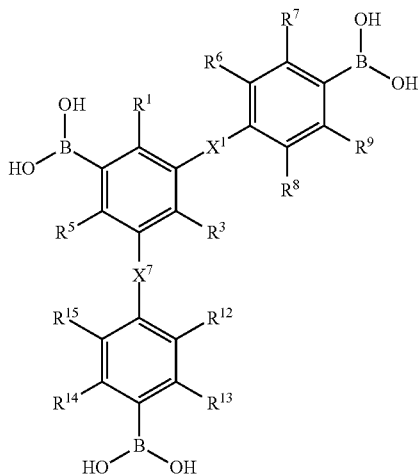

wherein, $X^1$ is selected from optionally substituted ($C_3$-$C_{24}$)-alkyl, optionally substituted ($C_3$-$C_{24}$)-heteroalkyl, optionally substituted ($C_3$-$C_{24}$)-alkenyl, optionally substituted ($C_{3-12}$)-heteroalkenyl, optionally substituted ($C_{3-12}$)-alkynyl, optionally substituted ($C_3$-$C_{12}$)-heteroalkynyl, optionally substituted ($C_3$-$C_{12}$)-cycloalkyl, optionally substituted ($C_5$-$C_{12}$)-cycloalkenyl, optionally substituted heterocycle, optionally substituted ($C_3$-$C_{24}$)-alkoxy, optionally substituted ($C_3$-$C_{24}$)-ester; $X^7$ is selected from optionally substituted ($C_3$-$C_{24}$)-alkyl, optionally substituted ($C_3$-$C_{24}$)-heteroalkyl, optionally substituted ($C_3$-$C_{24}$)-alkenyl, optionally substituted ($C_{3-12}$)-heteroalkenyl, optionally substituted ($C_{3-12}$)-alkynyl, optionally substituted ($C_3$-$C_{12}$)-heteroalkynyl, optionally substituted ($C_5$-$C_{12}$)-cycloalkyl, optionally substituted ($C_5$-$C_{12}$)-cycloalkenyl, optionally substituted heterocycle, optionally substituted ($C_3$-$C_{24}$)-alkoxy, optionally substituted ($C_3$-$C_{24}$)-ester; and $R^1$-$R^{15}$ are independently selected from the group consisting of H, D, aryl, heterocycle, ($C_1$-$C_6$)-alkyl, ($C_1$-$C_6$)-heteroalkyl, ($C_2$-$C_6$)-alkenyl, ($C_2$-$C_6$)-heteroalkenyl, ($C_{2-6}$)-alkynyl, ($C_2$-$C_6$)-heteroalkynyl, ($C_1$-$C_6$)-alkoxy, ($C_1$-$C_6$)-ester, halo, hydroxyl, anhydride, boronic acid, boronic ester, carbonyl, carboxyl, carbonate, carboxylate, aldehyde, haloformyl, hydroperoxy, peroxy, ether, orthoester, carboxamide, amine, imine, imide, azide, azo, cyanate, isocyanate, nitrate, nitrite, isonitrile, nitroso, nitro, nitrosooxy, pyridyl, sulfide, disulfide, sulfinyl, sulfo, thiocyanate, isothiocyanate, carbonothioyl, phosphino, phosphono, and phosphate. In a further embodiment, the monomer comprising boronic acid groups comprise the structure of Formula V(a), Formula V(b), or Formula V(c):

Formula V(a)

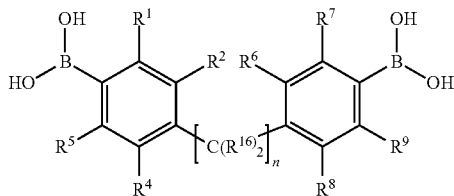

Formula V(b)

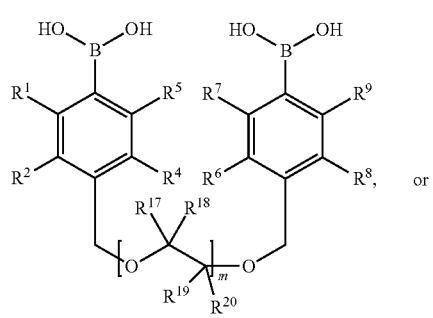

Formula V(c)

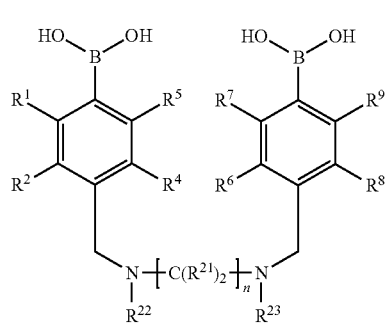

wherein, $R^1$, $R^2$, $R^4$, $R^5$, and $R^6$-$R^9$ are independently selected from the group consisting of H, D, aryl, heterocycle, ($C_1$-$C_{24}$)-alkyl, ($C_1$-$C_{24}$)-heteroalkyl, ($C_2$-$C_{24}$)-alkenyl, ($C_{2-24}$)-heteroalkenyl, ($C_{2-24}$)-alkynyl, ($C_2$-$C_{24}$)-heteroalkynyl, ($C_3$-$C_{24}$)-cycloalkyl, ($C_4$-$C_{24}$)-cycloalkenyl, ($C_1$-$C_{24}$)-alkoxy, ($C_1$-$C_{24}$)-ester, halo, hydroxyl, anhydride, carbonyl, carboxyl, carbonate, carboxylate, aldehyde, boronic acid, boronic ester, haloformyl, hydroperoxy, peroxy, ether, orthoester, carboxamide, amine, imine, imide, azide, azo, cyanate, isocyanate, nitrate, nitrite, isonitrile, nitroso, nitro, nitrosooxy, pyridyl, sulfide, disulfide, sulfinyl, sulfo, thiocyanate, isothiocyanate, carbonothioyl, phosphino, phosphono, and phosphate; $R^{16}$-$R^{23}$ are independently selected from the group consisting of H, D, halo, ($C_1$-$C_4$)alkyl, hydroxyl, and amine; m is an integer selected from 1, 2, 3, 4, 5, 6, 7, 8, 9, 10, 12, 13, 14, 15, 16, 17, 18, 19, or 20; and n is an integer selected from 3, 4, 5, 6, 7, 8, 9, 10, 12, 13, 14, 15, 16, 17, 18, 19, or 20. In a certain embodiment, the monomer comprising boronic acid groups comprise the structure of:

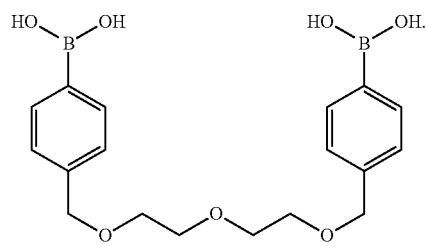 [SMILES: OB(O)c1ccc(COCCOCCOCc2ccc(B(O)O)cc2)cc1]

In another embodiment, a dynamic thermosetting polymer disclosed herein further comprises one or more comonomers having the structure of Formula I and/or Formula II:

Formula I

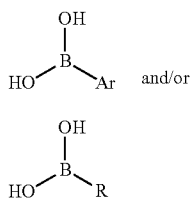

and/or

Formula II

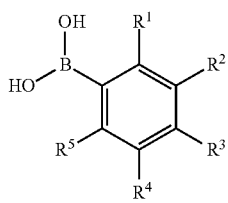

wherein, Ar is selected from aryl, aromatic heterocycle, or an aromatic mixed ring system, wherein each of the foregoing groups comprise one or more substituents, and wherein at least one substituent is a boronic acid group; and R is selected from aryl, heterocycle, $(C_1-C_{24})$-alkyl, $(C_1-C_{24})$-heteroalkyl, $(C_1-C_{24})$-alkenyl, $(C_{1-12})$-heteroalkenyl, $(C_{2-12})$-alkynyl, $(C_2-C_{12})$-heteroalkynyl, $(C_3-C_{12})$-cycloalkyl, $(C_4-C_{12})$-cycloalkenyl, $(C_1-C_{24})$-alkoxy, $(C_1-C_{24})$-ester, mixed ring system, or any combination a the foregoing groups, wherein each of the foregoing groups comprise one or more substituents, wherein at least one substituent is a boronic acid group. In a further embodiment, the dynamic thermosetting polymer comprises one or more comonomers having the structure of Formula IV:

Formula IV

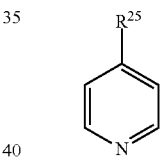

wherein, $R^1$-$R^5$ are independently selected from the group consisting of H, D, aryl, heterocycle, $(C_1-C_{24})$-alkyl, $(C_1-C_{24})$-heteroalkyl, $(C_2-C_{24})$-alkenyl, $(C_2-C_{24})$-heteroalkenyl, $(C_{2-24})$-alkynyl, $(C_2-C_{25})$-heteroalkynyl, $(C_3-C_{24})$-cycloalkyl, $(C_4-C_{24})$-cycloalkenyl, $(C_1-C_{24})$-alkoxy, $(C_1-C_{24})$-ester, halo, hydroxyl, anhydride, boronic acid, boronic ester, carbonyl, carboxyl, carbonate, carboxylate, aldehyde, haloformyl, hydroperoxy, peroxy, ether, orthoester, carboxamide, amine, imine, imide, azide, azo, cyanate, isocyanate, nitrate, nitrite, isonitrile, nitroso, nitro, nitrosooxy, pyridyl, sulfide, disulfide, sulfinyl, sulfo, thiocyanate, isothiocyanate, carbonothioyl, phosphino, phosphono, and phosphate, wherein at least one of $R^1$ to $R^5$ is an aryl, $(C_1-C_{24})$-alkyl, a $(C_1-C_{24})$-heteroalkyl, a $(C_1-C_{24})$-alkenyl, a $(C_{1-12})$-heteroalkenyl, a $(C_{2-12})$-alkynyl, a $(C_2-C_{12})$-heteroalkynyl, a $(C_3-C_{12})$-cycloalkyl, a $(C_4-C_{12})$-cycloalkenyl, a heterocycle, a $(C_1-C_{24})$-alkoxy, and a $(C_1-C_{24})$-ester, wherein for each of the foregoing groups the groups comprise one or more substituents, wherein at least one substituent is a boronic acid group. In another embodiment, a dynamic thermosetting polymer of the disclosure is formed from boronic acid-containing polymers that are prepared by incorporating or linking monomers that comprise boronic acid functional groups with monomers or comonomers that do not comprise boronic functional groups by using a step step-growth polymerization method, a chain-growth polymerization method, a ring-opening polymerization method, and an olefin metathesis polymerization method. In yet another embodiment, a dynamic thermosetting polymer of the disclosure is formed from boronic acid-containing polymers that are made by functionalizing polymers made using step-growth ring-opening polymerization method, a chain-growth polymerization method, a polymerization method, and an olefin metathesis polymerization method, with boronic acid groups. In a particular embodiment, the disclosure further provides for a dynamic thermosetting polymer disclosed herein which further comprises a plasticizer. Examples of plasticizers include, but are not limited to, Bis(2-ethylhexyl) phthalate, Bis(2-propylheptyl) phthalate, Diisononyl phthalate, Di-n-butyl phthalate, Butyl benzyl phthalate, Diisodecyl phthalate, Dioctyl phthalate, Diisooctyl phthalate, Diethyl phthalate, Diisobutyl phthalate, Di-n-hexyl phthalate, Trimethyl trimellitate, Tri-(2-ethylhexyl) trimellitate, Tri-(n-octyl,n-decyl) trimellitate, Tri-(heptyl, nonyl) trimellitate, n-octyl trimellitate, Bis(2-ethylhexyl) adipate, Dimethyl adipate, Monomethyl adipate, Dioctyl adipate, Dibutyl sebacate, Dibutyl maleate, Diisobutyl maleate, dioctyl terephthalate, 1,2-Cyclohexane dicarboxylic acid diisononyl ester, Alkyl sulphonic acid phenyl ester, N-ethyl toluene sulfonamide, N-(2-hydroxypropyl) benzene sulfonamide, N-(n-butyl) benzene sulfonamide, Tricresyl phosphate, Tributyl phosphate, Triethylene glycol dihexanoate, Tetraethylene glycol diheptanoate, Acetylated monoglycerides, Triethyl citrate, Acetyl triethyl citrate, Tributyl citrate, Acetyl tributyl citrate, Trioctyl citrate, Acetyl trioctyl citrate, Trihexyl citrate, Acetyl trihexyl citrate, Butyryl trihexyl citrate, Trimethyl citrate, Methyl ricinoleate, Epoxidized soybean oil, Epoxidized vegetable oils, amine-based plasticizer and pyridine-based plasticizer. In a further embodiment, the plasticizer is a pyridine-based plasticizer or amine-based plasticizer. In yet a further embodiment, the pyridine-based plasticizer has the structure of:

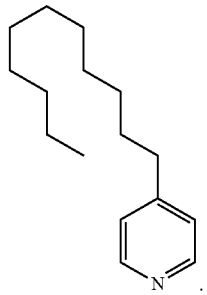

wherein, $R^{25}$ is selected from an aryl, $(C_1-C_{24})$-alkyl, a $(C_1-C_{24})$-heteroalkyl, a $(C_1-C_{24})$-alkenyl, a $(C_{1-12})$-heteroalkenyl, a $(C_{2-12})$-alkynyl, a $(C_2-C_{12})$-heteroalkynyl, a $(C_3-C_{12})$-cycloalkyl, a $(C_4-C_{12})$-cycloalkenyl, a heterocycle, a $(C_1-C_{24})$-alkoxy, and a $(C_1-C_{24})$-ester. In another embodiment, $R^{25}$ is a $(C_{10}-C_{24})$-alkyl, or $(C_{10}-C_{24})$alkoxy. In yet another embodiment, the pyridine-based plasticizer has the structure of:

In yet another embodiment, the dynamic thermosetting polymer of claim 8, wherein the ratio of the plasticizer to a boronic acid group(s) of the monomers is from 1 to 3. In a further embodiment, the polymer exhibits a Young's modulus of at least 500 MPa. In yet a further embodiment, the polymer exhibits a Young's modulus between 500 MPa to 800 MPa. In a certain embodiment, the polymer exhibits a tensile strength of at least 17 MPa. In another embodiment, the polymer exhibits a tensile strength between 17 MPa to 40 MPa. In yet another embodiment the dynamic thermosetting polymer exhibits minimal loss in tensile stress-strain when reprocessed. In a further embodiment, the polymer is used as an adhesive, sealant, thermal insulation, composite material, surface coating, for casting and encapsulation, for print circuit boards, or for laminating.

DESCRIPTION OF DRAWINGS

FIG. 1A-B provides a design concept for malleable thermosets. (A) Malleable boroxine networks. (B) Putative boroxine exchange mechanism for network malleability.

FIG. 2A-B presents variable temperature peak coalescence for boroxine dynamic exchange. (A) Chemical structures of exchanging boroxines. (B) $^1$H NMR peaks for the benzylic methylene's next to the oxygen (marked with an *) at different temperatures.

FIG. 3A-B provides a scheme for the synthesis of (A) ((((oxybis(ethane-2,1-diyl))bis(oxy))bis(methylene))bis(4,1-phenylene))diboronic acid (DBA) and (B) boroxine thermoset (BXT).

DETAILED DESCRIPTION

Figure 4:
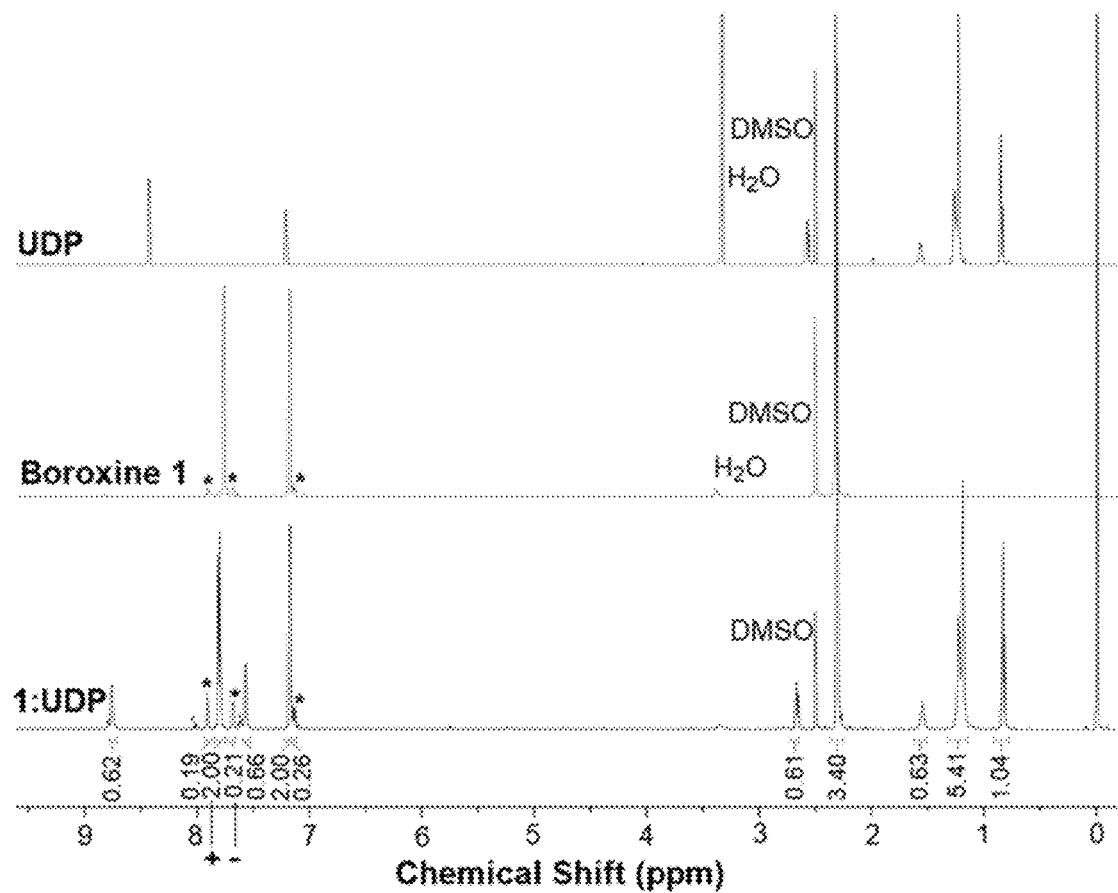
FIG. 4 provides an $^1$H NMR spectrum of 1:UDP (600 MHz, DMSO-$d_6$, 298 K) The spectra are stacked with UDP and 1 for comparison. Unreacted boronic acid is marked with an asterisk (*) and residual pyridine is marked with a prime ('). Integration for boroxine 1 used in the calculation is shown by +, and the integration used for residual 4-methylphenylboronic acid is represented by −.

As used herein and in the appended claims, the singular forms "a," "an," and "the" include plural referents unless the context clearly dictates otherwise. Thus, for example, reference to "a dynamic polymer" includes a plurality of such dynamic polymers and reference to "the thermoset" includes reference to one or more thermosets and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although many methods and reagents are similar or equivalent to those described herein, the exemplary methods and materials are disclosed herein.

All publications mentioned herein are incorporated by reference in full for the purpose of describing and disclosing methodologies that might be used in connection with the description herein. Moreover, with respect to any term that is presented in one or more publications that is similar to, or identical with, a term that has been expressly defined in this disclosure, the definition of the term as expressly provided in this disclosure will control in all respects.

The term "alkenyl", refers to an organic group that is comprised of carbon and hydrogen atoms that contains at least one double covalent bond between two carbons. Typically, an "alkenyl" as used in this disclosure, refers to organic group that contains 2, 3, 4, 5, 6, 7, 8, 9, 10, 11, 12, 13, 14, 15, 16, 17, 18, 19, 20, or 30 carbon atoms, or any range of carbon atoms between or including any two of the foregoing values. While a $C_2$-alkenyl can form a double bond to a carbon of a parent chain, an alkenyl group of three or more carbons can contain more than one double bond. In certain instances, the alkenyl group will be conjugated, in other cases an alkenyl group will not be conjugated, and yet other cases the alkenyl group may have stretches of conjugation and stretches of nonconjugation. Additionally, if there is more than 2 carbon, the carbons may be connected in a linear manner, or alternatively if there are more than 3 carbons then the carbons may also be linked in a branched fashion so that the parent chain contains one or more secondary, tertiary, or quaternary carbons. An alkenyl may be substituted or unsubstituted, unless stated otherwise.

The term "alkyl", refers to an organic group that is comprised of carbon and hydrogen atoms that contains single covalent bonds between carbons. Typically, an "alkyl" as used in this disclosure, refers to an organic group that contains 1, 2, 3, 4, 5, 6, 7, 8, 9, 10, 11, 12, 13, 14, 15, 16, 17, 18, 19, 20, or 30 carbon atoms, or any range of carbon atoms between or including any two of the foregoing values. Where if there is more than 1 carbon, the carbons may be connected in a linear manner, or alternatively if there are more than 2 carbons then the carbons may also be linked in a branched fashion so that the parent chain contains one or more secondary, tertiary, or quaternary carbons. An alkyl may be substituted or unsubstituted, unless stated otherwise.

The term "alkynyl", refers to an organic group that is comprised of carbon and hydrogen atoms that contains a triple covalent bond between two carbons. Typically, an "alkynyl" as used in this disclosure, refers to organic group that contains that contains 2, 3, 4, 5, 6, 7, 8, 9, 10, 11, 12, 13, 14, 15, 16, 17, 18, 19, 20, or 30 carbon atoms, or any range of carbon atoms between or including any two of the foregoing values. While a $C_2$-alkynyl can form a triple bond to a carbon of a parent chain, an alkynyl group of three or more carbons can contain more than one triple bond. Where if there is more than 3 carbon, the carbons may be connected in a linear manner, or alternatively if there are more than 4 carbons then the carbons may also be linked in a branched fashion so that the parent chain contains one or more secondary, tertiary, or quaternary carbons. An alkynyl may be substituted or unsubstituted, unless stated otherwise.

The term "aryl", as used in this disclosure, refers to a conjugated planar ring system with delocalized pi electron clouds that contain only carbon as ring atoms. An "aryl" for the purposes of this disclosure encompasses from 1 to 5 aryl rings wherein when the aryl is greater than 1 ring the aryl rings are joined so that they are linked, fused, or a combination thereof. An aryl may be substituted or unsubstituted, or in the case of more than one aryl ring, one or more rings may be unsubstituted, one or more rings may be substituted, or a combination thereof.

The term generally represented by the notation "$C_x$-$C_y$" (where x and y are whole integers and y>x) prior to a functional group, e.g., "$C_1$-$C_{12}$ alkyl" refers to a number range of carbon atoms. For the purposes of this disclosure any range specified by "$C_x$-$C_y$" (where x and y are whole integers and y>x) is not exclusive to the expressed range, but is inclusive of all possible ranges that include and fall within the range specified by "$C_x$-$C_y$" (where x and y are whole integers and y>x). For example, the term "$C_1$-$C_4$" provides express support for a range of 1 to 4 carbon atoms, but further provides implicit support for ranges encompassed by 1 to 4 carbon atoms, such as 1 to 2 carbon atoms, 1 to 3 carbon atoms, 2 to 3 carbon atoms, 2 to 4 carbon atoms, and 3 to 4 carbon atoms.

The term "cycloalkenyl", as used in this disclosure, refers to an alkene that contains at least 4 carbon atoms but no more than 12 carbon atoms connected so that it forms a ring. A "cycloalkenyl" for the purposes of this disclosure encompasses from 1 to 4 cycloalkenyl rings, wherein when the cycloalkenyl is greater than 1 ring, then the cycloalkenyl rings are joined so that they are linked, fused, or a combination thereof. A cycloalkenyl may be substituted or unsubstituted, or in the case of more than one cycloalkenyl ring, one or more rings may be unsubstituted, one or more rings may be substituted, or a combination thereof.

The term "cycloalkyl", as used in this disclosure, refers to an alkyl that contains at least 3 carbon atoms but no more than 12 carbon atoms connected so that it forms a ring. A "cycloalkyl" for the purposes of this disclosure encompasses from 1 to 4 cycloalkyl rings, wherein when the cycloalkyl is greater than 1 ring, then the cycloalkyl rings are joined so that they are linked, fused, or a combination thereof. A cycloalkyl may be substituted or unsubstituted, or in the case of more than one cycloalkyl ring, one or more rings may be unsubstituted, one or more rings may be substituted, or a combination thereof.

The term "hetero-" when used as a prefix, such as, hetero-alkyl, hetero-alkenyl, hetero-alkynyl, or hetero-hydrocarbon, for the purpose of this disclosure refers to the specified hydrocarbon having one or more carbon atoms replaced by non-carbon atoms as part of the parent chain. Examples of such non-carbon atoms include, but are not limited to, N, O, S, Si, Al, B, and P. If there is more than one non-carbon atom in the hetero-based parent chain then this atom may be the same element or may be a combination of different elements, such as N and O. In a particular embodiment, a "hetero"-hydrocarbon (e.g., alkyl, alkenyl, alkynyl) refers to a hydrocarbon that has from 1 to 3 C, N and/or S atoms as part of the parent chain.

The term "heterocycle," as used herein, refers to ring structures that contain at least 1 noncarbon ring atom. A "heterocycle" for the purposes of this disclosure encompass from 1 to 5 heterocycle rings, wherein when the heterocycle is greater than 1 ring the heterocycle rings are joined so that they are linked, fused, or a combination thereof. A heterocycle may be aromatic or nonaromatic, or in the case of more than one heterocycle ring, one or more rings may be nonaromatic, one or more rings may be aromatic, or a combination thereof. A heterocycle may be substituted or unsubstituted, or in the case of more than one heterocycle ring one or more rings may be unsubstituted, one or more rings may be substituted, or a combination thereof. Typically, the noncarbon ring atom is N, G, S, Si, Al, B, or P. In the case where there is more than one noncarbon ring atom, these noncarbon ring atoms can either be the same element, or combination of different elements, such as N and O. Examples of heterocycles include, but are not limited to: a monocyclic heterocycle such as, aziridine, oxirane, thiirane, azetidine, oxetane, thietane, pyrrolidine, pyrroline, imidazolidine, pyrazolidine, pyrazoline, dioxolane, sulfolane 2,3-dihydrofuran, 2,5-dihydrofuran tetrahydrofuran, thiophane, piperidine, 1,2,3,6-tetrahydro-pyridine, piperazine, morpholine, thiomorpholine, pyran, thiopyran, 2,3-dihydropyran, tetrahydropyran, 1,4-dihydropyridine, 1,4-dioxane, 1,3-dioxane, dioxane, homopiperidine, 2,3,4,7-tetrahydro-1H-azepine homopiperazine, 1,3-dioxepane, 4,7-dihydro-1,3-dioxepin, and hexamethylene oxide; and polycyclic heterocycles such as, indole, indoline, isoindoline, quinoline, tetrahydroquinoline, isoquinoline, tetrahydroisoquinoline, 1,4-benzodioxan, coumarin, dihydrocoumarin, benzofuran, 2,3-dihydrobenzofuran, isobenzofuran, chromene, chroman, isochroman, xanthene, phenoxathiin, thianthrene, indolizine, isoindole, indazole, purine, phthalazine, naphthyridine, quinoxaline, quinazoline, cinnoline, pteridine, phenanthridine, perimidine, phenanthroline, phenazine, phenothiazine, phenoxazine, 1,2-benzisoxazole, benzothiophene, benzoxazole, benzthiazole, benzimidazole, benztriazole, thioxanthine, carbazole, carboline, acridine, pyrolizidine, and quinolizidine. In addition to the polycyclic heterocycles described above, heterocycle includes polycyclic heterocycles wherein the ring fusion between two or more rings includes more than one bond common to both rings and more than two atoms common to both rings. Examples of such bridged heterocycles include quinuclidine, diazabicyclo[2.2.1]heptane and 7-oxabicyclo[2.2.1]heptane.

The terms "heterocyclic group", "heterocyclic moiety", "heterocyclic", or "heterocyclo" used alone or as a suffix or prefix, refers to a heterocycle that has had one or more hydrogens removed therefrom.

The term "hydrocarbons" refers to groups of atoms that contain only carbon and hydrogen. Examples of hydrocarbons that can be used in this disclosure include, but are not limited to, alkanes, alkenes, alkynes, arenes, and benzyls.

The term "substituent" refers to an atom or group of atoms substituted in place of a hydrogen atom, e.g., a boronic acid group. For purposes of this invention, a substituent would include deuterium atoms. Examples of substituents include, but are not limited to, halo (e.g., F, Cl, Br or I), optionally substituted oxygen containing functional group (e.g., alcohol, ketone, aldehyde, acyl halide, carbonate, carboxylic acid, ester, and ether), optionally substituted nitrogen containing functional group (e.g., amide, amine, imine, azide, cyanate, azo, nitrate, nitrile, nitro, and nitroso), optionally substituted sulfur containing functional group (e.g., thiol, sulfide, disulfide, sulfoxide, sulfone, sulfinic acid, sulfonic acid, thiocyanate, thione, and thial), optionally substituted phosphorous containing functional group (e.g., phosphine, phosphonic acid, phosphate, phosphodiester), optionally substituted boron containing functional group (e.g., boronic acid, and boronic ester). Further examples of substituents include, but are not limited to, aryl, heterocycle, alkyl, heteroalkyl, alkenyl, heteroalkenyl, alkynyl, heteroalkynyl, cycloalkyl, alkoxy, ester, halo, hydroxyl, anhydride, carbonyl, carboxyl, carbonate, carboxylate, aldehyde, boronic acid, boronic ester, haloformyl, ester, hydroperoxy, peroxy, ether, orthoester, carboxamide, amine, imine, imide, azide, azo, cyanate, isocyanate, nitrate, nitrite, isonitrile, nitroso, nitro, nitrosooxy, pyridyl, sulfide, disulfide, sulfinyl, sulfo, thiocyanate, isothiocyanate, carbonothioyl, phosphino, phosphono, and phosphate.

The term "substituted" with respect to hydrocarbons, heterocycles, and the like, refers to structures wherein the parent chain contains one or more substituents.

The term "unsubstituted" with respect to hydrocarbons, heterocycles, and the like, refers to structures wherein the parent chain contains no substituents.

Several reports have described malleable thermosets by introducing dynamic covalent linkages into networks. Such malleable thermosets were called covalent adaptable networks (CANs) or vitrimers. Thermally triggered malleability was demonstrated in a network material using transesterification reactions under Lewis acid catalysis. These thermosets showed glasslike malleability yet retained their mechanical properties and solvent resistance like traditional thermosets. Several other malleable thermosets have been reported by using trithiocarbonate exchange, urethane exchange, vinylogous urethane transamidation, olefin metathesis, imine exchange, boronic ester exchange, thiol-Michael reaction, carbonate exchange, and transalkylation as the dynamic covalent chemistries. Despite these important progresses, it remains a challenge to design mechanically strong and highly malleable thermosets that are not only reprocessable, but also easily recyclable to monomers.

Boronic ester has been shown as a viable dynamic covalent motif for malleable and healable polymers. In addition to boronic esters, boroxine is another interesting motif formed by simple dehydration of organic boronic acids. The boroxine motif has been used for several materials applications, including flame retardants, covalent organic framework (COF), and polymers. However, boroxine has not been reported for making malleable polymers. It was envisaged that boroxine chemistry can be used to design recyclable, strong and dynamic polymer networks.

Presented herein are innovative boroxine-based thermoset polymers that are strong, highly malleable, and completely reprocessable and recyclable (see FIG. 1). The network synthesis is simple (dehydration) and generally applicable to any boronic acid-based monomers. The boroxine-based thermoset polymers of the disclosure, which are also termed dynamic thermosetting polymers herein, comprise a plurality of boroxine crosslinks having the structure of:

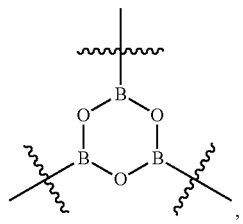

formed from monomers comprising boronic acid groups, or formed from polymers comprising boronic acid groups. As indicated further herein, the dynamic thermosetting polymer of the disclosure in certain embodiments can comprise a mixture of monomers and/or comonomers, whereby a portion of the monomers and/or comonomers have boronic acid groups, while another portion of the monomers and/or comonomers do not comprise boronic acid groups. In regards to the later portion, these monomers and/or comonomers can optionally be functionalized with boronic acid groups. The monomers and/or comonomers which comprise or are functionalized boronic acids groups can have any structure, but typically have structural flexibility so as to allow for formation of boroxine crosslinks from multiple available boronic acid groups (i.e., dynamic bond formation). Thus, the dynamic thermosetting polymer of the disclosure is far more ductile and malleable than far more rigid structures, like covalent organic frameworks (COFs). Examples of the structures of the boronic acid-containing or boronic acid functionalized monomers and comonomers disclosed herein, include, but are not limited to monomers or comonomers having the general structure of Formula A-E:

linear polymers
having aliphatic
boronic acid on
chain ends

Formula A

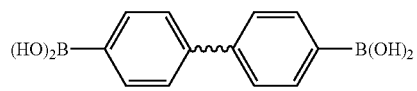

linear polymers having aromatic
boronic acid on chain ends

Formula B

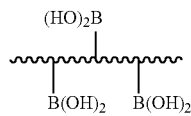

linear polymers having
aliphatic boronic acid
groups attached to
backbone

Formula C

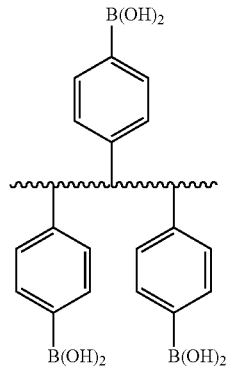

linear polymers having
aromatic boronic acid
groups attached
to backbone

Formula D

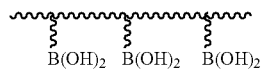

various branched polymers,
including hyperbranched
polymers having aliphatic or
aromatic boronic acid groups Formula E As shown in the Examples presented herein, the boroxine-based thermoset polymers disclosed herein can be exemplary synthesized by using boronic acid-based monomers and/or comonomers, as well as boronic acid-containing polymers, that are crosslinked together by boroxine crosslinks having the structure of:

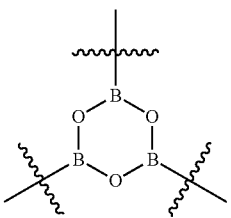

Boronic acid-containing polymers can be made by various polymerization methods known in the art using boronic acid-containing monomers or comonomers, or prepared by functionalization of various preformed polymers with boronic acid groups. These boronic acid functionalized polymers are then joined together by boroxine crosslinks having the structure of:

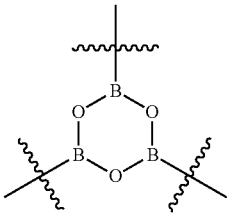 [SMILES: *B1OB(*)OB(*)O1]

by using, e.g., the dehydration methods disclosed herein. In such a case, the polymers can be made by any of the various polymerization methods known in the art, including but not limited to, step-growth polymerization, various chain-growth polymerizations (radical, cationic, anionic, transition metal-catalyze coordination, etc), ring-opening polymerization, olefin metathesis polymerization, etc. Examples of polymers that can be used to make the boroxine-based thermoset polymers disclosed herein include, but are not limited to, poly(buta-1,3-diene), polyurethanes, ABS, silicones, polyamide 6, polyamide 6,6, polyester, poly(propenonitrile), poly(ethene), poly(propene), poly(chloroethene), polyvinyl chloride, and poly(tetrafluoroethene). Any borylation chemistries can be used to functionalize the prepared polymers, such as metal-catalyzed C—H borylation reactions for functionalizing aliphatic and aromatic C—H bonds to C—B bonds; Miyaura Borylation reaction; electrophilic borylation of aryl Grignard reagents; photoinduced borylation of haloarenes; borylation of organolithium groups; etc. Accordingly, in another embodiment, a dynamic thermosetting polymer of the disclosure is formed from boronic acid-containing polymers that are made by functionalizing polymers made using step-growth polymerization method, a chain-growth polymerization method, a ring-opening polymerization method, and an olefin metathesis polymerization method, with boronic acid groups. An additional example of a method to prepare the boroxine-based thermoset polymers disclosed herein include incorporating monomers or comonomers containing boronic functional groups with monomers or comonomers that do not contain boronic functional groups into polymers made by various polymerization methods,—including step-growth polymerization, various chain-growth polymerizations (radical, cationic, anionic, transition metal-catalyze coordination, etc), ring-opening polymerization, olefin metathesis polymerization, etc. In such a case, the monomers that do not comprise boronic acid groups may optionally be functionalized with boronic acid groups, using the borylation chemistries noted above or other boron-based chemistries. For example, various co-polymers can be made using the various polymerization methods which incorporate monomers or comonomers containing boronic acid functional groups with monomers that do not contain boronic acid groups, such as alternating co-polymers, random co-polymers, block co-polymers, and graft co-polymers:

Accordingly, in a particular embodiment, a dynamic thermosetting polymer of the disclosure is formed from boronic acid-containing polymers that are prepared by incorporating or linking monomers that comprise boronic acid functional groups with monomers or comonomers that do not comprise boronic functional groups by using a step step-growth polymerization method, a chain-growth polymerization method, a ring-opening polymerization method, and an olefin metathesis polymerization method. Thus, the disclosure is not limited in the particular polymerization method disclosed in the Examples, but any number of polymerization methods and techniques can be used to make the dynamic thermosetting polymer or thermoset of the disclosure.

In a particular embodiment, a dynamic thermosetting polymer or thermoset of the disclosure comprises a plurality of boroxine crosslinks having the structure of:

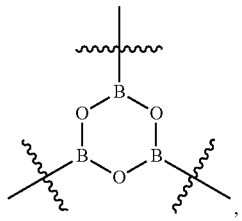 [SMILES: *B1OB(*)OB(*)O1]

formed from a monomer and/or a comonomer comprising a boronic acid group having the structure of Formula I and/or Formula II:

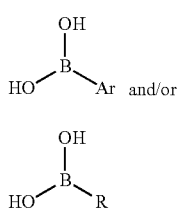

wherein,

Ar is selected from aryl, aromatic heterocycle, or an aromatic mixed ring system, wherein each of the foregoing groups comprise one or more substituents, and wherein at least one substituent is a boronic acid group; and R is selected from aryl, heterocycle, $(C_1$-$C_{24})$-alkyl, $(C_1$-$C_{24})$-heteroalkyl, $(C_1$-$C_{24})$-alkenyl, $(C_{1-12})$-heteroalkenyl, $(C_{2-12})$-alkynyl, $(C_2$-$C_{12})$-heteroalkynyl, $(C_3$-$C_{12}))$-cycloalkyl, $(C_4$-$C_{12})$-cycloalkenyl, $(C_1$-$C_{24})$-alkoxy, $(C_1$-$C_{24})$-ester, mixed ring system, or any combination of the foregoing groups, wherein each of the foregoing groups comprise one or more substituents, wherein at least one substituent is a boronic acid group. In a further embodiment, the one or more substituents are selected from halo (e.g., F, Cl, Br or I), optionally substituted oxygen containing functional group (e.g., alcohol, ketone, aldehyde, acyl halide, carbonate, carboxylic acid, ester, and ether), optionally substituted nitrogen containing functional group (e.g., amide, amine, imine, azide, cyanate, azo, nitrate, nitrile, nitro, and nitroso), optionally substituted sulfur containing functional group (e.g., thiol, sulfide, disulfide, sulfoxide, sulfone, sulfinic acid, sulfonic acid, thiocyanate, thione, and thial), optionally substituted phosphorous containing functional group (e.g., phosphine, phosphonic acid, phosphate, phosphodiester), optionally substituted boron containing functional group (e.g., boronic acid, and boronic ester). In yet a further embodiment, the one or more substituents are selected from aryl, heterocycle, alkyl, heteroalkyl, alkenyl, heteroalkenyl, alkynyl, heteroalkynyl, cycloalkyl, alkoxy, ester, halo, hydroxyl, anhydride, carbonyl, carboxyl, carbonate, carboxylate, aldehyde, boronic acid, boronic ester, haloformyl, ester, hydroperoxy, peroxy, ether, orthoester, carboxamide, amine, imine, imide, azide, azo, cyanate, isocyanate, nitrate, nitrite, isonitrile, nitroso, nitro, nitrosooxy, pyridyl, sulfide, disulfide, sulfinyl, sulfa, thiocyanate, isothiocyanate, carbonothioyl, phosphino, phosphono, and phosphate.

In a further embodiment, a dynamic thermosetting polymer or thermoset of the disclosure comprises a plurality of boroxine crosslinks having the structure of:

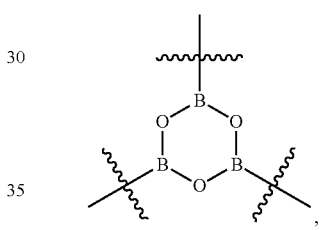

formed from a monomer and/or a comonomer comprising boronic acid groups having the structure of Formula III(a), Formula III(b), Formula III(c), Formula III(d) and/or Formula III(e):

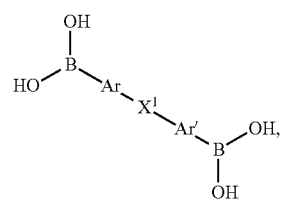

Formula III(a)

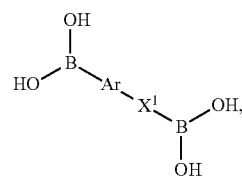

Formula III(b)

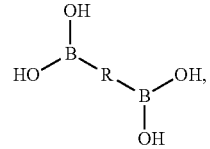

Formula III(c)

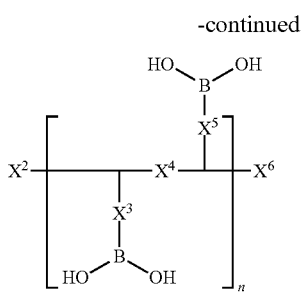

Formula III(d)

and/or

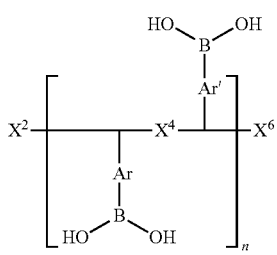

Formula III(e)

wherein,

Ar is selected from optionally substituted aryl, optionally substituted aromatic heterocycle, or an optionally substituted aromatic mixed ring system;

Ar' is selected from optionally substituted aryl, optionally substituted aromatic heterocycle, or an optionally substituted aromatic mixed ring system;

R is selected from optionally substituted $(C_1-C_{24})$-alkyl, optionally substituted $(C_1-C_{24})$-heteroalkyl, optionally substituted $(C_1-C_{24})$-alkenyl, optionally substituted $(C_1-C_{12})$-heteroalkenyl, optionally substituted $(C_{2-12})$-alkynyl, optionally substituted $(C_2-C_{12})$-heteroalkynyl, optionally substituted $(C_3-C_{12})$-cycloalkyl, optionally substituted $(C_4-C_{12})$-cycloalkenyl, optionally substituted $(C_1-C_{24})$-alkoxy, optionally substituted $(C_1-C_{24})$-ester, or any combination of the foregoing groups; and $X^1$ is absent or selected from optionally substituted $(C_1-C_{24})$-alkyl, optionally substituted $(C_1-C_{24})$-heteroalkyl, optionally substituted $(C_1-C_{24})$-alkenyl, optionally substituted $(C_{1-12})$-heteroalkenyl, optionally substituted $(C_{2-12})$-alkynyl, optionally substituted $(C_2-C_{12})$-heteroalkynyl, optionally substituted $(C_3-C_{12})$-cycloalkyl, optionally substituted $(C_4-C_{12})$-cycloalkenyl, optionally substituted heterocycle, optionally substituted $(C_1-C_{24})$-alkoxy, optionally substituted $(C_1-C_{24})$-ester;

$X^2$ to $X^6$ are each independently selected from optionally substituted aryl, optionally substituted aromatic heterocycle, or an optionally substituted aromatic mixed ring system, optionally substituted $(C_1-C_{24})$-alkyl, optionally substituted $(C_1-C_{24})$-heteroalkyl, optionally substituted $(C_1-C_{24})$-alkenyl, optionally substituted $(C_{1-12})$-heteroalkenyl, optionally substituted $(C_{2-12})$-alkynyl, optionally substituted $(C_2-C_{12})$-heteroalkynyl, optionally substituted $(C_3-C_{12})$-cycloalkyl, optionally substituted $(C_4-C_{12})$-cycloalkenyl, optionally substituted heterocycle, optionally substituted $(C_1-C_{24})$-alkoxy, optionally substituted $(C_1-C_{24})$-ester; and n is an integer selected from 1, 2, 3, 4, 5, 6, 7, 8, 9, 10, 15, 20, 25, 30, 35, 40, 45, 50, 60, 70, 80, 90, 100, 150, 200, 250, 300, 400, 500, 1000, 10000, or a range that is between or includes any two of the foregoing integers. In a particular embodiment, $X^1$ is an $(C_3-C_{24})$-alkoxy, $(C_5-C_{24})$-alkyl, or $(C_4-C_{24})$-heteroalkyl wherein the $(C_5-C_{24})$-alkyl or the $(C_4-C_{24})$-heteroalkyl may be further substituted with halo, hydroxyl, amine and/or boronic acid groups. In a further embodiment, $X^2$ to $X^6$ are each independently selected from $(C_3-C_{24})$-alkoxy, $(C_5-C_{24})$-alkyls, and $(C_4-C_{24})$-heteroalkyls, wherein each of the foregoing groups may be further substituted with halo, hydroxyl, and/or amine groups.

In another embodiment, a dynamic thermosetting polymer or thermoset of the disclosure comprises a plurality of boroxine crosslinks having the structure of:

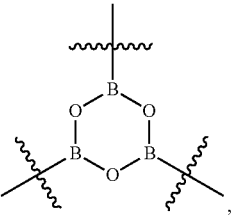 [SMILES: *B1OB(*)OB(*)O1]

formed from a monomer and/or a comonomer comprising a boronic acid group having the structure of Formula IV:

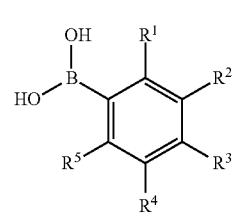

Formula IV wherein, $R^1$-$R^5$ are independently selected from the group consisting of H, D, aryl, $(C_1-C_{24})$-alkyl, $(C_1-C_{24})$-heteroalkyl, $(C_2-C_{24})$-alkenyl, $(C_{2-24})$-heteroalkenyl, $(C_{2-24})$-alkynyl, $(C_2-C_{24})$-heteroalkynyl, $(C_3-C_{24})$-cycloalkyl, $(C_4-C_{24})$-cycloalkenyl, $(C_1-C_{24})$-alkoxy, $(C_1-C_{24})$-ester, halo (e.g., F, Cl, Br or I), optionally substituted oxygen containing functional group (e.g., alcohol, ketone, aldehyde, acyl halide, carbonate, carboxylic acid, ester, and ether), optionally substituted nitrogen containing functional group (e.g., amide, amine, imine, azide, cyanate, azo, nitrate, nitrile, nitro, and nitroso), optionally substituted sulfur containing functional group thiol, sulfide, disulfide, sulfoxide, sulfone, sulfinic acid, sulfonic acid, thiocyanate, thione, and thial), optionally substituted phosphorous containing functional group (e.g., phosphine, phosphonic acid, phosphate, phosphodiester), optionally substituted boron containing functional group (e.g., boronic acid, boronic ester, borinic acid, and borinic ester), optionally substituted aryl, and optionally substituted heterocycle, wherein at least one of $R^1$ to $R^5$ is an aryl, $(C_1-C_{24})$-alkyl, a $(C_1-C_{24})$-heteroalkyl, a $(C_1-C_{24})$-alkenyl, a $(C_{1-12})$-heteroalkenyl, a $(C_{2-12})$-alkynyl, a $(C_2-C_{12})$-heteroalkynyl, a $(C_3-C_{12})$-cycloalkyl, a $(C_4-C_{12})$-cycloalkenyl, a heterocycle, a $(C_1-C_{24})$-alkoxy, and a $(C_1-C_{24})$-ester, wherein for each of the foregoing groups the groups comprise one or more substituents, wherein at least one substituent is a boronic acid group.

In yet another embodiment, a dynamic thermosetting polymer or thermoset of the disclosure comprises a plurality of boroxine cross links having the structure of:

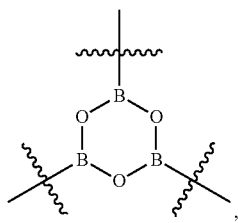 [SMILES: *B1OB(*)OB(*)O1]
formed from a monomer and/or a comonomer comprising a boronic acid group having the structure of Formula IV(a), Formula IV(b), Formula IV(c), Formula IV(d), Formula IV(e), Formula IV(f), Formula IV(g), Formula IV(h) and/or Formula IV(i):
Formula IV(a)
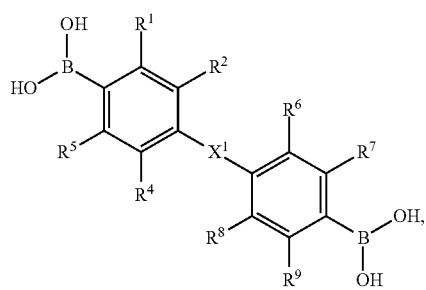
Formula IV(b)
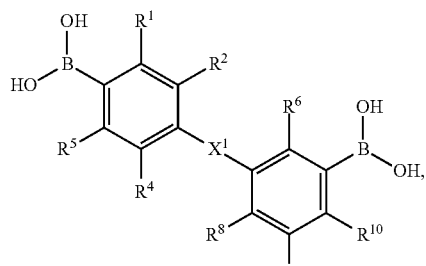
Formula IV(c)
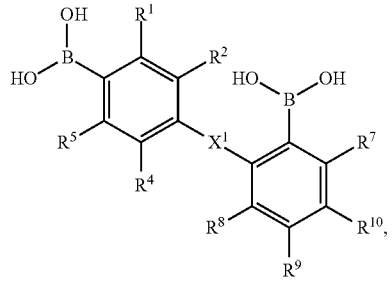
Formula IV(d)
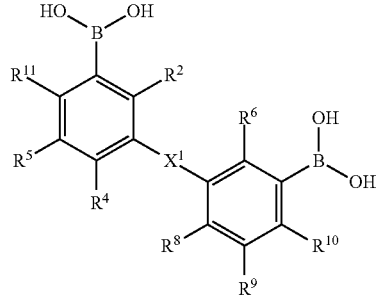
Formula IV(e)
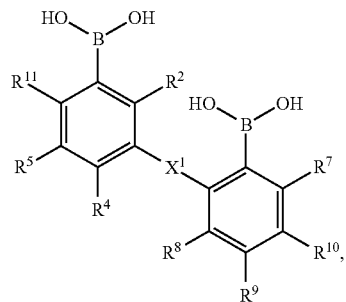
Formula IV(f)
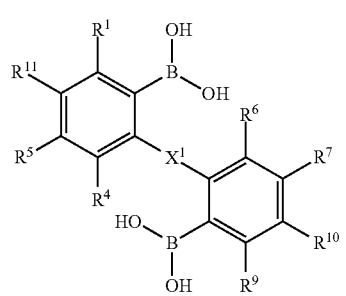
Formula IV(g)
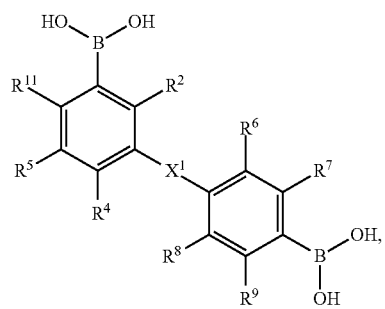
Formula IV(h)
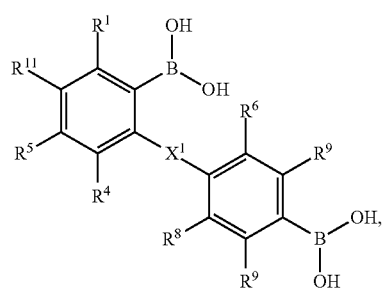
and/or -continued Formula IV(i)

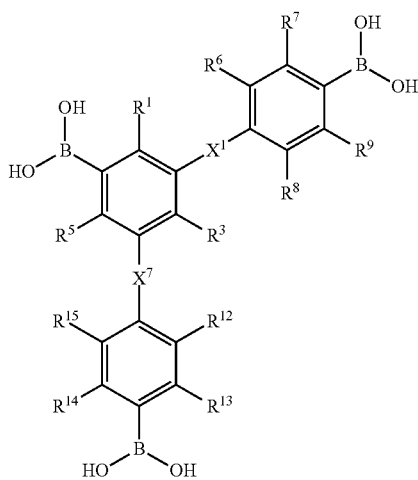

wherein, $X^1$ is absent or selected from optionally substituted ($C_1$-$C_{24}$)-alkyl, optionally substituted ($C_1$-$C_{24}$)-heteroalkyl, optionally substituted ($C_1$-$C_{24}$)-alkenyl, optionally substituted ($C_{1-12}$)-heteroalkenyl, optionally substituted ($C_{2-12}$)-alkynyl, optionally substituted ($C_2$-$C_{12}$)-heteroalkynyl, optionally substituted ($C_3$-$C_{12}$)-cycloalkyl, optionally substituted ($C_4$-$C_{12}$)-cycloalkenyl, optionally substituted heterocycle, optionally substituted ($C_1$-$C_{24}$)-alkoxy, optionally substituted ($C_1$-$C_{24}$)-ester;

$X^7$ is absent or selected from optionally substituted ($C_1$-$C_{24}$)-alkyl, optionally substituted ($C_1$-$C_{24}$)-heteroalkyl, optionally substituted ($C_1$-$C_{24}$)-alkenyl, optionally substituted ($C_{1-12}$)-heteroalkenyl, optionally substituted ($C_{2-12}$)-alkynyl, optionally substituted ($C_2$-$C_{12}$)-heteroalkynyl, optionally substituted ($C_3$-$C_{12}$)-cycloalkyl, optionally substituted ($C_4$-$C_{12}$)-cycloalkenyl, optionally substituted heterocycle, optionally substituted ($C_1$-$C_{24}$)-alkoxy, optionally substituted ($C_1$-$C_{24}$)-ester; and $R^1$-$R^{15}$ are independently selected from the group consisting of H, D, aryl, ($C_1$-$C_{24}$)-alkyl, ($C_1$-$C_{24}$)-heteroalkyl, ($C_2$-$C_{24}$)-alkenyl, ($C_{2-24}$)-heteroalkenyl, ($C_{2-24}$)-alkynyl, ($C_2$-$C_{24}$)-heteroalkynyl, ($C_3$-$C_{24}$)-cycloalkyl, ($C_4$-$C_{24}$)-cycloalkenyl, ($C_1$-$C_{24}$)-alkoxy, ($C_1$-$C_{24}$)-ester, halo (e.g., F, Cl, Br or I), optionally substituted oxygen containing functional group (e.g., alcohol, ketone, aldehyde, acyl halide, carbonate, carboxylic acid, ester, and ether), optionally substituted nitrogen containing functional group (e.g., amide, amine, imine, azide, cyanate, azo, nitrate, nitrile, nitro, and nitroso), optionally substituted sulfur containing functional group (e.g., thiol, sulfide, disulfide, sulfoxide, sulfone, sulfinic acid, sulfonic acid, thiocyanate, thione, and thial), optionally substituted phosphorous containing functional group (e.g., phosphine, phosphonic acid, phosphate, phosphodiester), optionally substituted boron containing functional group (e.g., boronic acid, boronic ester, borinic acid, and borinic ester), optionally substituted aryl, and optionally substituted heterocycle.

In yet a further embodiment, a dynamic thermosetting polymer or thermoset of the disclosure comprises a plurality of boroxine crosslinks having the structure of:

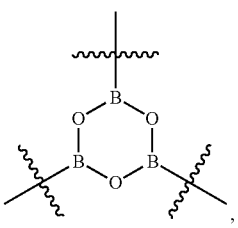 [SMILES: *B1OB(*)OB(*)O1]

formed from a monomer and/or a comonomer comprising a boronic acid group having the structure of Formula V(a) and/or Formula V(b):

Formula V (a)

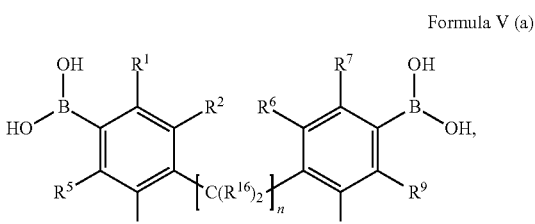

Formula V (b)

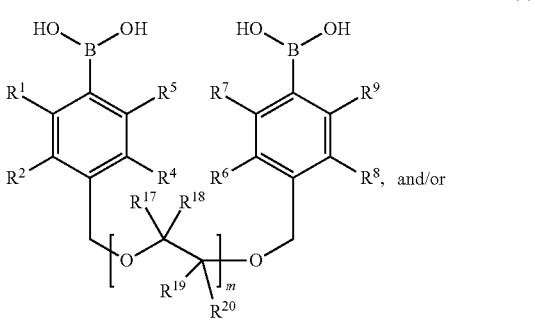

, and/or

Formula V (c)

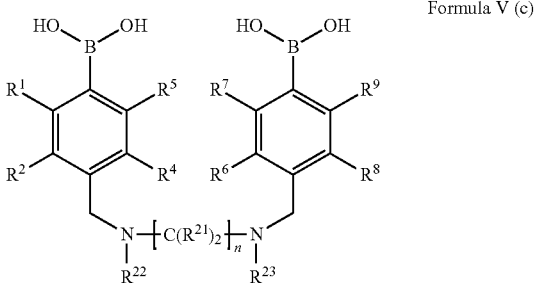

wherein, $R^1$, $R^2$, $R^4$, $R^5$, and $R^6$-$R^9$ are independently selected from the group consisting of H, D, aryl, ($C_1$-$C_{24}$)-alkyl, ($C_1$-$C_{24}$)-heteroalkyl, ($C_2$-$C_{24}$)-alkenyl, ($C_{2-24}$)-heteroalkenyl, ($C_{2-24}$)-alkynyl, ($C_2$-$C_{24}$)-heteroalkynyl, ($C_3$-$C_{24}$)-cycloalkyl, ($C_4$-$C_{24}$)-cycloalkenyl, ($C_1$-$C_{24}$)-alkoxy, ($C_1$-$C_{24}$)-ester, halo (e.g., F, Cl, Br or I), optionally substituted oxygen containing functional group (e.g., alcohol, ketone, aldehyde, acyl halide, carbonate, carboxylic acid, ester, and ether), optionally substituted nitrogen containing functional group (e.g., amide, amine, imine, azide, cyanate, azo, nitrate, nitrile, nitro, and nitroso), optionally substituted sulfur containing functional group (e.g., thiol, sulfide, disulfide, sulfoxide, sulfone, sulfinic acid, sulfonic acid, thiocyanate, thione, and thial), optionally substituted phosphorous containing functional group (e.g., phosphine, phosphonic acid, phosphate, phosphodiester), optionally substituted boron containing functional group (e.g., boronic acid, boronic ester, borinic acid, and borinic ester), optionally substituted aryl, and optionally substituted heterocycle;

$R^{16}$-$R^{23}$ are independently selected from the group consisting of H, D, halo, $(C_1$-$C_4)$alkyl, hydroxyl, and amine;

m is an integer selected from 1, 2, 3, 4, 5, 6, 7, 8, 9, 10, 12, 13, 14, 15, 16, 17, 18, 19, or 20, or a range that includes or is between any two of the foregoing values; and n is an integer selected from 1, 2, 3, 4, 5, 6, 7, 8, 9, 10, 12, 13, 14, 15, 16, 17, 18, 19, or 20, or a range that includes or is between any two of the foregoing values.

In yet a further embodiment, a dynamic thermosetting polymer or thermoset of the disclosure comprises a plurality of boroxine crosslinks having the structure of:

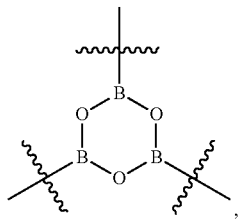

formed from a monomer and/or a comonomer comprising a boronic acid group having the structure of:

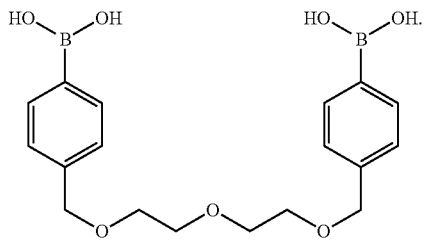

In yet a further embodiment, the dynamic thermosetting polymer further comprises one or more plasticizers that enhance the dynamics of polymer chains. Examples of plasticizers include, but are not limited to, Bis(2-ethylhexyl) phthalate, Bis(2-propylheptyl) phthalate, Diisononyl phthalate, Di-n-butyl phthalate, Butyl benzyl phthalate, Diisodecyl phthalate, Dioctyl phthalate, Diisooctyl phthalate, Diethyl phthalate, Diisobutyl phthalate, Di-n-hexyl phthalate, Trimethyl trimellitate, Tri-(2-ethylhexyl) trimellitate, Tri-(n-octyl,n-decyl) trimellitate, Tri-(heptyl,nonyl) trimellitate, n-octyl trimellitate, Bis(2-ethylhexyl)adipate, Dimethyl adipate, Monomethyl adipate, Dioctyl adipate, Dibutyl sebacate, Dibutyl maleate, Diisobutyl maleate, dioctyl terephthalate, 1,2-Cyclohexane dicarboxylic acid diisononyl ester, Alkyl sulphonic acid phenyl ester, N-ethyl toluene sulfonamide, N-(2-hydroxypropyl) benzene sulfonamide, N-(n-butyl) benzene sulfonamide, Tricresyl phosphate, Tributyl phosphate, Triethylene glycol dihexanoate, Tetraethylene glycol diheptanoate, Acetylated monoglycerides, Triethyl citrate, Acetyl triethyl citrate, Tributyl citrate, Acetyl tributyl citrate, Trioctyl citrate, Acetyl trioctyl citrate, Trihexyl citrate, Acetyl trihexyl citrate, Butyryl trihexyl citrate, Trimethyl citrate, Methyl ricinoleate, Epoxidized soybean oil, Epoxidized vegetable oils, amine-based plasticizers and pyridine-based plasticizers. In a particular embodiment, the plasticizer is an amine-based plasticizer or pyridine-based plasticizer. In a further embodiment, the pyridine-based plasticizer has a structure of:

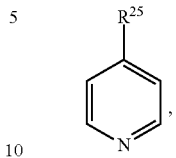

wherein, $R^{25}$ is selected from an aryl, $(C_1$-$C_{24})$-alkyl, a $(C_1$-$C_{24})$-heteroalkyl, a $(C_1$-$C_{24})$-alkenyl, a $(C_{1\text{-}12})$-heteroalkenyl, a $(C_{2\text{-}12})$-alkynyl, a $(C_2$-$C_{12})$-heteroalkynyl, a $(C_3$-$C_{12})$-cycloalkyl, a $(C_4$-$C_{12})$-cycloalkenyl, a heterocycle, a $(C_1$-$C_{24})$-alkoxy, and a $(C_1$-$C_{24})$-ester. In a particular embodiment, $R^{25}$ is a $(C_{10}$-$C_{24})$-alkyl, or $(C_{10}$-$C_{24})$-alkoxy.

Consistent with thermoset structure, the dynamic thermosetting polymer is insoluble in normal organic solvents. The dynamic thermosetting polymers described herein exhibit unusual mechanical behavior. For example, the dynamic thermosetting polymers of the disclosure are highly malleable and exhibit vitrimer-like properties while also showing high tensile and strain strength. The bulk malleability of the boroxine thermoset was corroborated with the dynamic exchange of small molecule boroxines observed with variable temperature $^1$H NMR experiments. In a particular embodiment, the dynamic thermosetting polymers of the disclosure exhibit a Young's modulus of at least 10 MPa, 20 MPa, 30 MPa, 40 MPa, 50 MPa, 100 MPa, 150 MPa, 200 MPa, 250 MPa, 300 MPa, 350 MPa, 400 MPa, 425 MPa, 450 MPa, 475 MPa, 500 MPa, 510 MPa, 520 MPa, 530 MPa, 540 MPa, 550 MPa, 560 MPa, 570 MPa, 580 MPa, 590 MPa, 600 MPa, 610 MPa, 620 MPa, 630 MPa, 640 MPa, 650 MPa, 660 MPa, 670 MPa, 680 MPa, 690 MPa, 700 MPa, 750 MPa, 800 MPa, 850 MPa, 900 MPa, 1000 MPa, 1500 MPa, 2000 MPa, 3000 MPa, 4000 MPa, 5000 MPa, 6000 MPa, 7000 MPa, 8000 MPa, 9000 MPa, or 10,000 MPa, or a range that includes or is between any two of the foregoing values. In a particular embodiment, the dynamic thermosetting polymers of the disclosure exhibit a Young's modulus of at least 550 MPa. In yet another embodiment, the dynamic thermosetting polymers of the disclosure exhibit a tensile strength of at least 1 MPa, 2 MPa, 3 MPa, 4 MPa, 5 MPa, 6 MPa, 7 MPa, 8 MPa, 9 MPa, 10 MPa, 11 MPa, 12 MPa, 13 MPa, 14 MPa, 15 MPa, 16 MPa, 17 MPa, 18 MPa, 19 MPa, 20 MPa, 21 MPa, 22 MPa, 23 MPa, 24 MPa, 25 MPa, 30 MPa, 35 MPa, 40 MPa, 45 MPa, or 50 MPa, or a range that includes or is between any two of the foregoing values.

The dynamic thermosetting polymers of the disclosure were found to be not only reprocessable, but also fully recyclable back to the boronic acid monomer. The strikingly high malleability of the boroxine thermosets described herein is reminiscent of the high adaptability of a commodity material, Silly Putty™ (a toy that contains viscoelastic liquid silicone, Crayola LLC). However, a major difference is that the thermoset of the disclosure is strong (e.g., Young's modulus >0.5 GPa, and tensile strength >17 MPa) while Silly Putty™ is soft and elastomeric. With a combination of unusual properties (strong, highly malleable, and recyclable) and a multitude of tunable variables (monomer structure, comonomer, plasticizer), it was envisioned that the boroxine thermoset described herein to be a platform for the development of a range of new dynamic materials. For example, the dynamic thermosetting polymers of the disclosure can be used in any number of applications, including as an adhesive, as a sealant, as thermal insulation, as a caulk, as a composite material, for casting and encapsulation, as a surface coating, for print circuit boards, for laminating, etc.

The following examples are intended to illustrate but not limit the disclosure. While they are typical of those that might be used, other procedures known to those skilled in the art may alternatively be used.

EXAMPLES

Chemicals and Reagents:

nBuLi (1.6 M in hexanes) was purchased from Arcos Organics. Magnesium Sulfate and methanol (MeOH) were purchased from Avantor Performance Materials, Inc. 4-Methylphenylboronic acid (98% purity) was purchased from Combi-Blocks. Hydrochloric acid (37%, diluted to 1 M) was purchased from EMD Millipore Corporation. Diethyl ether, tetrahydrofuran (THF), toluene and pyridine (99.9% purity) were purchased from Fischer Chemical. 4-Bromobenzylbromide (99% purity) was purchased from Oakwood Chemical. Sodium hydride (60% dispersion in mineral oil) and triisopropylborate (98% purity) were purchased from Sigma-Aldrich. Deuterated methanol ($CD_3OD$, 99.8% D), chloroform ($CDCl_3$, 99.8% D) and dimethyl sulfoxide (DMSO-$d_6$, 99.9% D) were purchased from Cambridge Isotope Laboratories, Inc. All commercial reagents were used as received unless otherwise noted.

General Information:

Unless otherwise noted, reactions were carried out with a magnetic stir bar under a nitrogen atmosphere. Anhydrous solvents were purified through a column of alumina before use. Flash column chromatography was performed by forced flow of indicated solvent using automated silica columns (CombiFlash, Teledyne Isco). FT-IR spectra were recorded on a Jasco FT/IR-4700 ATR-PRO ONE. $^1$H NMR spectra were recorded at 500 MHz on a CRYO-500 spectrometer or at 600 MHz on an AVANCE-600 spectrometer. $^1$H NMR chemical shifts are reported as δ values in ppm relative to TMS or residual solvent: $CDCl_3$ (7.26 ppm; 77.0 ppm), DMSO-$d_6$ (2.50 ppm; 39.5 ppm). $^1$H NMR data are reported as follows: chemical shift in ppm, multiplicity (s=singlet, d=doublet, t=triplet), coupling constants in Hz, and relative integration in number of protons. Multiplets (m) are reported over the range of chemical shift at which they appear. For $^{13}$C NMR, only chemical shift values are reported. For boronic acid compounds, the ipso carbon resonances were not observed as is consistent with the literature. For known compounds, only $^1$H NMR data are shown. Tensile tests were performed on an Instron 3365 machine. Creep tests were performed on a TA instruments Q800 DMA in tension geometry. Stress-Relaxation tests were performed on a TA instruments Q800 DMA in compression geometry. Karl-Fisher titrations were performed using a Mettler-Toledo DL37 KF Coulometer.

Synthesis of small molecule model compound for boroxine exchange kinetic studies:

Scheme 1. Synthesis of small molecule boroxine 1.

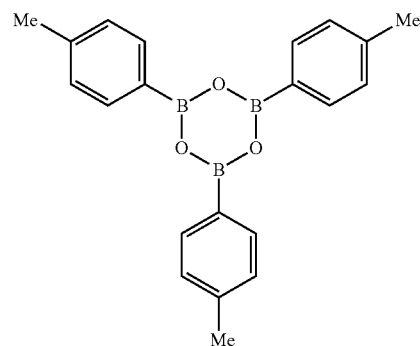

Scheme 2. Synthesis of small molecule boroxine 2

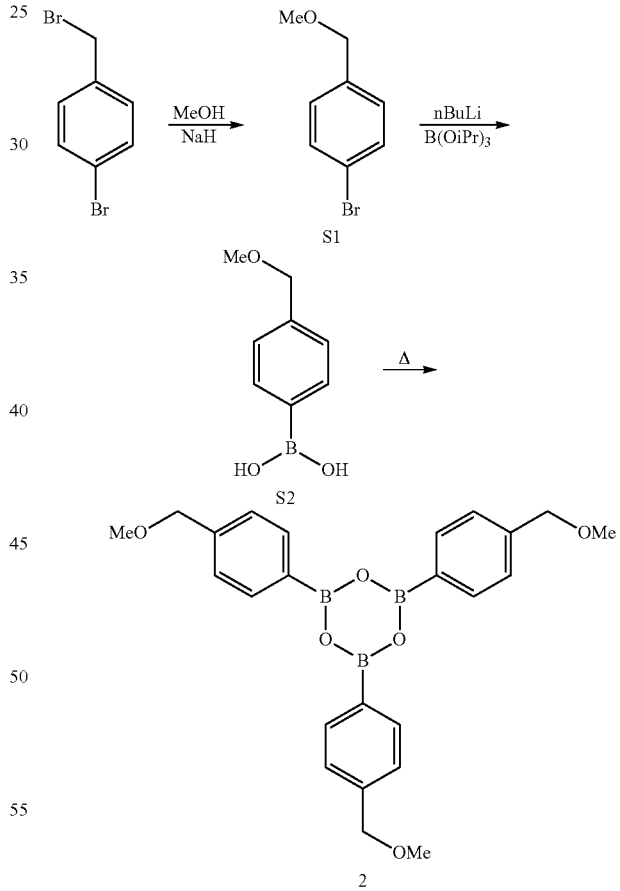

Synthesis of 1.

4-Methylphenylboronic acid (100 mg, 0.735 mmol, 3 eq.) was added to a vial and heated at 125° C. for 12 hours under high vacuum (0.02 mmHg). Boroxine 1 was isolated as a white powder (75 mg, 0.212 mmol, 86% yield) $^1$H NMR (600 MHz, DMSO-$d_6$) δ 7.76 (d, J=7.6 Hz, 6H), 7.18 (d, J=7.6 Hz, 6H), 2.32 (s, 9H).

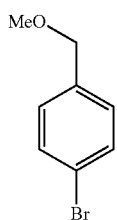

S1

Synthesis of S1:

Sodium hydride (1.2 g, 60% dispersion in mineral oil, 30 mmol, 1.5 eq) was added to RBF (100 mL). Sodium hydride was washed with THF (3×10 mL) to remove the mineral oil. THF (30 mL) was then added. MeOH (0.97 mL, 0.769 g, 24 mmol, 1.2 eq.) was added slowly. After stirring at rt for 15 min, 4-bromobenzylbromide (5 g, 20 mmol, 1 eq.) was added to the flask. The reaction was heated at reflux overnight. After cooling, water was added dropwise to the reaction until bubbling ceased. The mixture was then poured into water (50 mL) and extracted with diethyl ether (3×30 mL). The combined organics were washed with brine (50 mL) and dried over anhydrous MgSO$_4$. After filtering through celite, the crude product was concentrated in vacuo to provide an oil. The resulting oil was purified by column chromatography (gradient 100% hexanes to 50% Ethyl acetate/hexanes) to provide S1 as a clear oil (3.52 g, 17.5 mmol, 88% yield). $^1$H NMR (600 MHz, CDCl$_3$) δ 7.48 (d, J=8.2 Hz, 2H), 7.22 (dd, J=0.4, 8.2 Hz, 2H), 4.42 (s, 2H), 3.39 (s, 3H); $^{13}$C NMR (151 MHz, CDCl$_3$) δ 137.2, 131.5, 129.3, 121.5, 73.9, 58.2.

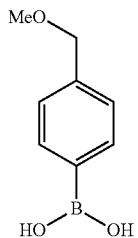

S2

Synthesis of S2:

nBuLi in hexanes (18.6 mL, 1.6 M, 29.8 mmol) was added dropwise to a solution of S1 (3.6 mL, 5.0 g, 24.9 mmol) in THF (20 mL) and toluene (80 mL) at −78° C. After stirring for one hour, B(OiPr)$_3$ (6.9 mL, 5.6 g, 29.8 mmol) was added slowly. The mixture was allowed to warm to −20° C. then 1M HCl was added. (100 mL). After allowing the mixture to warm to room temp, it was transferred to a separatory funnel with the aid of THF (100 mL). After layer separation, the organic layer was washed with water (100 mL) and brine (100 mL). The solution was filtered through celite and the solvent removed in vacuo. The crude solid was then recrystallized from water to provide S2 as a white solid (1.5 g, 9.04 mmol, 36% yield). $^1$H NMR (600 MHz, DMSO-d$_6$) δ 8.00 (s, 2H), 7.77 (d, J=7.9 Hz, 2H), 7.27 (d, J=7.8 Hz, 2H), 4.40 (s, 2H), 3.28 (s, 3H); $^{13}$C NMR (151 MHz, DMSO-d$_6$) δ 140.1, 134.1, 126.4, 73.6, 57.5; HRMS (ES$^-$) calculated for C$_9$H$_{12}$BO$_5$ (M$^+$ formate)$^-$ 211.0780, found 211.0749.

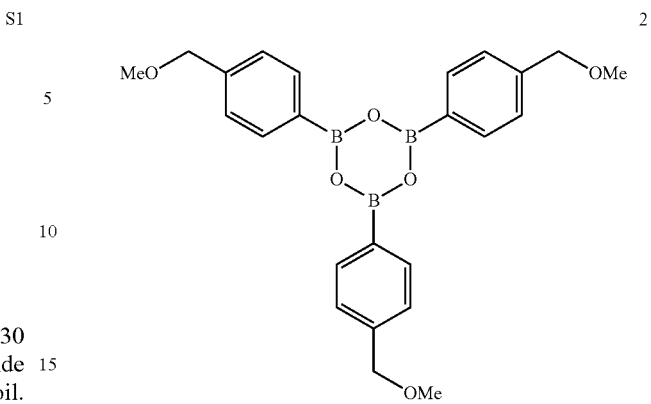

2

Synthesis of 2.

Boronic acid S2 (100 mg, 0.602 mmol, 3 eq.) was added to a vial and heated at 125° C. for 12 hours under high vacuum (0.02 mmHg). Boroxine 2 was isolated as a white powder (64 mg, 0.144 mmol, 72% yield). $^1$H NMR (600 MHz, DMSO-d$_6$) δ 7.86 (d, J=7.8 Hz, 6H), 7.32 (d, J=7.8 Hz, 6H), 4.43 (s, 6H), 3.29 (s, 6H); $^{13}$C NMR (151 MHz, DMSO-d$_6$) δ 139.5, 133.4, 126.6, 73.8, 57.5; HRMS (ES−) m/z calculated for C$_{24}$H$_{28}$B$_3$O$_7$ (M+OH) 461.2127, found 461.2165.

Synthesis of 4-Undecylpyridine (UDP) as the Plasticizer for Boroxine Thermosets.

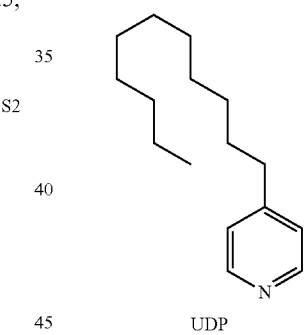

UDP

UDP was prepared following Hulst et al. (*Eur. J. Org. Chem.* 2004, 2004, 835-849). $^1$H NMR (499 MHz, CDCl$_3$) δ 8.48 (d, J=6.1 Hz, 2H), 7.11 (d, J=6.1 Hz, 2H), 2.60 (t, J=8.2 Hz, 2H), 1.68-1.52 (m, 2H), 1.38-1.10 (m, 16H), 0.95-0.74 (m, 3H).

Synthesis of Monomer DBA for Boroxine Formation.

Scheme 3. Synthesis of DBA monomer.

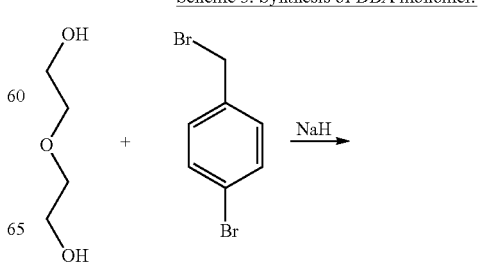

-continued

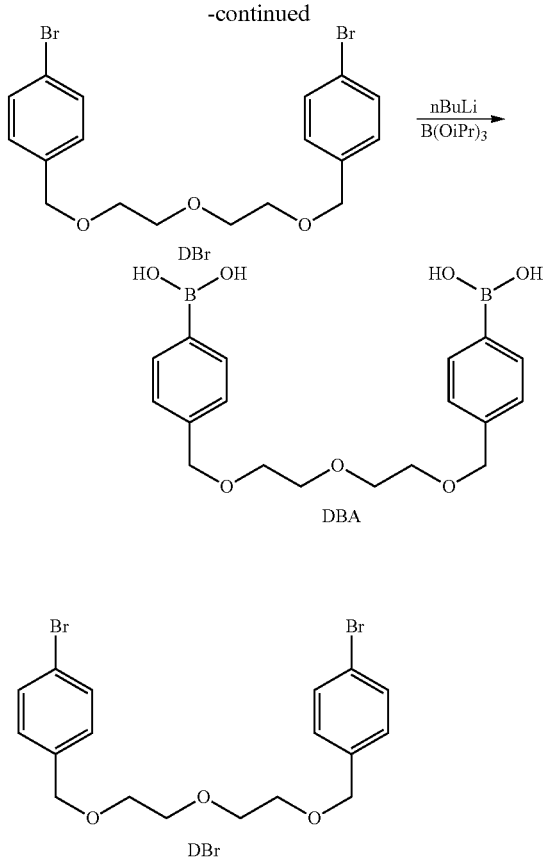

DBr was prepared following the procedure described in Pigge et al. (*Org. Chem.* 2002, 67, 4547-52). $^1$H NMR (500 MHz, CDCl$_3$) δ 7.45 (d, J=8.4 Hz, 4H), 7.21 (d, J=8.2 Hz, 4H), 4.51 (s, 4H), 3.75-3.66 (m, 4H), 3.66-3.57 (m, 4H).

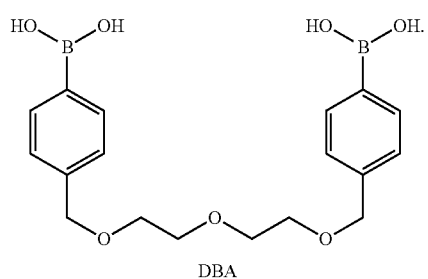 [SMILES: OB(O)c1ccc(COCCOCCOCc2ccc(B(O)O)cc2)cc1]

Synthesis of DBA: nBuLi in hexanes (7 mL, 1.6 M, 10.8 mmol) was added dropwise to a solution of DBr (2 g, 4.5 mmol) in THF (8 mL) and toluene (32 mL) at −78° C. After stirring for one hour, B(OiPr)$_3$ (2.5 mL, 2.03 g, 10.8 mmol) was added slowly. The mixture was allowed to warm to −20° C. then 1M HCl was added (40 mL). After allowing the solution to warm to room temp, the mixture was transferred to a sep funnel with the aid of THF (40 mL). After layer separation, the organic layer was washed with water (40 mL) and brine (40 mL). The solution was filtered through celite and the solvent removed in vacuo. Water (40 mL) was added to the residue and the suspension heated to 75° C. for 20 min. After cooling, chloroform (20 mL) was added and the biphasic mixture was stirred vigorously for 12 hours. After cooling to 0° C., mixture was filtered to give DBA as a white solid (1.22 g, 73% yield). $^1$H NMR (500 MHz, DMSO-d$_6$) δ 8.01 (s, 4H), 7.76 (d, J=8.1 Hz, 4H), 7.28 (d, J=8.1 Hz, 4H), 4.49 (s, 4H), 3.64-3.48 (m, 8H); $^{13}$C NMR (126 MHz, DMSO-d$_6$) δ 140.4, 134.2, 126.5, 72.1, 69.9, 69.3; HRMS (ES+) m/z calculated for C$_{18}$H$_{24}$B$_2$O$_7$ (M$^+$ Na)$^+$ 397.1613, found 397.1622.

Small Molecule Boroxine Exchange Kinetic Study Via $^1$H NMR.

NMR Exchange Experiment:

All operations to set up the NMR exchange experiment were performed in a nitrogen-filled glove box to minimize contamination from atmospheric moisture. Boroxine 1 (12.5 mg, 0.028 mmol, 0.5 eq.) and boroxine 2 (10 mg, 0.028 mmol, 0.5 eq.) were dissolved in 6.5 mL DMSO-d$_6$ in an NMR tube. After shimming and initial acquisition of the $^1$H NMR spectrum, the temperature was gradually increased at 5° C. intervals with an equilibration time of 5 minutes at each temperature. Spectra were collected at temperatures ranging from 20° C. to 120° C.

For pyridine experiments: a solution of pyridine (0.687 mg/mL) in DMSO-d$_6$ was prepared via dilution and 6.5 mL was used as the solvent (total pyridine content 4.46 mg, 0.056 mmol, 1 eq.).

Calculation of the Activation Energy for Boroxine Exchange:

Activation energy for the boroxine exchanges was calculated using the following equation. R is the universal gas constant. $T_c$ is the temperature of coalescence. And Δv is the distance between peaks. As three peaks coalesced in the experiments, the distance between two of them were used to find the activation energy. The benzylic peaks at 4.4 ppm were used to determine $T_c$ and Δv.

$$\Delta G^{\ddagger} = RT_C\left[22.96 + \ln\left(\frac{T_C}{\Delta v}\right)\right]$$

For the boroxine exchange without pyridine, the $T_c$ was found to be 363 K:

$$\Delta G^{\ddagger} = 8.314 \, \frac{J}{mol*K} * 363 \, K * \left[22.96 + \ln\left(\frac{363 \, K}{6.16 \, Hz}\right)\right] =$$

$$81595 \, \frac{J}{mol} = 81.6 \, \frac{kJ}{mol}$$

For the boroxine exchange in presence of pyridine, $T_c$ was found to be 368 K:

$$\Delta G^{\ddagger} = 8.314 \, \frac{J}{mol*K} * 368 \, K * \left[22.96 + \ln\left(\frac{368 \, K}{6.16 \, Hz}\right)\right] =$$

$$82761 \, \frac{J}{mol} = 82.7 \, \frac{kJ}{mol}$$

Representative Procedure for Preparation of Boroxine Thermosets:

DBA (1 g, 1 eq.) was added to a vial along with pyridine (10 mL) and vortexed until dissolved. The solution was cast into a Teflon evaporation dish and allowed to slowly evaporate for 12 hours at room temperature on the bench top. The sample was then heated to 80° C. in an oven under vacuum (0.02 mmHg) for 12 hours to remove residual pyridine. Boroxine thermoset (BXT) films were folded and pressed between Teflon molds heated to 110° C. three times and then pressed into a mold with testable dimensions. Samples were then annealed at 80° C. for 24 hours.

Representative Procedure for Preparation of Boroxine Thermosets with Plasticizer.

DBA (1 g, 1 eq.) and UDP (413 mg, 0.666 eq.) were added to a vial along with pyridine (10 mL) and vortexed until homogenous. The solution was cast into a Teflon evaporation dish and allowed to slowly evaporate for 12 hours at room temperature on the bench top. The sample was then heated to 80° C. in an oven under vacuum (0.02 mmHg) for 12 hours to remove residual solvent. Boroxine thermoset with undecylpyridine (BXT/UDP) films were folded and pressed between Teflon molds heated to 110° C. three times and then pressed into a mold with testable dimensions. Samples were then annealed at 80° C. for 24 hours.

¹H NMR Spectrum of Dissolved Thermosets to Confirm the BXT/UDP Composition.

BXT/UDP (10 mg) network can be fully dissolved in methanol via methanolysis. This reaction was used to verify the composition of the BXT/UDP network. For this purpose, the formed BXT/UDP sample was dissolved in deuterated methanol (0.7 mL) and the ¹H NMR spectrum was obtained. ¹H NMR spectrum confirms that the fully dissolved solution is composed of a mixture of DBA monomer and UDP plasticizer, with the anticipated stoichiometry, i.e., 1 eq. UDP per 3 eq. boron. Calculation: DBA contains 4 benzylic protons and 2 boron atoms, or a 2H/1B ratio. UDP has 2 benzylic protons per UDP molecule. To calculate the boron to UDP ratio, the integrations for the two benzylic peaks are divided: 1 int/boron/0.34 int/UDP=2.94 boron/UDP.

Small Molecule Model Reaction to Confirm Boroxine Formation Under Identical Reaction Condition Used for Boroxine Network Formation.

Scheme 4. Model reaction of small molecule boroxine formation.

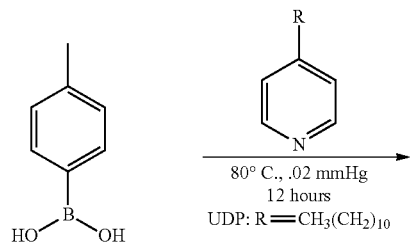

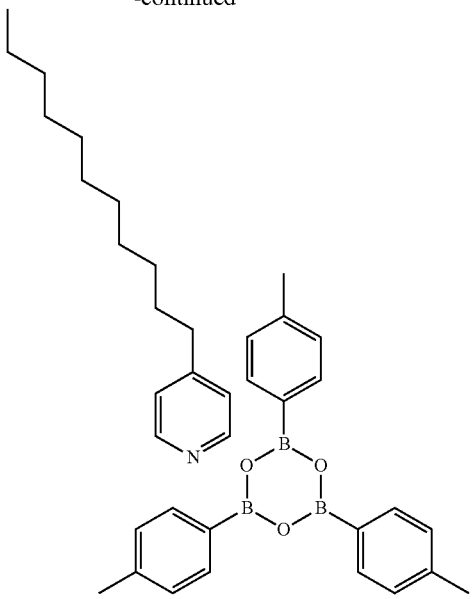

To a vial was added 4-toluene boronic acid (300 mg, 2.2 mmol, 3 eq.), UDP (172 mg, 0.73 mmol, 1 eq.), and pyridine (5 mL). The pyridine was allowed to slowly evaporate at room temp for 12 hours, then the mixture was heated to 80° C. under high vacuum. (0.02 mmHg) for an additional 12 hours. A waxy solid (1:UDP) was isolated. ¹H NMR confirmed boroxine formation (see below).

Calculation.

The aromatic peak adjacent to boron atoms for boronic acid and boroxine were used in the calculation of reaction conversion. Both peaks consisted of two protons per boron. The calculation of percent boroxine (in terms of boron reacted) is shown below:

2.00 int/boroxine boron/(2.00 int/boroxine+0.21 int/boronic acid boron)×100%=90.5% conversion.

Karl-Fischer Titration to Quantify Network Completeness.

BXT/UDP (50 mg) was dissolved in methanol (1 mL) to proceed with methanolysis reaction. The amount of water formed in the methanolysis reaction was measured using a Karl Fischer titrator. Based on the following calculation, the extent of network was determined.

Treatment to Calculate Percent Network Formation from Karl-Fischer Titration.

The water content of the boroxine network was measured with Karl-Fisher titration in order to determine percentage network completion. This is based on the difference in amount of water formation for methanolysis reaction between boronic acid and boroxine (Scheme 5):

Scheme 5. Reaction of boroxine and boronic acids with methanol.

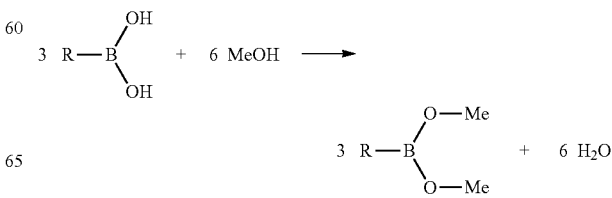

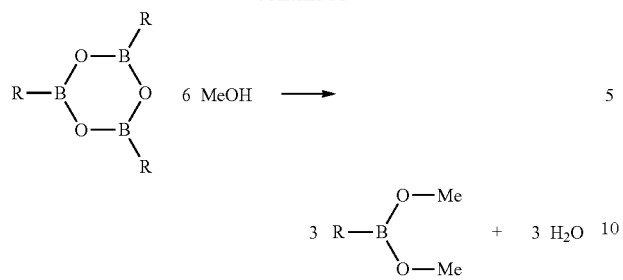

A perfect network with 100% boroxine linkage will yield 1 equivalent water per boron atom after complete methanolysis. In contrast, a perfectly incomplete network with pure moronic acids will yield 2 equivalent water per boron atom after full methanolysis. Based on these relationships a scale can be constructed where Y measures wt. % of water formation per boron atom for 100% complete network and X measures wt. % of water formation per boron for totally incomplete network. With this constructed scale, the percent network completion (PNC) can be calculated as following:

$$PNC = \frac{Z-X}{Y-X} * 100\%$$

Where:
X=%$_{H2O}$ Incomplete Network
Y=%$_{H2O}$ Ideal Network
Z=% Water Measured in sample material Calculating the Wt. % of Water Formation Per Boron Atom for Ideal Network (Y):

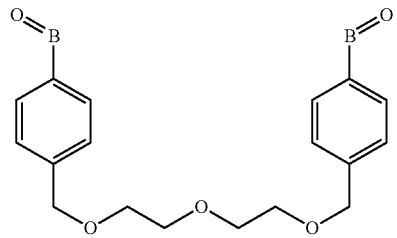 [SMILES: O=Bc1ccc(COCCOCCOCc2ccc(B=O)cc2)cc1]

$BX_{mw}$ is boroxine molecular weight of one unit.
$UDP_{mw}$ is UDP molecular weight.
Start with 100 grams of material.
To determine the amount of water generated from 100 g of material with an ideal full network use the following equation.

$$100 \text{ g material} * \frac{1}{BX_{mw} + \frac{2}{3}UDP_{mw}} * \frac{2B}{\text{unit}} * \frac{1H_2O}{B} * H_2O_{mw} = 7.30 \text{ g } H_2O$$

$$\frac{7.30 \text{ g } H_2O}{100 \text{ g material}} * 100\% = 7.3\%$$

Calculating the Wt. % of Water Formation Per Boron Atom for Totally Incomplete Network (X):

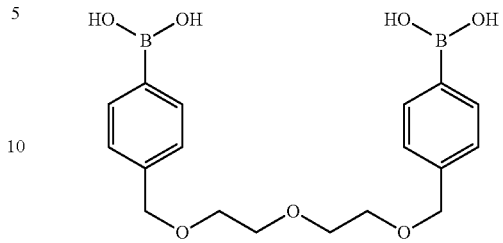

$BA_{mw}$ is boronic acid molecular weight of one unit.
Start with 100 g of material.
To determine the amount of water generated from 100 g of perfectly incomplete network composed of all boronic acid use the following equation:

$$100 \text{ g material} * \frac{1}{BA_{mw} + \frac{2}{3}UDP_{mw}} * \frac{2B}{\text{unit}} * \frac{2H_2O}{B} * H_2O_{mw} = $$

$$\%_{H2O} = 13.6 \text{ g } H_2O$$

$$\frac{13.6 \text{ g } H_2O}{100 \text{ g material}} * 100\% = 13.6\%$$

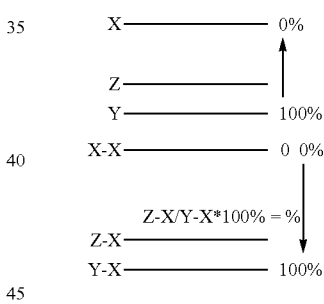

Calculation of Percent Network Completion:
Using values from above, the percent network completion is calculated as:

$$\frac{Z-X}{Y-X} * 100\% = \% \text{ Network Completion}$$

Where:
%$_{H2O}$ Incomplete Network=X=13.61%.
%$_{H2O}$ Ideal Network=Y=7.3%
% Water Measured in sample material=Z=8%
Thus, the percent network formation is:

$$\frac{Z-X}{Y-X} * 100\% = \frac{8.00\% - 13.61\%}{7.3\% - 13.61\%} * 100\% = 89\% \text{ completion}$$

Monomer Recycling of Boroxine Thermosets.

Scheme 6. Boroxine feedstock recycling in water at elevated temperature.

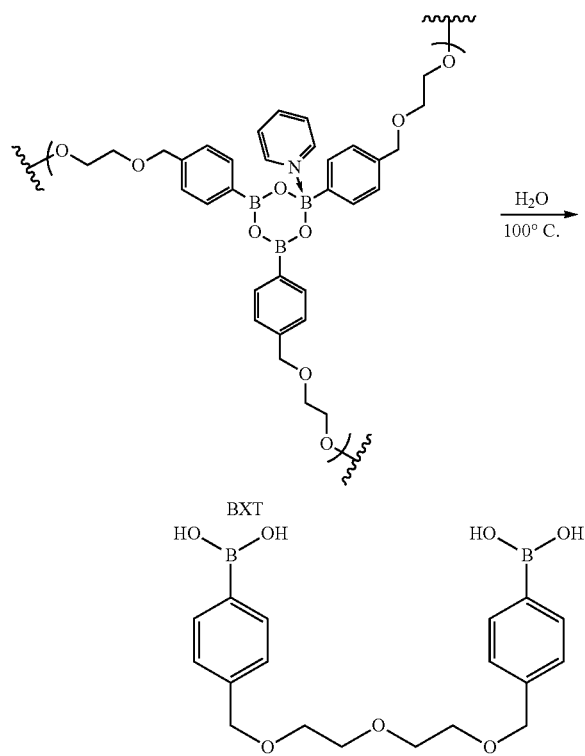

Material Recycling Protocol.

BXT sample (500 mg) was added to a flask with water (50 mL) and heated to reflux for 1 hour. Upon cooling the liquid was decanted and discarded leaving behind DBA. The $^1$H NMR spectrum was identical to that of the starting DBA.

Moisture Sensitivity Test of Boroxine Thermosets.

The moisture sensitivity of BXT/UDP thermosets was investigated as follows. The network samples were prepared in rectangular geometry (25 mm×10 mm×1 mm). Controlled relative humidity chambers were prepared by placing saturated salt solutions in a desiccator. Sodium iodide was used for the 40% RH and potassium iodide for 70%. The network samples were left in the relative humidity chamber for two days to reach equilibrium. After two days, the storage moduli were measured by dynamic mechanical analysis (DMA) at room temperature and the percent network completion was quantified by methanolysis followed by Karl-Fischer titration as described earlier.

Mechanical and Thermal Properties of Boroxine Thermosets.

Tensile Testing Procedure.

Figure 8:
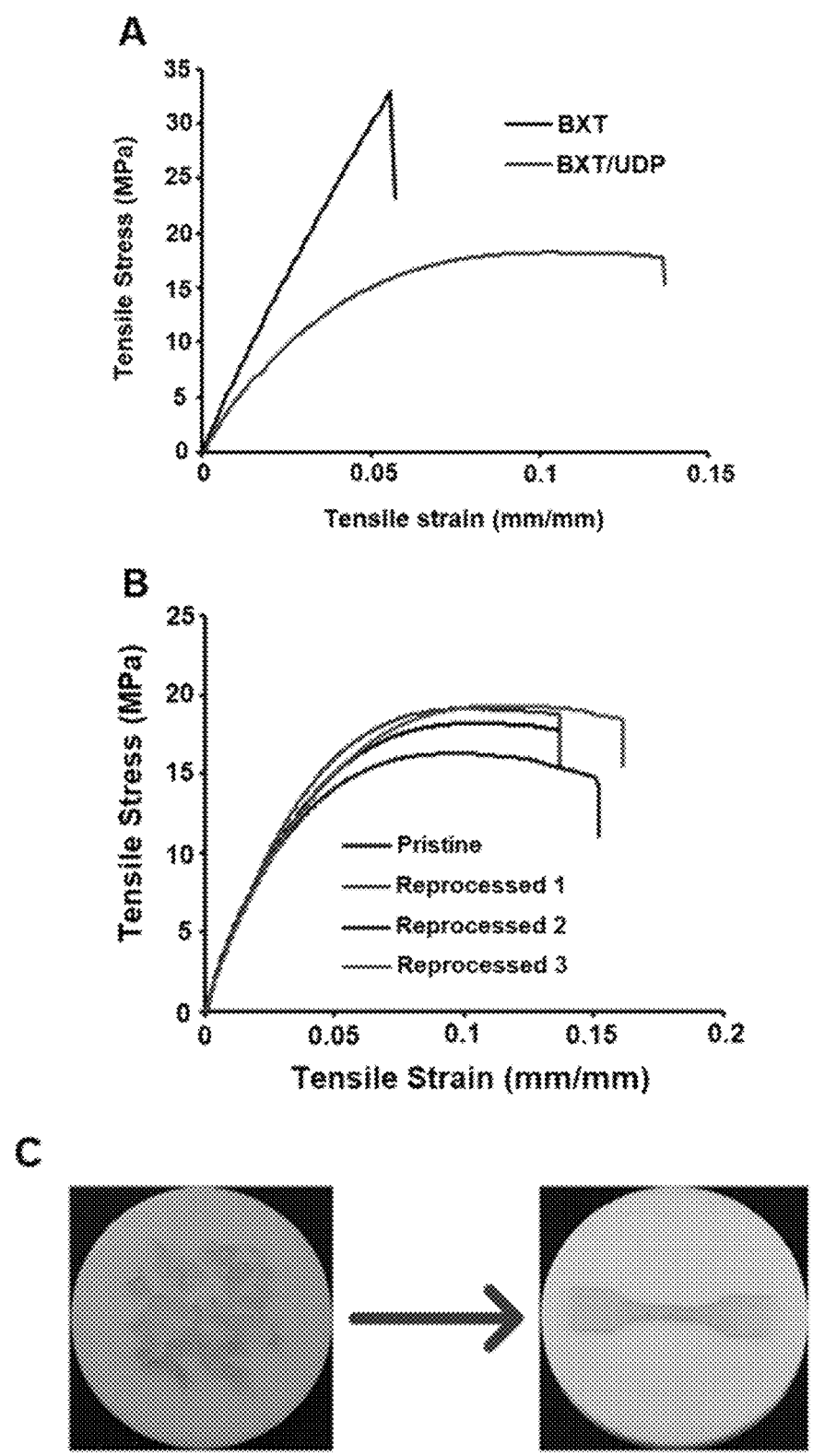
FIG. 8A-C presents the tensile properties and reprocessability of boroxine networks. (A) Stress strain curves for BXT with or without UDP. (B) Reprocessability of the BXT/UDP thermoset. (C) Images of cut and reprocessed BXT/UDP samples.

Stress-strain curves were measured at room temperature for samples of dog bone shape (4 mm×1 mm×10 mm gauge length) using an Instron 3365 instrument with a 500 N load cell and a deformation rate of 10 mm/min. The tensile data is reported in FIG. 8.

Stress Relaxation Experiments.

Stress relaxation experiments were carried out on a TA instruments DMA Q800 in compression mode. Samples were compression molded into a cylindrical shape (2.8 mm thickness×10 mm diameter) for analysis. Samples were equilibrated at a set temperature and then subjected to a constant strain. Stress was measured for 30 minutes after which the sample temperature was elevated by 5° C., equilibrated for 15 minutes and the measurement was repeated. From the characteristic relaxation times ($\tau$) the activation energy ($E_a$) and topological freezing temp ($T_v$) were calculated using the procedure by Brutman et al. (*ACS Macro Lett.* 2014, 3, 607-610) and Capelot et al. (*ADS Macro Lett.* 2012, 1, 789-792).

Differential Scanning Calorimetry Procedure.

Differential Scanning Calorimetry (DSC) was performed on a TA instruments DSC Q2000. Samples were loaded into TZero Aluminum pans and scanned against an empty reference pan. After equilibration at 85° C. the temperature was ramped at 10° C./min to 250° C.

Dynamic Mechanical Analysis Procedure (DMA).

DMA was performed on a TA instruments DMA Q800. Rectangular geometry samples (25 mm×10 mm×1 mm) were used with a ramp rate of 3° C./min. Storage modulus was measured over the temperature range. The frequency used was 1 Hz and the strain amount set to 10 μm displacement.

Creep Test Procedure.

Creep tests were performed on a TA instruments DMA Q800 in tension mode on rectangular shaped samples (25 mm×10 mm×1 mm). Samples were loaded into the furnace, equilibrated at 25° C. and then subjected to a 1 MPa stress. Strain was measured over the course of 10 minutes after which the stress was released, and the recovery observed for 20 minutes.

Testing the Dynamic Nature of the Boroxine Linkage:

To test the dynamic nature of boroxine linkage, models studying boroxine exchange kinetics were conducted. While boroxine exchange with boronic acids has been previously discussed, no kinetic data was reported. For this purpose, we synthesized two model boroxines 1 and 2, which upon dissolving in DMSO-$d_6$ underwent rapid exchange as evidenced by the appearance of three sets of benzylic protons next to methoxy group for 2-4. Upon heating, the three peaks broadened and eventually coalesced into a singlet at 85° C. (see FIG. 2).

Using peak coalescence procedures, the activation energy of 81.6 kJ/mol was obtained for the model reaction. As pyridine-based plasticizer was used in later thermoset studies, the exchange kinetics was also investigated by adding one equivalent pyridine into the exchange solution. Using the same method, the activation energy was found to be 82.7 kJ/mol in presence of pyridine (see SI for more details). The addition of pyridine does not seem to impact the boroxine exchange kinetics. Putatively, boroxine exchange was facilitated by residual boronic acid resulting from hydrolysis with serendipitous water.

Encouraged by the small molecule exchange data, the boroxine network was synthesized. A diboronic acid (DBA) monomer having a flexible linker was first prepared. $S_N2$ substitution of 4-bromobenzyl bromide by fully deprotonated diethylene glycol gave DBr (see FIG. 3A). Lithium halogen exchange, followed by treating with triisopropylborate led to a scalable synthesis of DBA monomer.

The boroxine network was formed by using a ligand facilitated boronic acid trimerization method previously reported (see FIG. 3B). DBA monomer was dissolved in pyridine and evaporated at room temperature for 12 hours followed by heating to 80° C. for 12 hours under high vacuum (see FIG. 3B) to remove excess pyridine and promote full network formation. This method gave a robust material with reproducible mechanical properties. For mechanical tests, sample specimens were fabricated by melt pressing the material into testable dimensions.

The as prepared DBA boroxine thermoset (BXT) is strong but brittle. To make the thermoset more ductile and tougher, a plasticizer was added. More specifically, a long alkyl substituted pyridine, 4-undecylpyridine (UDP) was added to the boroxine thermosets as a plasticizer. The most preferred ratio of pyridine to boron in solid state structures was found to be 1 to 3 or one pyridine per boroxine unit. UDP was added to the pyridine solution of DBA before the slow evaporation with a feed ratio of 1:1 UDP to boroxine. The composition of our plasticized boroxine thermoset was confirmed to contain 1:1 UDP to boroxine (called BXT/UDP).

Figure 5:
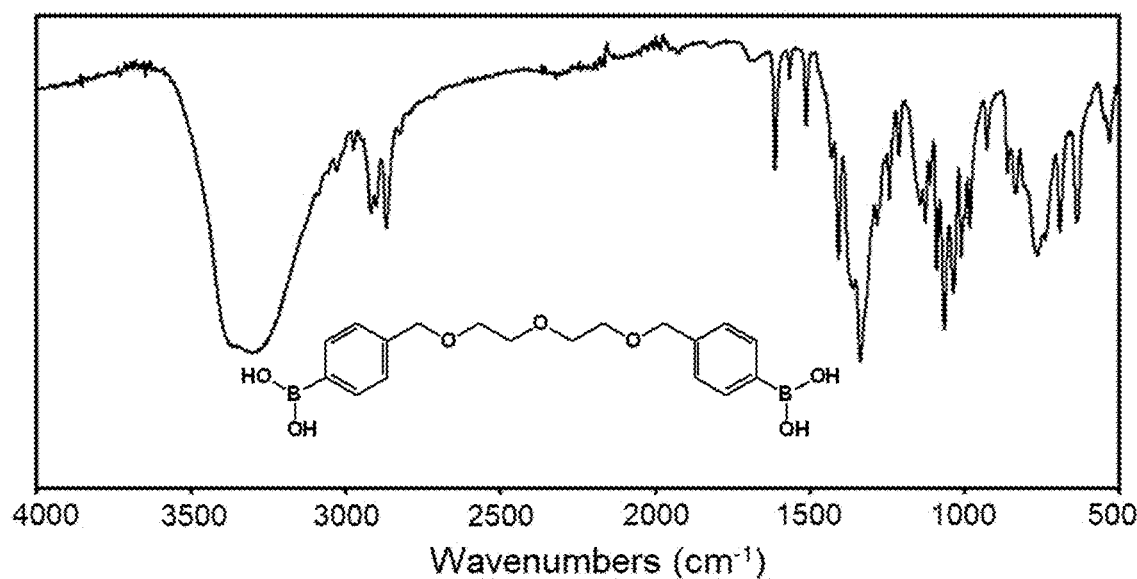
FIG. 5 provides a FT-IR spectrum of a ((((oxybis(ethane-2,1-diyl))bis(oxy))bis(methylene))bis(4,1-phenylene))diboronic acid (DBA) monomer.
Figure 6:
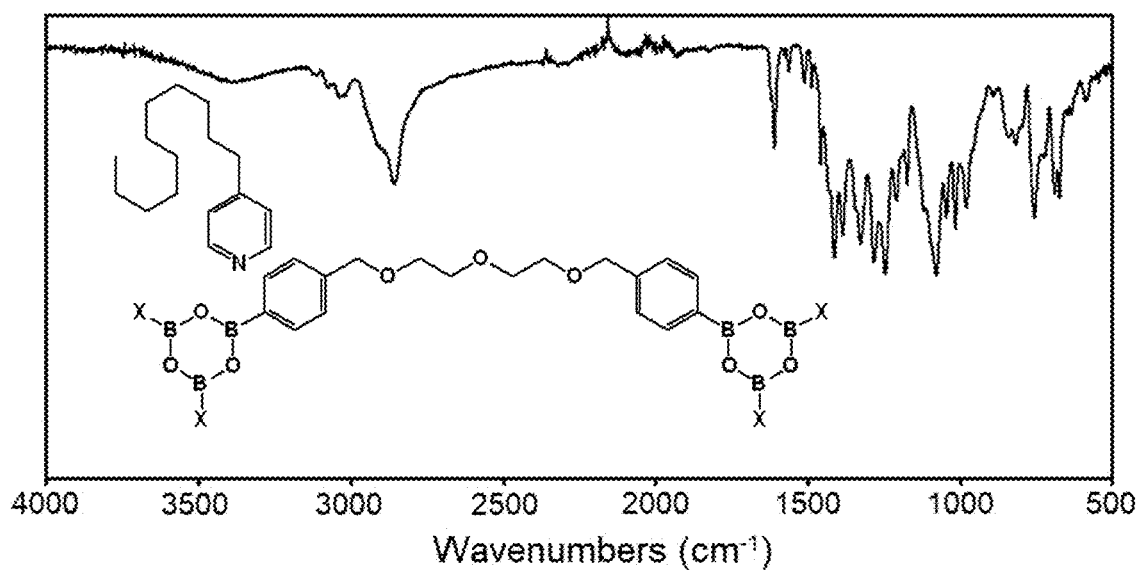
FIG. 6 provides a FT-IR spectrum of a BXT/UDP sample.
Figure 7:
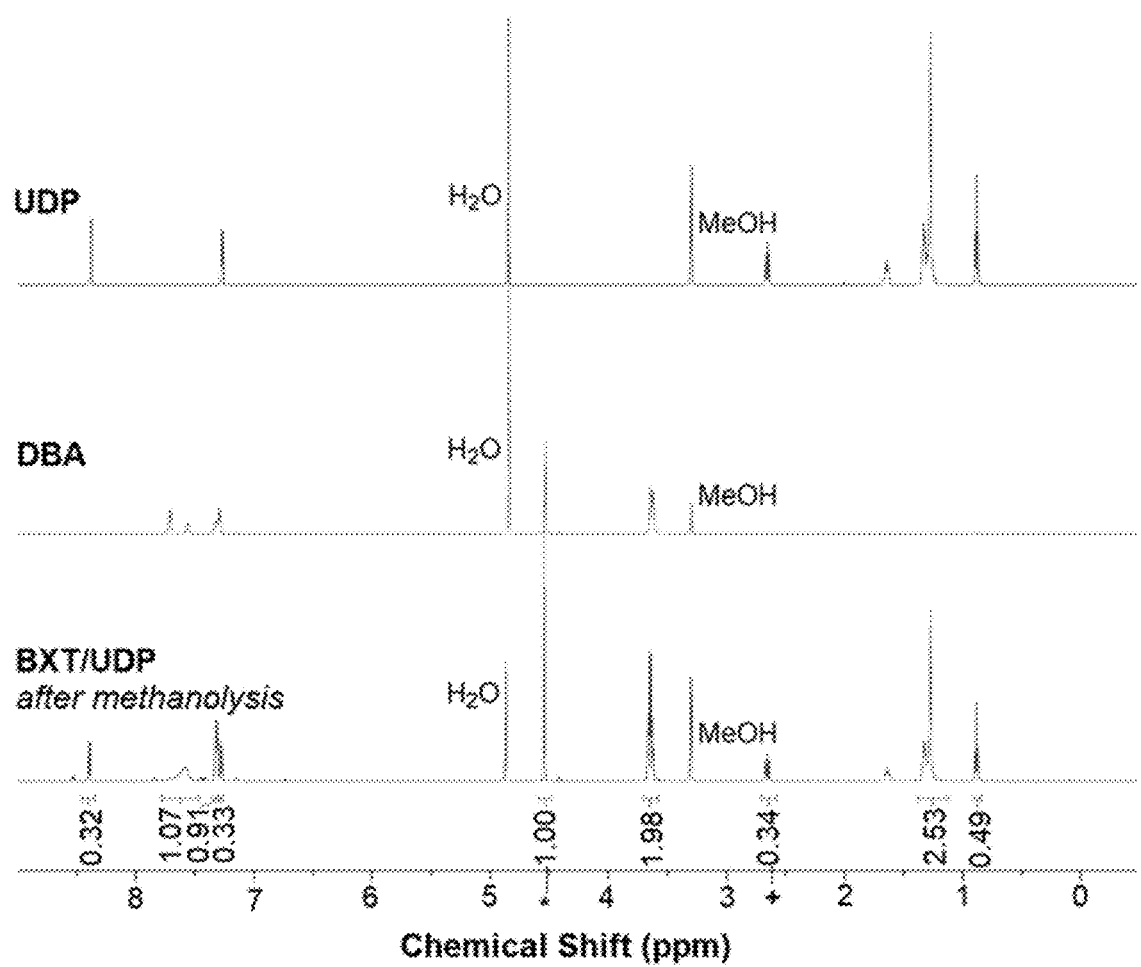
FIG. 7 provides an $^1$H NMR spectrum of BXT/UDP after the sample is dissolved in $CD_3OD$ (600 MHz, $CD_3OD$, 298 K.). The spectra are stacked with the $^1$H NMR for DBA and UDP individually for comparison. The integration for the benzylic peak on the UDP is shown by + and the integration for the benzylic peak for DBA is shown by *. These integration numbers are used to calculate the boron/UDP/ ratio.

Consistent with thermoset structure, the network is insoluble in normal organic solvents. Due to the insolubility, several methods were relied on to confirm the structure of the thermoset. First, toluene boronic acid was used as a model compound, and a condensation reaction run under identical conditions was used for polymerization. Based on $^1$H NMR, boroxine with pyridine adduct was formed in high yield (see Scheme 4 and FIG. 4). Given the reaction conditions were identical, it is reasonable to assume that the dehydration of DBA during polymerization should afford similar structure in the network. Second, the dehydration during polymerization was supported by FTIR data. The DBA monomer displayed a strong band in >3,000 cm$^{-1}$ range corresponding to boronic acid OH stretching (see FIG. 5). This resonance almost disappeared in the final network, indicating the loss of OH during polymerization (see FIG. 6). Finally, despite the insolubility in normal solvents, the networks could be dissolved in methanol through methanolysis of the boroxine linkages. Taking advantage of this feature, a 1:1 UDP:boroxine composition was found to be maintained in the boroxine thermoset using $^1$H NMR spectroscopy (see FIG. 7).

To quantify the extent of boroxine formation in the thermoset, a method of titrating the amount of water generated from methanolysis was used. Methanolysis of pure boronic acids produces two molecules of water per boron, while reaction with pure boroxines produces only one. By measuring the amount of water generated from methanolysis of boroxine thermoset, the extent of boroxine formation could be estimated. Theoretical calculations show BXT/UDP would give 7.3 wt. % water if composed of 100% boroxine and 13.6 wt. % water if comprised completely of boronic acid (see above). Methanolysis of the BXT/UDP network generated ~8.0 wt. % water, indicating that the network contains ≥89% boroxine, a value representing the lower bound of the boroxine content because any free water in the network or methanol should lead to overestimation of the boronic acid content.

The mechanical properties of the thermoset materials were first tested using uniaxial tensile method. Without the addition of UDP as plasticizer, the thermoset was stiff and relatively brittle (see FIG. 8A). At 10 mm/min strain rate, the Young's modulus was measured to be 768 MPa, tensile strength of 32.9 MPa, and strain at break of 5.58%. With the addition of UDP as plasticizer, the BXT/UDP was more ductile and tougher. While the material's Young's modulus decreased slightly (559 MPa), the extensibility (13.67%) and toughness (1.978 MJ/m$^2$) increased substantially when compared to the sample with no plasticizer. Full mechanical properties are displayed in Table 1.

TABLE 1

Boroxine network Mechanical Data with Varying UDP Levels (25° C. 10 mm/min strain rate)

| Sample | Young's Modulus (MPa) | Tensile Strength (MPa) | Strain at Break (%) | Toughness (MJ/m$^2$) |
|---|---|---|---|---|
| BXT | 768 | 32.9 | 5.60 | 0.973 |
| BXT/UDP | 559 | 17.8 | 13.7 | 1.978 |

Figure 9:
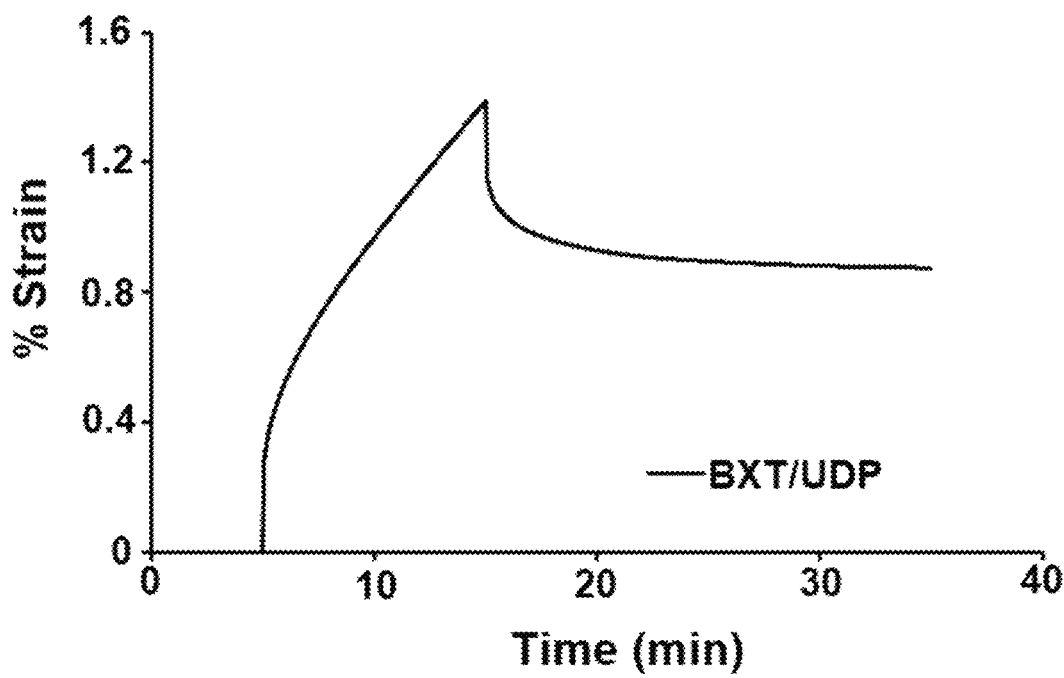
FIG. 9 presents the Creep test result for BXT/UDP under 1 MPa stress at room temperature.
Figure 10A:
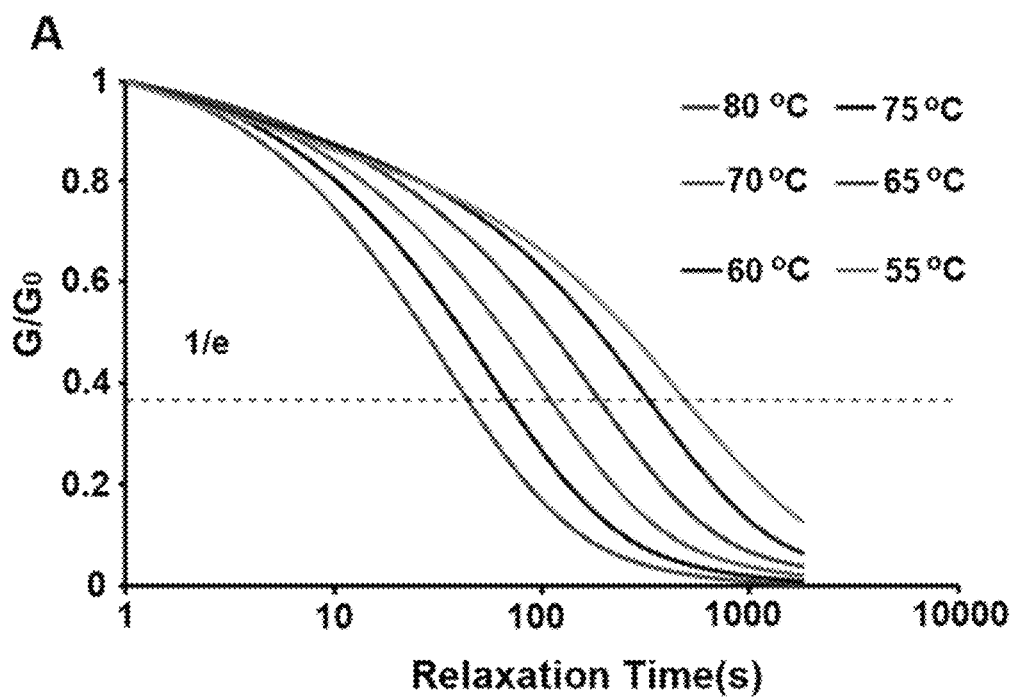
FIG. 10A-B provides a malleability study of BXT/UDP. (A) Stress relaxation tests at various temperatures. (B) Fragility plot with linear fit. From this fit the activation energy is calculated to be 79.5 kcal/mol.

The boroxine thermoset shows unusual mechanical behavior compared to traditional thermosets. Despite the highly cross-linked chemical structure and the mechanical strength, the material was found to be highly malleable. The malleability of the network material was investigated by both creep test (see FIG. 9) and stress relaxation experiments using compression mode dynamic mechanical analysis, from which the relaxation time was determined. Viscosity is related linearly to characteristic relaxation time (t) or the amount of time it takes the material to relax to 1/e of the original stress. As expected, the material relaxed faster when the temperature was increased (see FIG. 10A). An Arrhenius plot was constructed using the relaxation time at different temperature (see FIG. 4B).

The linear correlation of ln(t) with 1000/t indicates that the BXT/UDP sample exhibits Arrhenius flow characteristics. The activation energy of the relaxation process was calculated to be 79.5 kJ/mol, which is close to the activation energy measured for small molecule boroxine exchange reaction (82.7 kJ/mol). The excellent agreement supports that the malleability observed in bulk thermoset originates from boroxine exchange at molecular level. While the exact mechanism for boroxine exchange in bulk is not clear, putatively residual free boronic acids in the network facilitate exchange of boroxine linkages and afford the malleability in bulk.

Figure 10B:
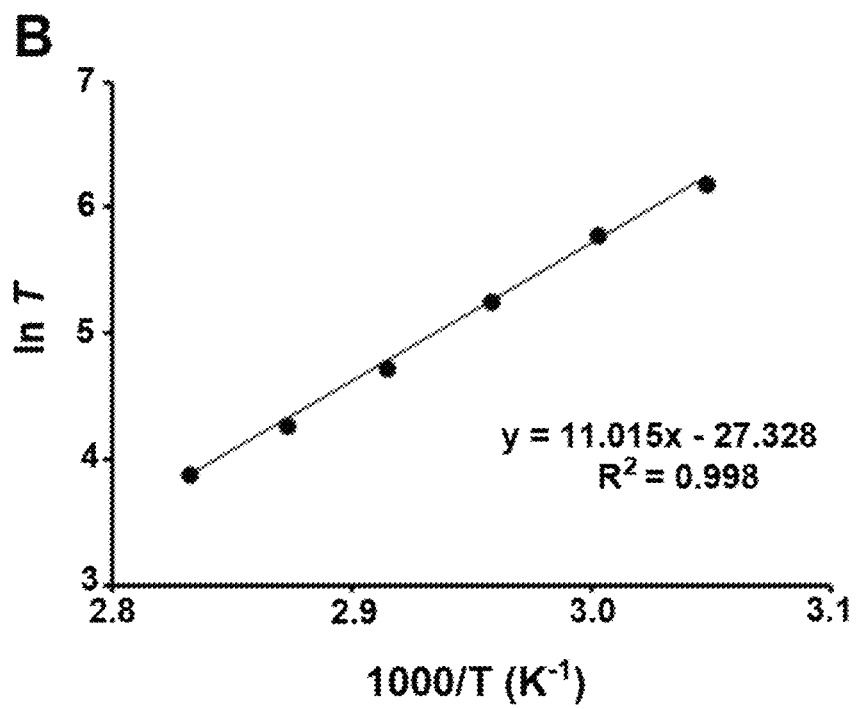

The linear Arrhenius plot shown in FIG. 10B indicates that the material has vitrimer characteristics. The topological freezing temperature ($T_v$), defined as the temperature where the material no longer flows and has a viscosity greater than $10^{12}$ Pa*s, was obtained by calculating viscosity from characteristic relaxation time and extrapolating to the point where it equals $10^{11}$ Pa*s. Following published methods, the $T_v$ for our system was calculated to be −0.5° C. This agrees with the observation that our boroxine thermoset is highly malleable at room temperature.

In addition to unusual mechanical properties (strong and highly malleable), another important attribute of this thermoset material is that it cannot only be reprocessed repetitively, but also completely recycled to its monomer. For reprocessability test, a BXT/UDP sample was cut into many pieces which were then hot pressed in a Teflon mold at 110° C. to reform sample specimens (see FIG. 8C). The tensile stress-strain curves for the reprocessed samples are almost identical to this of the pristine sample (see FIG. 8B).

Figure 11:
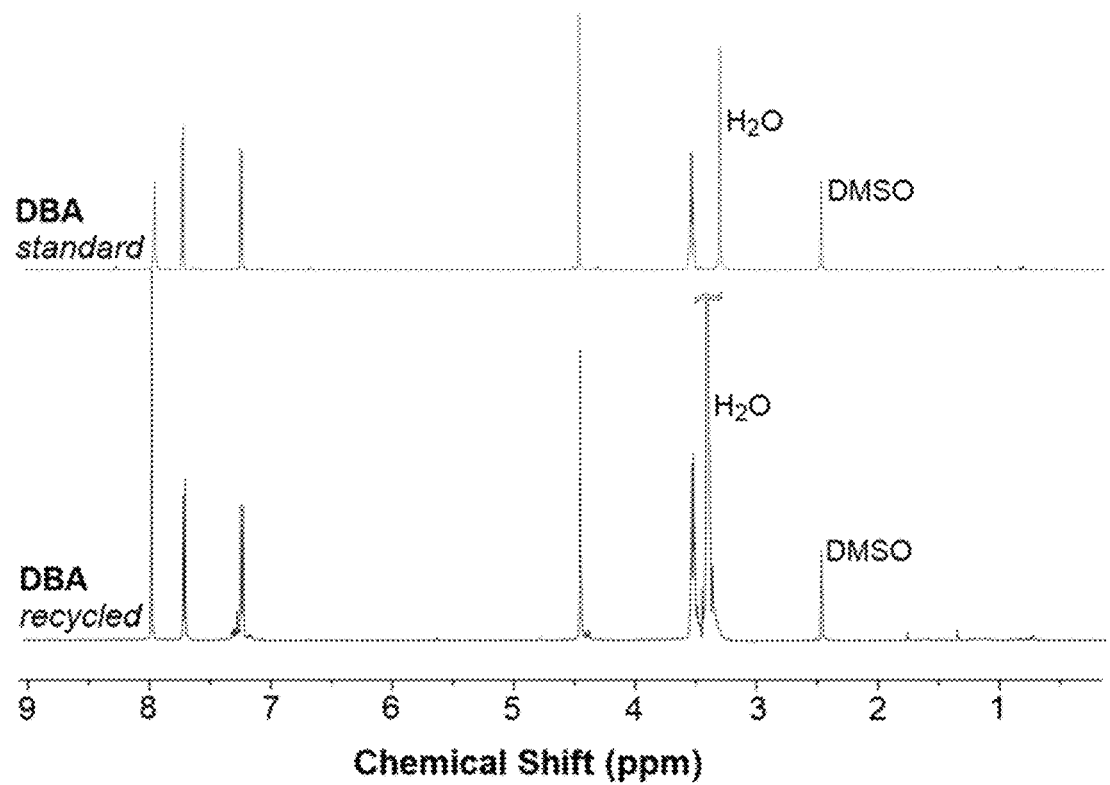
FIG. 11 presents a comparison of $^1$H NMR spectra for the recycled and pristine ((((oxybis(ethane-2,1-diyl))bis(oxy)) bis(methylene))bis(4,1-phenylene))diboronic acid (DBA) (500 MHz, DMSO-$d_6$, 298 K).
Figure 12:
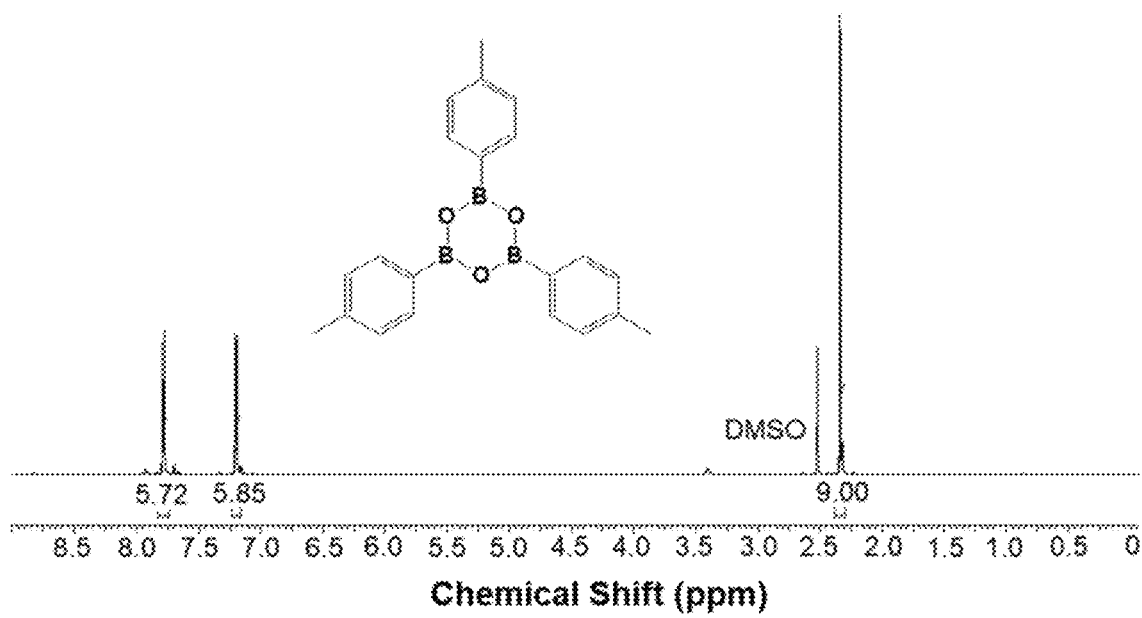
FIG. 12 presents a $^1$H NMR spectrum of 2,4,6-tri-p-tolyl-1,3,5,2,4,6-trioxatriborinane (600 MHz, DMSO-$d_6$, 298 K).
Figure 13:
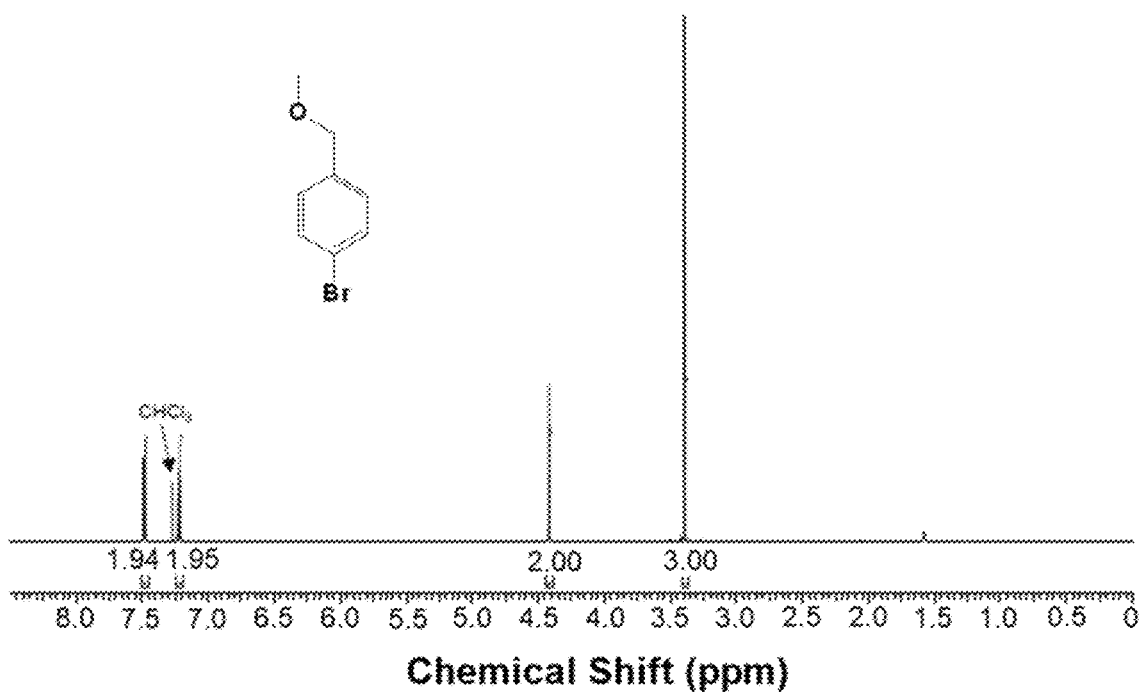
FIG. 13 presents a $^1$H NMR spectrum of 1-bromo-4-(methoxymethyl)benzene (600 MHz, $CDCl_3$, 298 K).
Figure 14:
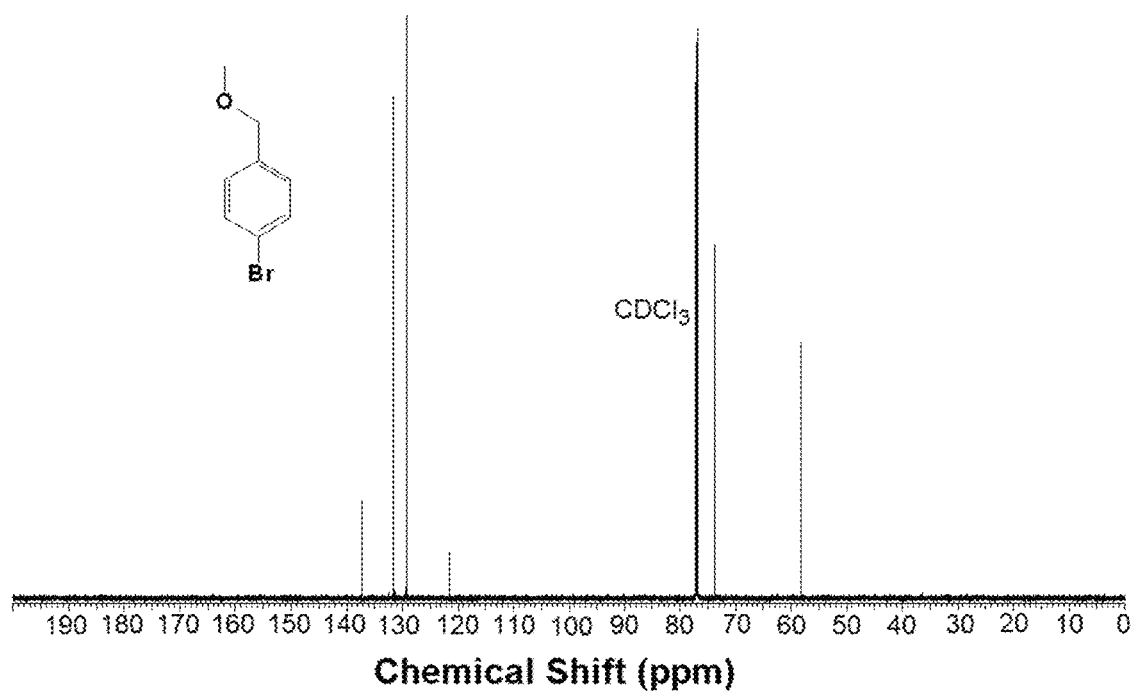
FIG. 14 presents a $^{13}$C NMR spectrum of 1-bromo-4-(methoxymethyl)benzene (150 MHz, $CDCl_3$, 298 K).
Figure 15:
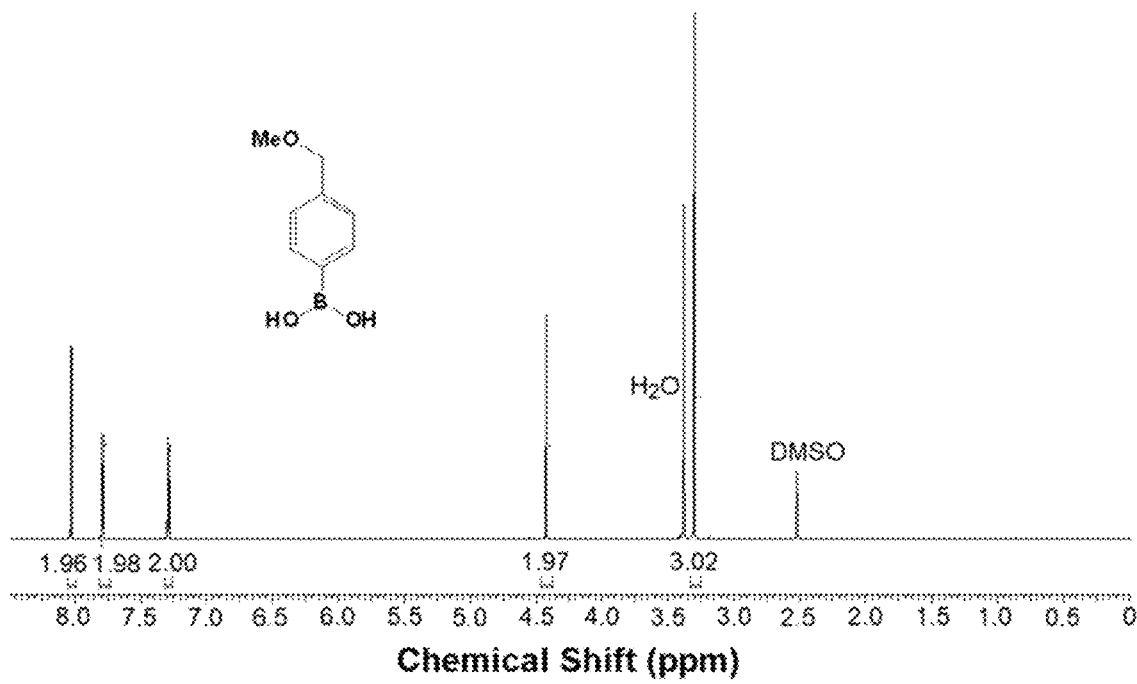
FIG. 15 presents a $^1$H NMR spectrum of (4-(methoxymethyl)phenyl)boronic acid (600 MHz, DMSO-$d_6$, 298 K).
Figure 16:
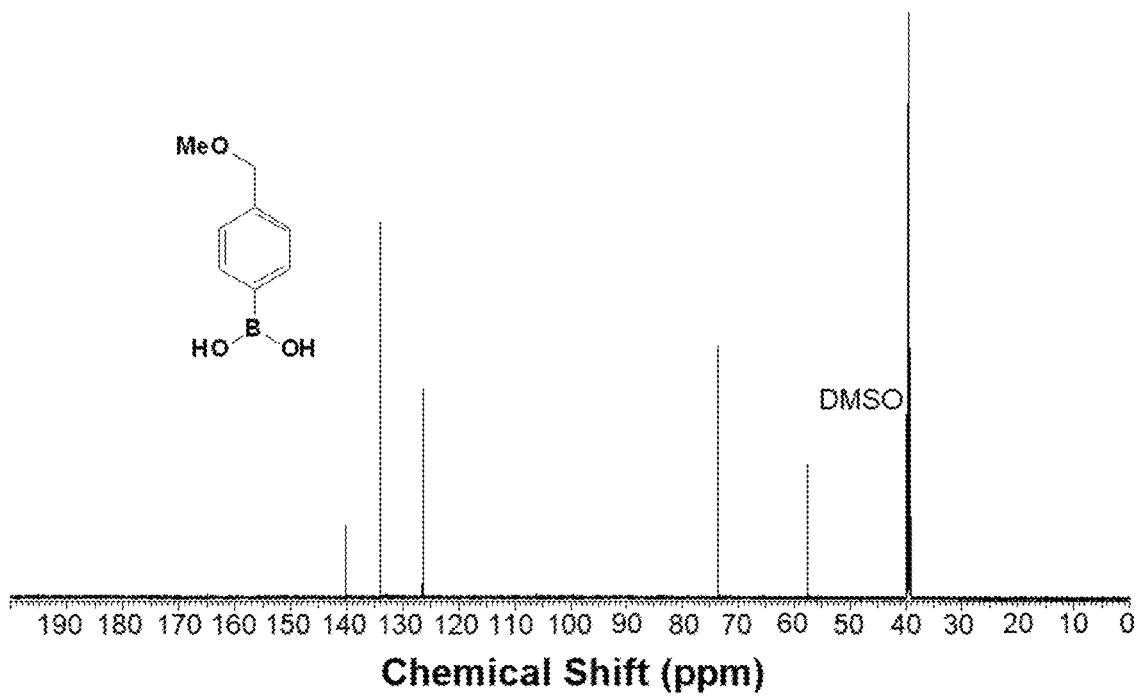
FIG. 16 presents a $^{13}$C NMR spectrum of (4-(methoxymethyl)phenyl)boronic acid (150 MHz, DMSO-$d_6$, 298 K).
Figure 17:
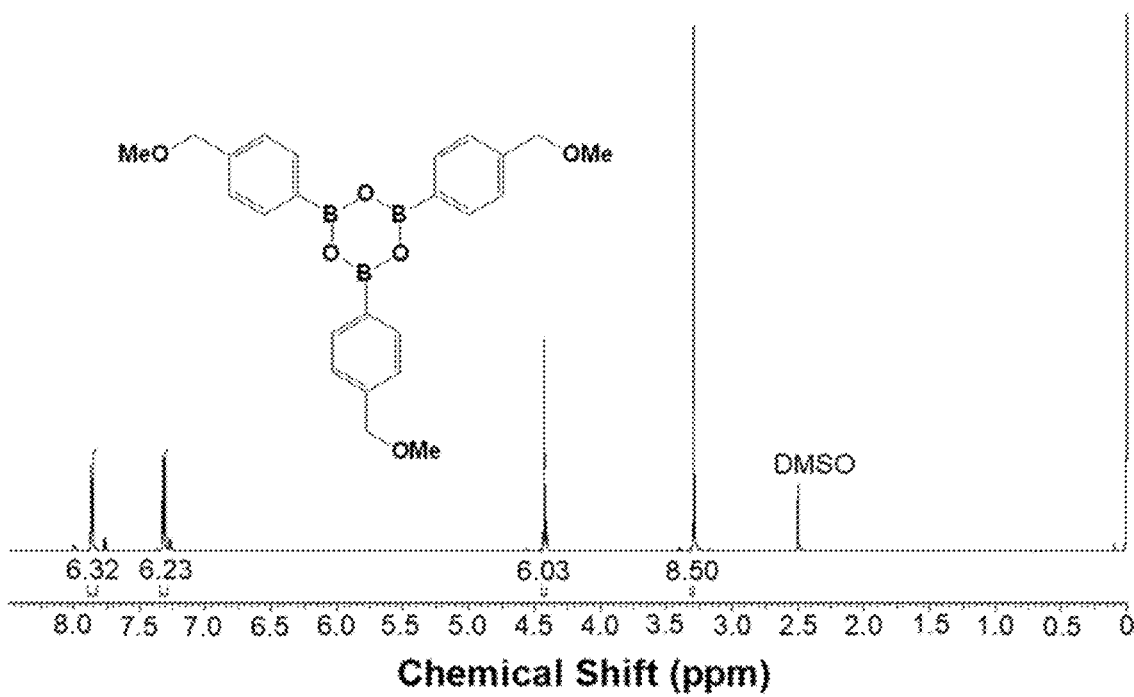
FIG. 17 presents a $^1$H NMR spectrum of 2,4,6-tris(4-(methoxymethyl)phenyl)-1,3,5,2,4,6-trioxatriborinane (600 MHz, DMSO-$d_6$, 298 K).
Figure 18:
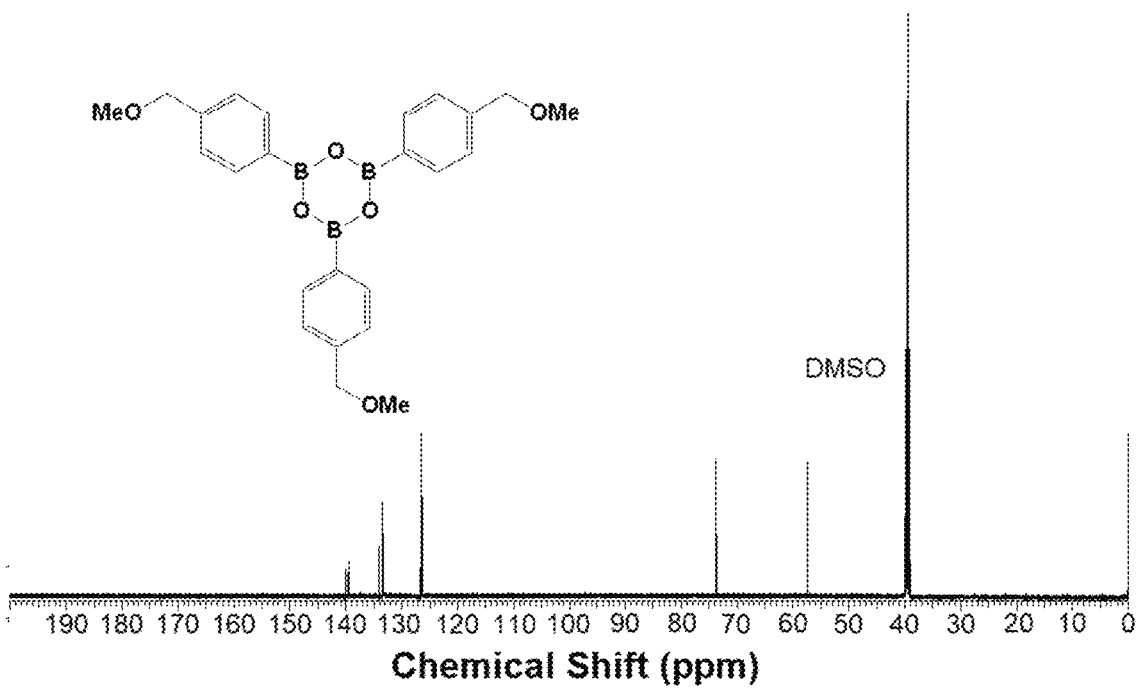
FIG. 18 presents a $^{13}$C NMR spectrum of 2,4,6-tris(4-(methoxymethyl)phenyl)-1,3,5,2,4,6-trioxatriborinane (150 MHz, DMSO-$d_6$, 298 K).
Figure 19:
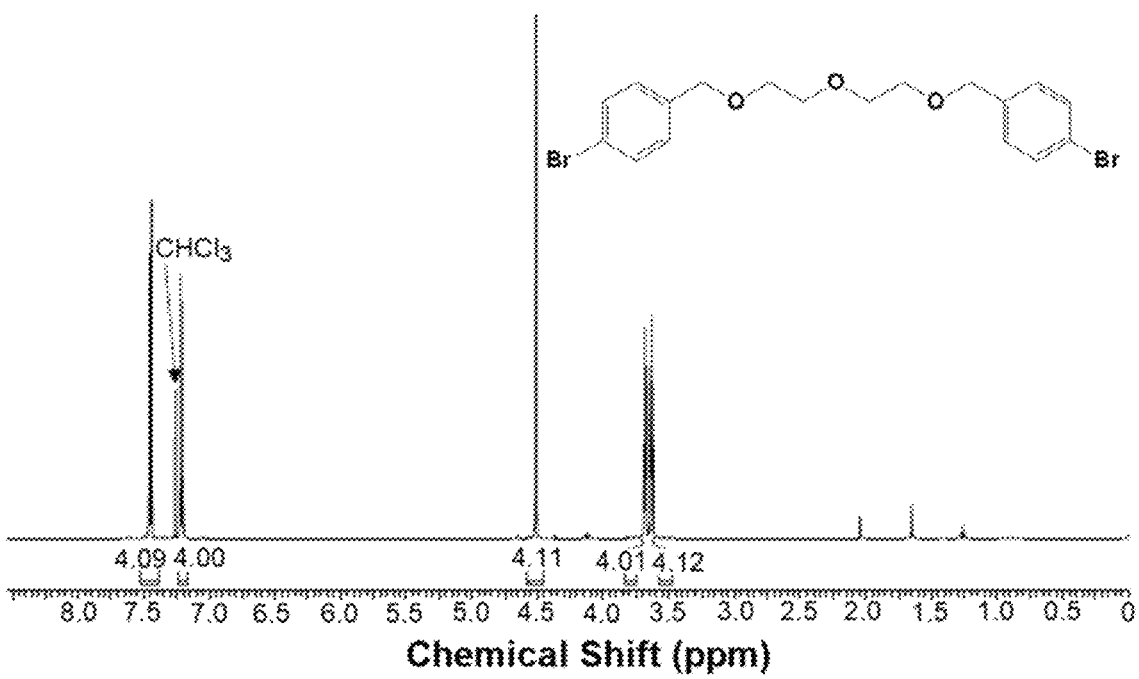
FIG. 19 presents a $^1$H NMR spectrum of 4,4'-(((oxybis (ethane-2,1-diyl))bis(oxy))bis(methylene))bis(bromobenzene) (DBr) (500 MHz, $CDCl_3$, 298 K).
Figure 20:
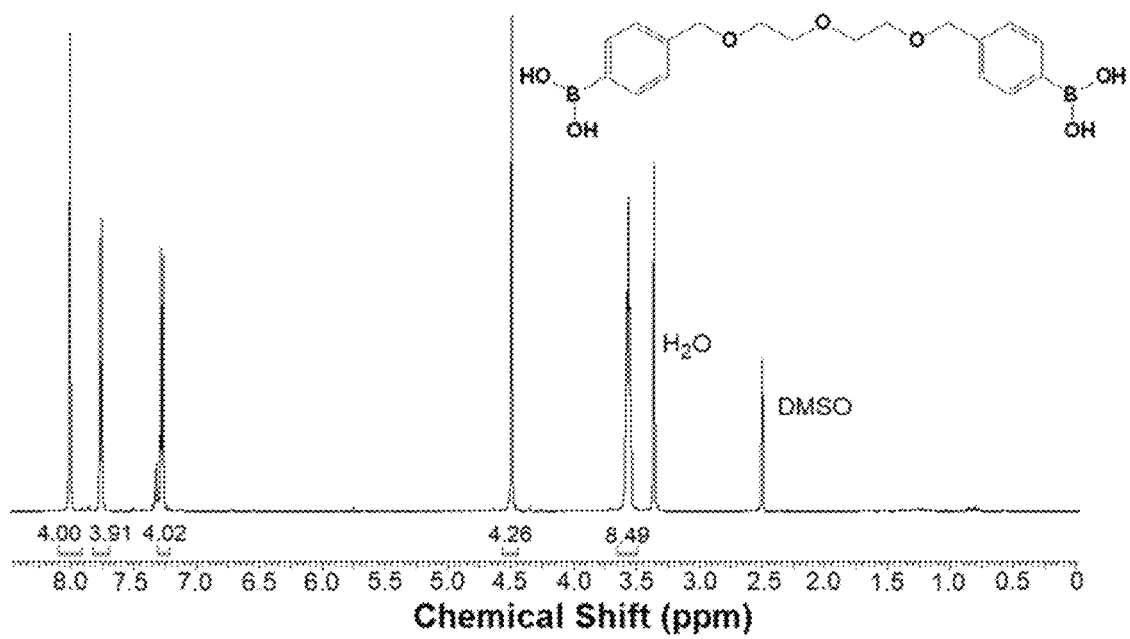
FIG. 20 presents a $^1$H NMR spectrum of ((((oxybis (ethane-2,1-diyl))bis(oxy))bis(methylene))bis(4,1-phenylene))diboronic acid (DBA) (500 MHz, DMSO-$d_6$, 298 K).
Figure 21:
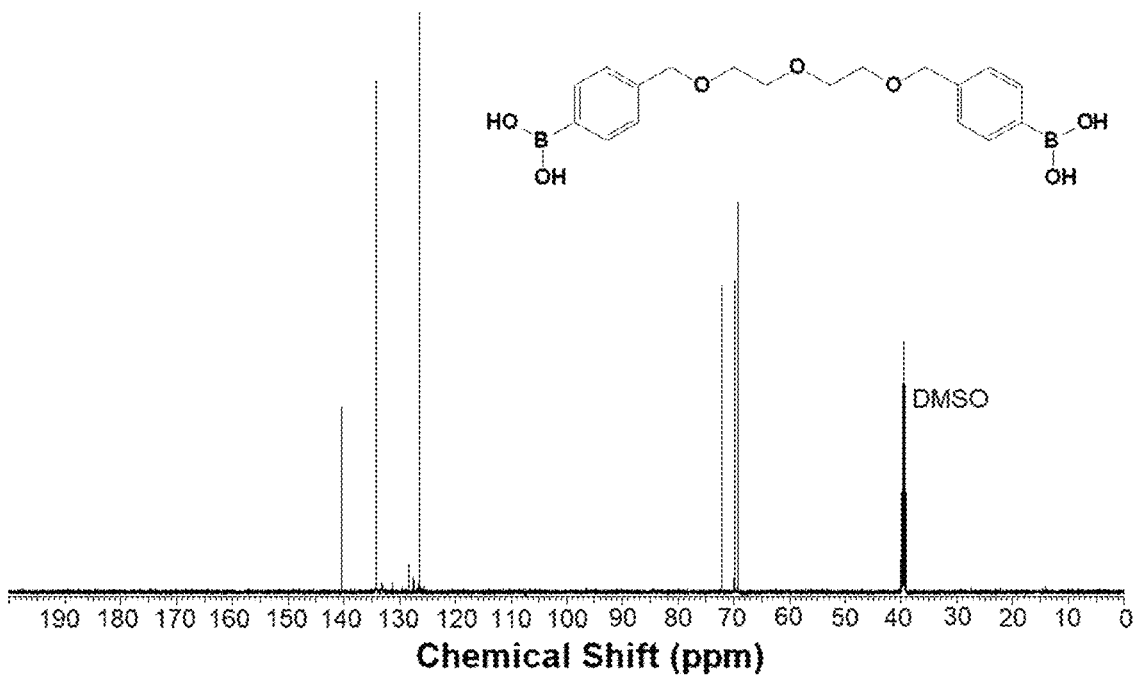
FIG. 21 presents a $^{13}$C NMR spectrum of ((((oxybis (ethane-2,1-diyl))bis(oxy))bis(methylene))bis(4,1-phenylene))diboronic acid (DBA)(125 MHz, DMSO-$d_6$, 298 K).
Figure 22:
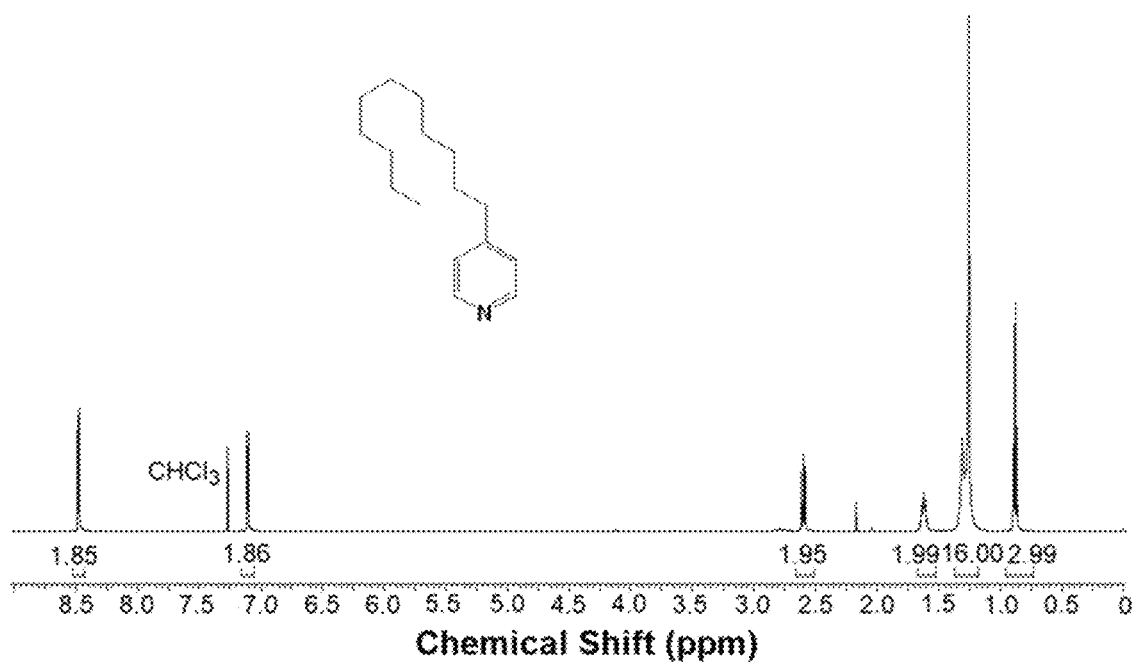
FIG. 22 presents a $^1$H NMR spectrum of 4-undecylpyridine (UDP) (500 MHz, $CDCl_3$, 298 K).
Figure 23:
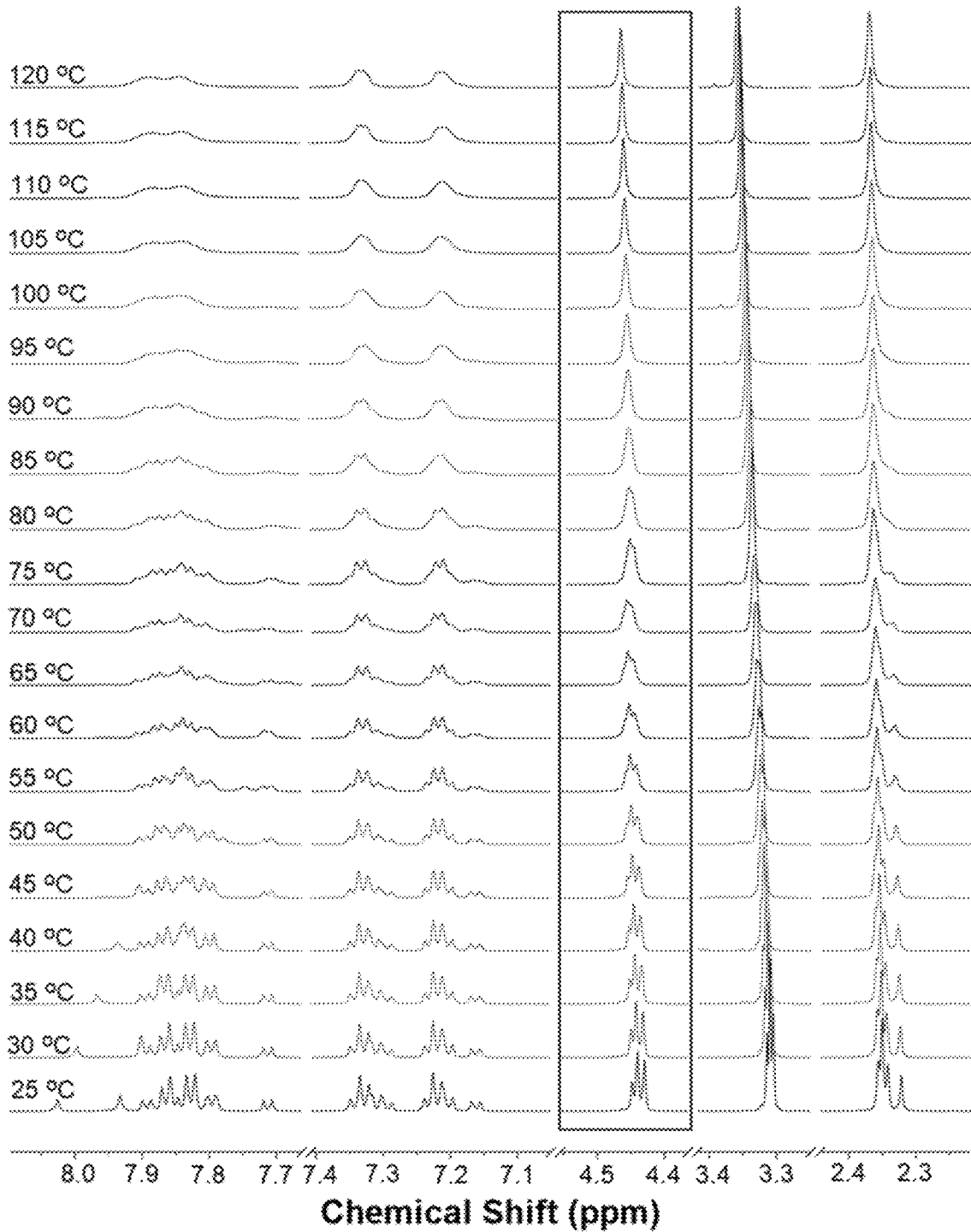
FIG. 23 presents a $^1$H NMR spectrum for exchange experiment between boroxine 1 and 2 without pyridine at variable temperatures (600 DMSO-$d_6$). The peak used for the coalescence study is enclosed in a black rectangle.
Figure 24:
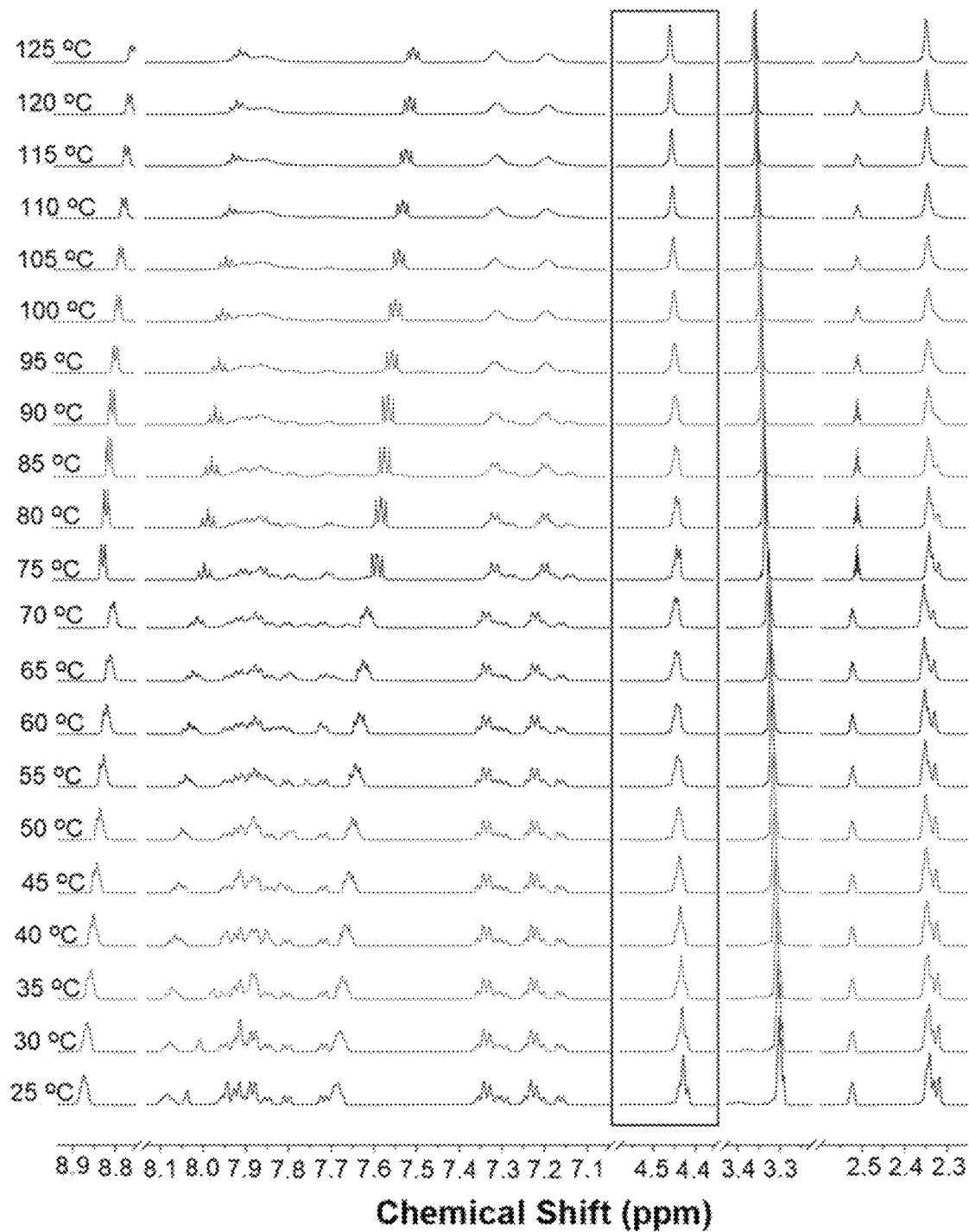
FIG. 24 presents a $^1$H NMR spectrum for exchange experiment between boroxine 1 and 2 in presence of pyridine at variable temperatures (600 MHz, DMSO-$d_6$). The peak used for the coalescence study is enclosed in a black rectangle.
Figure 25:
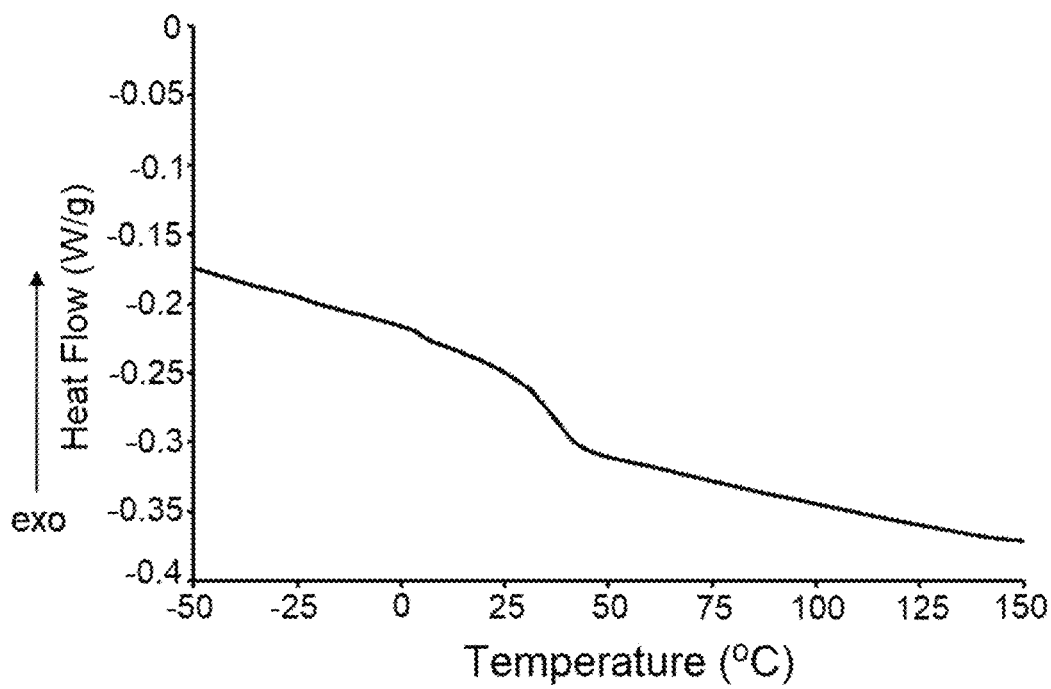
FIG. 25 shows Differential Scanning calorimetry (DSC) of BXT/UDP that shows a $T_g$ (onset) of 26° C.
Figure 26:
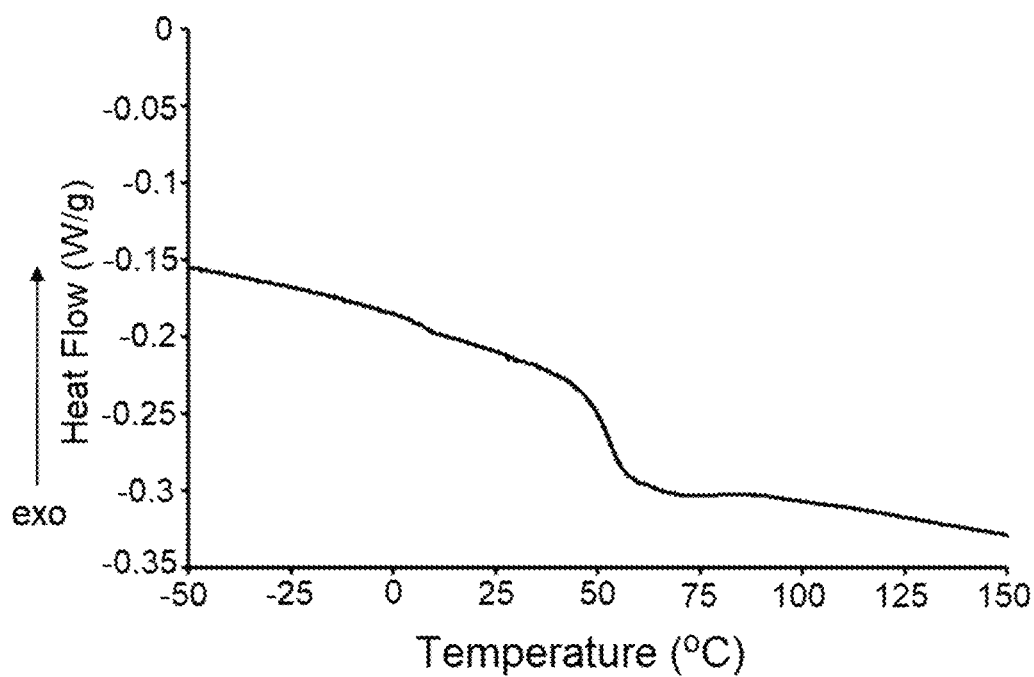
FIG. 26 shows Differential Scanning calorimetry (DSC) of BXT, No UDP that shows a $T_g$ (onset) of 47° C.
Figure 27:
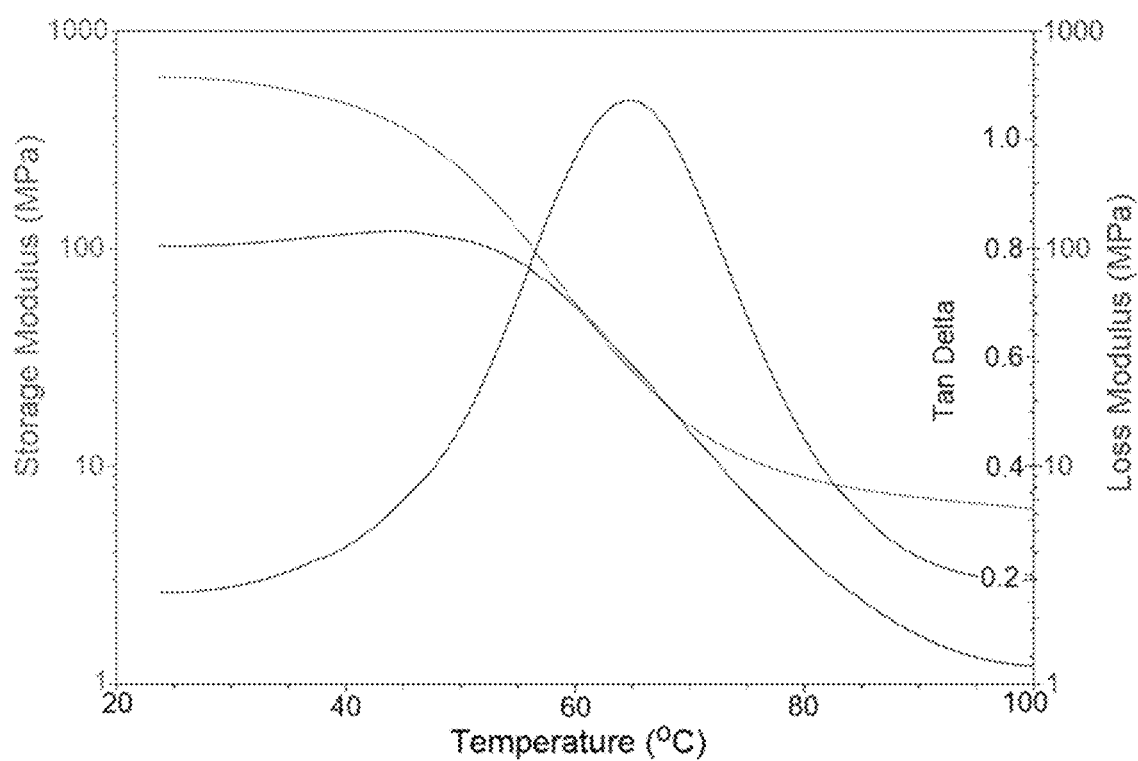
FIG. 27 shows Dynamic Mechanical Analysis (DMA) temperature ramp of BXT/UDP.
Figure 28:
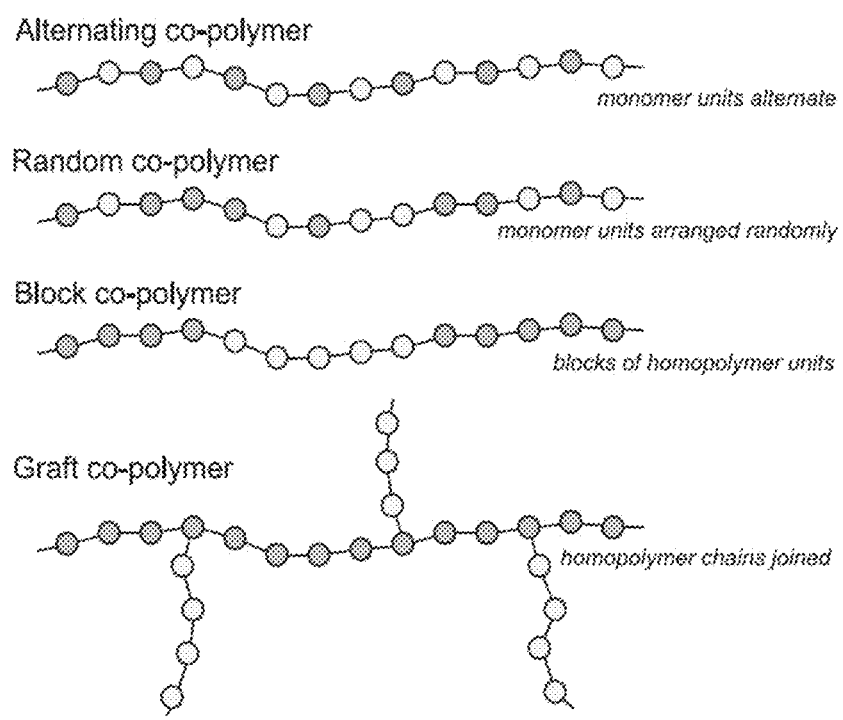
FIG. 28 presents an illustration of alternating co-polymers, random co-polymers, block co-polymers, and graft co-polymer that can be used with monomers or co monomers containing boronic acid functional groups to make various co-polymers.

For monomer recyclability test, upon boiling in water the thermoset was found to disintegrate with time and eventually fully dissolve. After cooling the dissolved solution, a white precipitate was obtained. The solid was found to have a $^1$H NMR spectrum identical to that of the starting DBA monomer (see FIG. 11). This experiment demonstrated the feedstock recyclability of boroxine thermosets. While being recyclable, it should be noted that the boroxine network is relatively stable under low humidity conditions, which was confirmed by exposing the BXT/UDP samples to various relative humidity levels in a humidity chamber. For example, at 40% RH there was only 20% drop in the mechanical properties after several days (Table 2).

TABLE 2

Moisture sensitivity test in different humidity levels

| Sample | Storage Modulus (G') | Network completion |
|---|---|---|
| Initial | 750 MPa | 89% |
| 0% RH 2 days | 734 MPa | 87% |
| 40% RH 2 days | 595 MPa | 81% |
| 70% RH 2 days | 366 MPa | 80% |
| 100% RH 2 days | 180 MPa | 71% |

A number of embodiments have been described herein. Nevertheless, it will be understood that various modifications may be made without departing from the spirit and scope of this disclosure. Accordingly, other embodiments are within the scope of the following claims.

What is claimed is:

1. A dynamic thermosetting polymer comprising:
a plurality of boroxine crosslinks having the structure of:

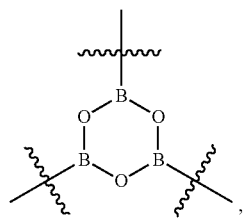 [SMILES: *B1OB(*)OB(*)O1]

formed from monomers comprising the structure of Formula IV(a), Formula IV(b), Formula IV(c), Formula IV(d), Formula IV(e), Formula IV(f), Formula IV(g), Formula IV(h) and/or Formula IV(i):

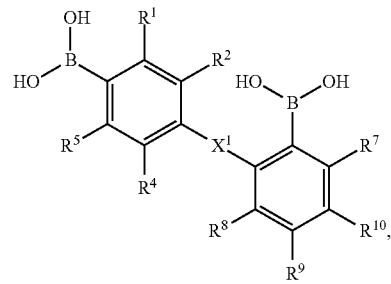

Formula IV(a)

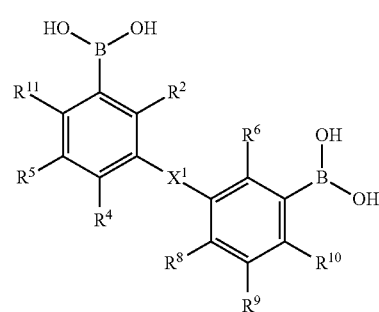

Formula IV(b)

-continued

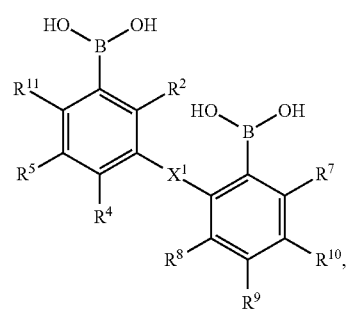

Formula IV(c)

Formula IV(d)

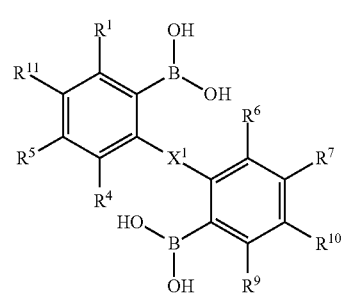

Formula IV(e)

Formula IV(f)

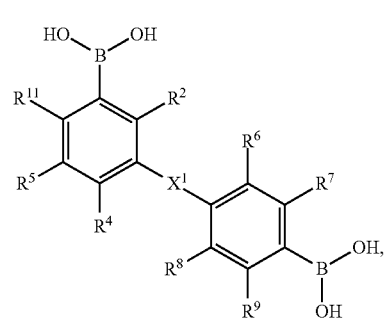

Formula IV(g)

-continued

Formula IV(h)

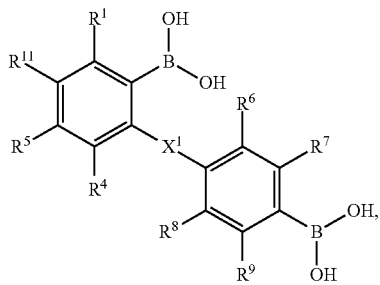

and/or

Formula IV(i)

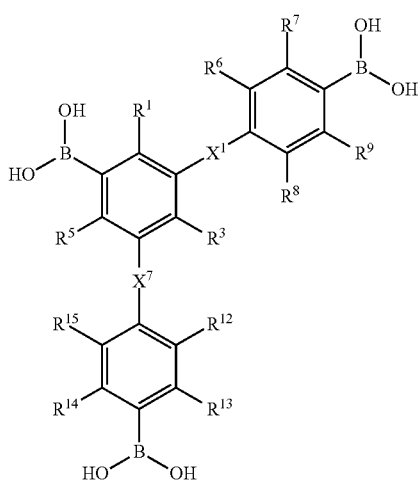

wherein,
- X¹ is selected from optionally substituted $(C_3-C_{24})$-alkylene, optionally substituted $(C_3-C_{24})$-hetero-alkylene, optionally substituted $(C_3-C_{24})$-alkenylene, optionally substituted $(C_{3-12})$-hetero-alkenylene, optionally substituted $(C_{3-12})$-alkynylene, optionally substituted $(C_3-C_{12})$-hetero-alkynylene, optionally substituted $(C_5-C_{12})$-cycloalkylene, optionally substituted $(C_5-C_{12})$-cycloalkenylene, and optionally substituted heterocyclylidene;
- X⁷ is selected from optionally substituted $(C_3-C_{24})$-alkylene, optionally substituted $(C_3-C_{24})$-hetero-alkylene, optionally substituted $(C_3-C_{24})$-alkenylene, optionally substituted $(C_{3-12})$-hetero-alkenylene, optionally substituted $(C_{3-12})$-alkynylene, optionally substituted $(C_3-C_{12})$-hetero-alkynylene, optionally substituted $(C_5-C_{12})$-cycloalkylene, optionally substituted $(C_5-C_{12})$-cycloalkenylene, and optionally substituted heterocyclylidene; and
- $R^1$-$R^{15}$ are independently selected from the group consisting of H, D, aryl, heterocyclyl, $(C_1-C_6)$-alkyl, $(C_1-C_6)$-hetero-alkyl, $(C_2-C_6)$-alkenyl, $(C_{2-6})$-hetero-alkenyl, $(C_{2-6})$-alkynyl, $(C_2-C_6)$-hetero-alkynyl, ether, ester, halo, hydroxyl, boronic acid, boronic ester, carboxyl, carboxylate, aldehyde, ketone, haloformyl, carboxamide, amine, azide, isonitrile, nitroso, nitro, thiol, sulfinyl, and sulfo;
- optionally, the dynamic thermosetting polymer is also formed from one or more comonomers;
- optionally, the dynamic thermosetting polymer further comprises one or more plasticizers;
- wherein the dynamic thermosetting polymer is malleable, can be recycled back to monomers, and/or is capable of being reprocessed.

2. The dynamic thermosetting polymer of claim 1, wherein the plurality of boroxine crosslinks having the structure of

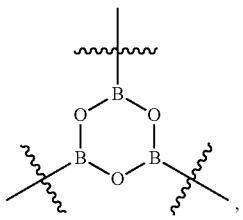 [SMILES: *B1OB(*)OB(*)O1]

are formed from monomers comprising the structure of Formula V(a), Formula V(b), or Formula V(c):

Formula V(a)

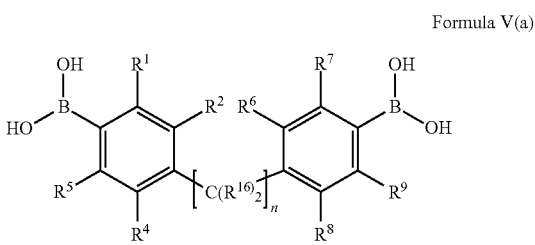

Formula V(b)

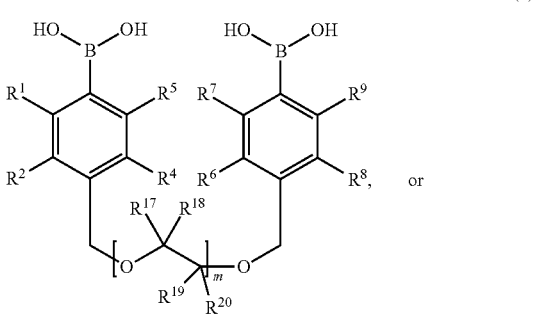

Formula V(c)

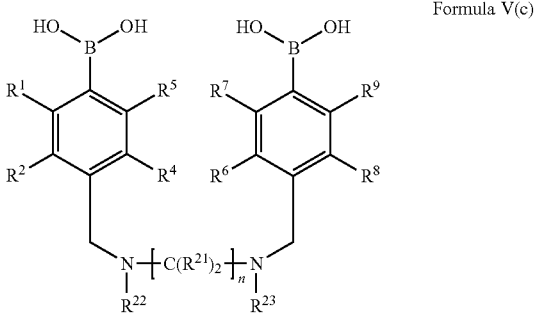

wherein,
- $R^1$, $R^2$, $R^4$, $R^5$, and $R^6$-$R^9$ are independently selected from the group consisting of H, D, aryl, heterocyclyl, $(C_1-C_{24})$-alkyl, $(C_1-C_{24})$-heteroalkyl, $(C_2-C_{24})$-alkenyl, $(C_{2-24})$-heteroalkenyl, $(C_{2-24})$-alkynyl, $(C_2-C_{24})$-heteroalkynyl, $(C_3-C_{24})$-cycloalkyl, $(C_4-C_{24})$-cycloalkenyl, ester, halo, hydroxyl, ketone, carboxyl, carboxylate, aldehyde, boronic acid, boronic ester, haloformyl, ether, carboxamide, amine, azide, isonitrile, nitroso, nitro, thiol, sulfinyl, and sulfo;
- $R^{16}$-$R^{23}$ are independently selected from the group consisting of H, D, halo, $(C_1-C_4)$alkyl, hydroxyl, and amine;

m is an integer selected from 1, 2, 3, 4, 5, 6, 7, 8, 9, 10, 12, 13, 14, 15, 16, 17, 18, 19, or 20; and n is an integer selected from 3, 4, 5, 6, 7, 8, 9, 10, 12, 13, 14, 15, 16, 17, 18, 19, or 20.

3. The dynamic thermosetting polymer of claim 2, wherein the plurality of boroxine crosslinks having the structure of:

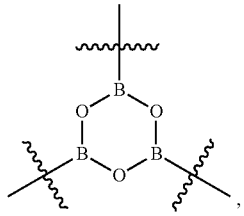 [SMILES: *B1OB(*)OB(*)O1]

are formed from monomers comprising the structure of:

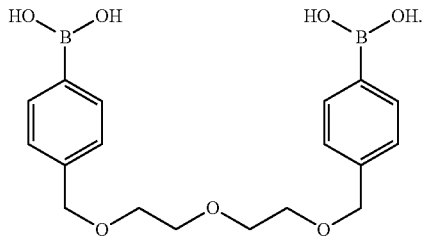 [SMILES: OB(O)c1ccc(COCCOCCOCc2ccc(B(O)O)cc2)cc1]

4. The dynamic thermosetting polymer of claim 1, wherein the dynamic thermosetting polymer is also formed from one or more comonomers having the structure of Formula I and/or Formula II:

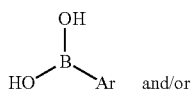 Formula I and/or

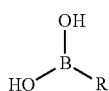 Formula II wherein,
Ar is selected from aryl, aromatic heterocycle, or an aromatic mixed ring system, wherein each of the foregoing groups comprise one or more substituents, and wherein at least one substituent is a boronic acid group; and R is selected from aryl, heterocyclyl, $(C_1-C_{24})$-alkyl, $(C_1-C_{24})$-heteroalkyl, $(C_1-C_{24})$-alkenyl, $(C_{1-12})$-heteroalkenyl, $(C_{2-12})$-alkynyl, $(C_2-C_{12})$-heteroalkynyl, $(C_3-C_{12})$-cycloalkyl, $(C_4-C_{12})$-cycloalkenyl, $(C_1-C_{24})$-ester, mixed ring system, or any combination of the foregoing groups, wherein each of the foregoing groups comprise one or more substituents, wherein at least one substituent is a boronic acid group.

5. The dynamic thermosetting polymer of claim 4, wherein the one or more comonomers have the structure of Formula IV:

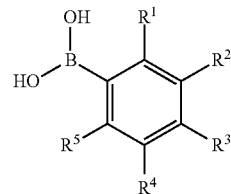 Formula IV wherein,
$R^1$-$R^5$ are independently selected from the group consisting of H, D, aryl, heterocyclyl, $(C_1-C_{24})$-alkyl, $(C_1-C_{24})$-heteroalkyl, $(C_2-C_{24})$-alkenyl, $(C_{2-24})$-heteroalkenyl, $(C_{2-24})$-alkynyl, $(C_2-C_{24})$-heteroalkynyl, $(C_3-C_{24})$-cycloalkyl, $(C_4-C_{24})$-cycloalkenyl, $(C_1-C_{24})$-ester, halo, hydroxyl, boronic acid, boronic ester, ketone, carboxyl, carboxylate, aldehyde, haloformyl, ether, carboxamide, amine, azide, azo, isonitrile, nitroso, nitro, nitrosooxy, thiol, sulfinyl, and sulfo, wherein at least one of $R^1$ to $R^5$ is an aryl, $(C_1-C_{24})$-alkyl, a $(C_1-C_{24})$-heteroalkyl, a $(C_1-C_{24})$-alkenyl, a $(C_{1-12})$-heteroalkenyl, a $(C_2-C_{12})$-alkynyl, a $(C_2-C_{12})$-heteroalkynyl, a $(C_3-C_{12})$-cycloalkyl, a $(C_4-C_{12})$-cycloalkenyl, a heterocyclyl, and a $(C_1-C_{24})$-ester, wherein for each of the foregoing groups the groups comprise one or more substituents, wherein at least one substituent is a boronic acid group.

6. The dynamic thermosetting polymer of claim 1, wherein the dynamic thermosetting polymer is formed from boronic acid-containing polymers that are prepared by incorporating or linking monomers that comprise boronic acid functional groups with monomers or comonomers that do not comprise boronic functional groups by using a step-growth polymerization method, a chain-growth polymerization method, a ring-opening polymerization method, and an olefin metathesis polymerization method.

7. The dynamic thermosetting polymer of claim 1, wherein the dynamic thermosetting polymer is formed from boronic acid-containing polymers that are made by functionalizing polymers made using step-growth polymerization method, a chain-growth polymerization method, a ring-opening polymerization method, and an olefin metathesis polymerization method, with boronic acid groups.

8. The dynamic thermosetting polymer of claim 1, wherein the dynamic thermosetting polymer further comprises a plasticizer selected from the group consisting of Bis(2-ethylhexyl) phthalate, Bis(2-propylheptyl) phthalate, Diisononyl phthalate, Di-n-butyl phthalate, Butyl benzyl phthalate, Diisodecyl phthalate, Dioctyl phthalate, Diisooctyl phthalate, Diethyl phthalate, Diisobutyl phthalate, Di-n-hexyl phthalate, Trimethyl trimellitate, Tri-(2-ethylhexyl) trimellitate, Tri-(n-octyl,n-decyl) trimellitate, Tri-(heptyl, nonyl) trimellitate, n-octyl trimellitate, Bis(2-ethylhexyl) adipate, Dimethyl adipate, Monomethyl adipate, Dioctyl adipate, Dibutyl sebacate, Dibutyl maleate, Diisobutyl maleate, dioctyl terephthalate, 1,2-Cyclohexane dicarboxylic acid diisononyl ester, Alkyl sulphonic acid phenyl ester, N-ethyl toluene sulfonamide, N-(2-hydroxypropyl) benzene sulfonamide, N-(n-butyl) benzene sulfonamide, Tricresyl phosphate, Tributyl phosphate, Triethylene glycol dihexanoate, Tetraethylene glycol diheptanoate, Acetylated monoglycerides, Triethyl citrate, Acetyl triethyl citrate, Tributyl citrate, Acetyl tributyl citrate, Trioctyl citrate, Acetyl trioctyl citrate, Trihexyl citrate, Acetyl trihexyl citrate, Butyryl trihexyl citrate, Trimethyl citrate, Methyl ricinoleate, Epoxidized soybean oil, Epoxidized vegetable oils, amine-based plasticizer and pyridine-based plasticizer.

9. The dynamic thermosetting polymer of claim 8, wherein the dynamic thermosetting polymer comprises 1 plasticizer to 3 boronic acid groups of the monomers.

10. The dynamic thermosetting polymer of claim 8, wherein the plasticizer is a pyridine-based plasticizer or amine-based plasticizer.

11. The dynamic thermosetting polymer of claim 10, wherein the pyridine-based plasticizer has the structure of:

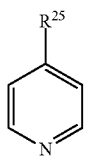

wherein,
$R^{25}$ is selected from an aryl, $(C_1-C_{24})$-alkyl, a $(C_1-C_{24})$-heteroalkyl, a $(C_1-C_{24})$-alkenyl, a $(C_{1-12})$-heteroalkenyl, a $(C_{2-12})$-alkynyl, a $(C_2-C_{12})$-heteroalkynyl, a $(C_3-C_{12})$-cycloalkyl, a $(C_4-C_{12})$-cycloalkenyl, a heterocyclyl, and a $(C_1-C_{24})$-ester.

12. The dynamic thermosetting polymer of claim 11, wherein $R^{25}$ is a $(C_{10}-C_{24})$-alkyl, or $(C_{10}-C_{24})$-heteroalkyl.

13. The dynamic thermosetting polymer of claim 12, wherein the pyridine-based plasticizer has the structure of:

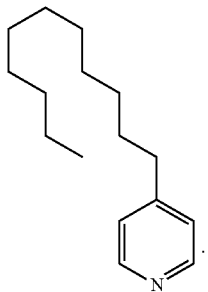 [SMILES: CCCCCCCCCCCc1ccncc1]

14. The dynamic thermosetting polymer of claim 1, wherein the dynamic thermosetting polymer exhibits a Young's modulus of at least 500 MPa.

15. The dynamic thermosetting polymer of claim 1, wherein the dynamic thermosetting polymer exhibits a tensile strength of at least 17 MPa.

16. The dynamic thermosetting polymer of claim 1, wherein the dynamic thermosetting polymer exhibits a tensile strength of at least 15 MPa when reprocessed.

17. An adhesive, sealant, thermal insulation, composite material, or surface coating comprising the dynamic thermosetting polymer of claim 1.

18. A dynamic thermosetting polymer comprising:
a plurality of boroxine crosslinks having the structure of:

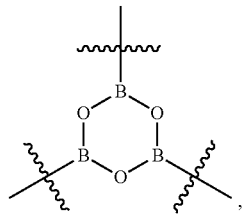 [SMILES: *B1OB(*)OB(*)O1]

formed from monomers comprising the structure of Formula III(c), Formula III(d) and/or Formula III(e):

Formula III(c)

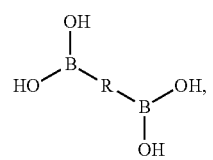

Formula III(d)

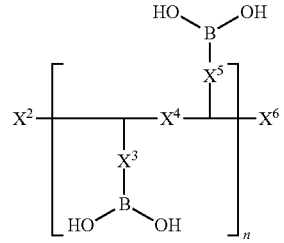

and/or

Formula III(e)

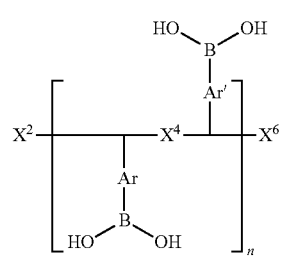

wherein,
Ar is selected from optionally substituted arylene, or optionally substituted aromatic heterocyclylidene;
Ar is selected from optionally substituted arylene, or optionally substituted aromatic heterocyclylidene;
R is selected from optionally substituted $(C_1-C_{24})$-alkylene, optionally substituted $(C_1-C_{24})$-alkenylene, optionally substituted $(C_{1-12})$-hetero-alkenylene, optionally substituted $(C_{2-12})$-alkynylene, optionally substituted $(C_2-C_{12})$-hetero-alkynylene, optionally substituted $(C_3-C_{12})$-cycloalkylene, optionally substituted $(C_4-C_{12})$-cycloalkenylene, or any combination of the foregoing groups; and
$X^2$ and $X^6$ are each independently selected from optionally substituted aryl, optionally substituted $(C_1-C_{24})$-alkyl, optionally substituted $(C_1-C_{24})$-heteroalkyl, optionally substituted $(C_1-C_{24})$-alkenyl, optionally substituted $(C_{1-12})$-heteroalkenyl, optionally substituted $(C_{2-12})$-alkynyl, optionally substituted $(C_2-C_{12})$-heteroalkynyl, optionally substituted $(C_3-C_{12})$-cycloalkyl, optionally substituted $(C_4-C_{12})$-cycloalkenyl, and optionally substituted heterocyclyl;

$X^3$, $X^4$, and $X^5$ are each independently selected from optionally substituted arylene, optionally substituted $(C_1-C_{24})$-alkylene, optionally substituted $(C_1-C_{24})$-hetero-alkylene, optionally substituted $(C_1-C_{24})$-alkenylene, optionally substituted $(C_{1-12})$-hetero-alkenylene, optionally substituted $(C_{2-12})$-alkynylene, optionally substituted $(C_2-C_{12})$-hetero-alkynylene, optionally substituted $(C_3-C_{12})$-cycloalkylene, optionally substituted $(C_4-C_{12})$-cycloalkenylene, and optionally substituted heterocyclylidene; and n is an integer selected from 1 to 1000;

optionally, the dynamic thermosetting polymer is also formed from one or more comonomers;

optionally, the dynamic thermosetting polymer further comprises one or more plasticizers;

wherein the dynamic thermosetting polymer is malleable, can be recycled back to monomers, and/or is capable of being reprocessed.

\* \* \* \* \*